US012670856B2

(12) United States Patent
Chung et al.

(10) Patent No.: US 12,670,856 B2
(45) Date of Patent: Jun. 30, 2026

(54) DISPLAY DEVICE

(71) Applicant: Samsung Display Co., LTD., Yongin-si (KR)

(72) Inventors: Kyunghoon Chung, Yongin-si (KR); Minkyu Woo, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/829,426

(22) Filed: Sep. 10, 2024

(65) Prior Publication Data

US 2025/0095575 A1 Mar. 20, 2025

(30) Foreign Application Priority Data

Sep. 19, 2023 (KR) ........................ 10-2023-0124651

(51) Int. Cl.
*G09G 3/3233* (2016.01)
*G09G 3/32* (2016.01)

(52) U.S. Cl.
CPC ............. *G09G 3/3233* (2013.01); *G09G 3/32* (2013.01); *G09G 2300/0814* (2013.01); *G09G 2300/0819* (2013.01); *G09G 2300/0852* (2013.01); *G09G 2300/0861* (2013.01); *G09G 2320/0242* (2013.01)

(58) Field of Classification Search
CPC ......... G09G 3/3233; G09G 2300/0814; G09G 2300/0819; G09G 2300/0852; G09G 2300/0861; G09G 2320/0242
See application file for complete search history.

(56) References Cited

U.S. PATENT DOCUMENTS

| | | | | |
|---|---|---|---|---|
| 8,390,262 | B2 * | 3/2013 | Chang | H05B 45/38 315/250 |
| 10,395,589 | B1 | 8/2019 | Vahid et al. | |
| 2006/0066528 | A1 * | 3/2006 | Hara | G09G 3/325 345/76 |
| 2009/0167649 | A1 * | 7/2009 | Ishizuka | G09G 3/3258 345/80 |
| 2023/0092321 | A1 * | 3/2023 | Halbritter | G09G 3/32 345/690 |

FOREIGN PATENT DOCUMENTS

| | | | |
|---|---|---|---|
| JP | 2023510520 | A | 3/2023 |
| KR | 1020220052265 | A | 4/2022 |
| KR | 1020220081096 | A | 6/2022 |
| KR | 1020230011844 | A | 1/2023 |

* cited by examiner

*Primary Examiner* — Kenneth B Lee, Jr.
(74) *Attorney, Agent, or Firm* — CANTOR COLBURN LLP

(57) ABSTRACT

A display device includes a plurality of pixels, where each of the plurality of pixels includes a light emitting element, an initialization circuit configured to provide a first initialization voltage to a first node, a data writing circuit configured to provide a data voltage to a second node, a ramp generating circuit configured to provide a ramp voltage to the first node in response to an enable signal, a comparator configured to generate an emission signal by comparing the ramp voltage at the first node and the data voltage at the second node, and a driving circuit configured to provide a constant current to the light emitting element in response to the emission signal.

31 Claims, 34 Drawing Sheets

DISPLAY DEVICE

This application claims priority to Korean Patent Application No. 10-2023-0124651, filed on Sep. 19, 2023, and all the benefits accruing therefrom under 35 USC § 119, the content of which in its entirety is herein incorporated by reference.

BACKGROUND

1. Field

The present invention relates to a display device, and more particularly to a display device in which an emission time of a light emitting element of a pixel is controlled.

2. Description of the Related Art

A display device may display an image by driving a light emitting element, such as a micro light emitting diode (μLED) or an organic light emitting diode (OLED), in a pulse amplitude modulation (PAM) method or a pulse width modulation (PWM) method. In the PAM method, a gray level may be represented by adjusting an amount (or an amplitude) of a driving current provided to the light emitting element. In the PWM method, the gray level may be represented by adjusting a time (or a pulse width) during which the driving current is provided to the light emitting element.

A wavelength of light emitted by the μLED may be shifted according to the amount of the driving current. Thus, in a case where the light emitting element such as the μLED is driven in the PAM method, a color shift phenomenon may occur, and the image may be distorted.

SUMMARY

Some embodiments provide a display device capable of having an improved image quality.

According to embodiments, there is provided a display device including a plurality of pixels. Each of the plurality of pixels includes a light emitting element, an initialization circuit configured to provide a first initialization voltage to a first node, a data writing circuit configured to provide a data voltage to a second node, a ramp generating circuit configured to provide a ramp voltage to the first node in response to an enable signal, a comparator configured to generate an emission signal by comparing the ramp voltage at the first node and the data voltage at the second node, and a driving circuit configured to provide a constant current to the light emitting element in response to the emission signal.

In an embodiment, an emission time of the light emitting element of each of the plurality of pixels may be determined according to a voltage level of the data voltage for each of the plurality of pixels.

In an embodiment, the plurality of pixels may include the ramp generating circuits.

In an embodiment, the ramp generating circuit may include a ramp current source configured to generate a ramp current, a ramp enable transistor connected in series with the ramp current source, and configured to selectively provide the ramp current generated by the ramp current source to the first node in response to the enable signal, and a ramp capacitor connected to the first node, and configured to generate the ramp voltage based on the ramp current.

In an embodiment, the ramp current source may include a ramp current transistor configured to generate the ramp current based on a ramp bias voltage. Gates of the ramp current transistors of the plurality of pixels may be connected to a same line for transferring the ramp bias voltage.

In an embodiment, the display device may further include a reference ramp current source, and a reference ramp current transistor connected in series with the reference ramp current source, the reference ramp current transistor including a drain and a gate connected to each other. The ramp current source may include a ramp current transistor configured to generate the ramp current. Gates of the ramp current transistors of the plurality of pixels may be connected to the gate of the reference ramp transistor.

In an embodiment, the initialization circuit may include a first initialization transistor configured to transfer the first initialization voltage to the first node.

In an embodiment, the initialization circuit may further include a second initialization transistor configured to transfer a second initialization voltage to the second node.

In an embodiment, the data writing circuit may include at least one of a first data writing transistor for transferring the data voltage to the second node in response to a writing signal, and a second data writing transistor for transferring the data voltage to the second node in response to an inverted writing signal.

In an embodiment, the data writing circuit may further include a storage capacitor connected to the second node, and configured to store the data voltage.

In an embodiment, the driving circuit may include a constant current source configured to generate the constant current, and an emission transistor configured to selectively provide the constant current generated by the constant current source to the light emitting element in response to the emission signal.

In an embodiment, the driving circuit may further include at least one driving enable transistor connected in series with the emission transistor, the at least one driving enable transistor being selectively turned on in response to the enable signal or an inverted enable signal.

In an embodiment, the ramp voltage may gradually decrease in a sweep period in which the enable signal has a high level, wherein the comparator may generate the emission signal having a low level when the ramp voltage is higher than the data voltage, the driving circuit may include an emission transistor that is turned on while the emission signal has the low level, and an emission time of the light emitting element may start at a start time point of the sweep period, and may end when a voltage level of the ramp voltage becomes equal to a voltage level of the data voltage.

In an embodiment, the initialization circuit may include a first initialization transistor including a gate for receiving the enable signal, a first terminal for receiving the first initialization voltage, and a second terminal connected to the first node, and a second initialization transistor including a gate for receiving an initialization signal, a first terminal for receiving a second initialization voltage, and a second terminal connected to the second node. The data writing circuit may include a first data writing transistor including a gate for receiving a writing signal, a first terminal connected to a data line, and a second terminal connected to the second node, a second data writing transistor including a gate for receiving an inverted writing signal, a first terminal connected to the data line, and a second terminal connected to the second node, and a storage capacitor including a first electrode connected to the second node, and a second electrode for receiving a ground voltage. The ramp generating circuit may include a ramp enable transistor including a gate for receiving the enable signal, a first terminal connected to the first node, and a second terminal, a ramp current source connected between the second terminal of the ramp enable transistor and a line for transferring a second power supply voltage, and a ramp capacitor including a first electrode connected to the first node, and a second electrode for receiving the ground voltage. The comparator may include a positive input terminal connected to the second node, a negative input terminal connected to the first node, and an output terminal for outputting the emission signal. The driving circuit may include a constant current source connected to a line for transferring a first power supply voltage, a first driving enable transistor including a gate for receiving an inverting enable signal, a first terminal connected to the constant current source, and a second terminal, an emission transistor including a gate for receiving the emission signal, a first terminal connected to the second terminal of the first driving enable transistor, and a second terminal, and a second driving enable transistor including a gate for receiving the enable signal, a first terminal connected to the second terminal of the emission transistor, and a second terminal. The light emitting element may include an anode connected to the second terminal of the second driving enable transistor, and a cathode connected to the line for transferring the second power supply voltage.

In an embodiment, a frame period may include an initialization period in which the initialization signal has a high level, and the enable signal and the writing signal have a low level, a data writing period in which the writing signal has the high level, and the enable signal and the initialization signal have the low level, and a sweep period in which the enable signal has the high level, and the initialization signal and the writing signal have the low level. In the initialization period, the first initialization transistor may provide the first initialization voltage to the first node in response to the enable signal having the low level, and the second initialization transistor may provide the second initialization voltage to the second node in response to the initialization signal having the high level. In the data write period, the first data writing transistor may provide the data voltage to the second node in response to the writing signal having the high level, the second data writing transistor may provide the data voltage to the second node in response to the inverted writing signal having the low level, and the storage capacitor may store the data voltage at the second node. In the sweep period, the ramp enable transistor may provide a ramp current generated by the ramp current source to the ramp capacitor in response to the enable signal having the high level, the ramp capacitor may provide the first node with the ramp voltage that gradually decreases from the first initialization voltage based on the ramp current, the comparator may generate the emission signal having the low level during an emission time from a start time point of the sweep period to a time point at which the ramp voltage becomes the data voltage, the first driving enable transistor may be turned on in response to the inverted enable signal having the low level, the second driving enable transistor may be turned on in response to the enable signal having the high level, the emission transistor may be turned on in response to the emission signal having the low level during the emission time, and the light emitting element may emit light based on the constant current generated by the constant current source during the emission time.

In an embodiment, the initialization circuit may include a first initialization transistor including a gate for receiving the enable signal, a first terminal for receiving the first initialization voltage, and a second terminal connected to the first node. The data writing circuit may include a first data writing transistor including a gate for receiving a writing signal, a first terminal connected to a data line, and a second terminal connected to the second node, a second data writing transistor including a gate for receiving an inverted writing signal, a first terminal connected to the data line, and a second terminal connected to the second node, and a storage capacitor including a first electrode connected to the second node, and a second electrode for receiving a ground voltage. The ramp generating circuit may include a ramp enable transistor including a gate for receiving the enable signal, a first terminal connected to the first node, and a second terminal, a ramp current source connected between the second terminal of the ramp enable transistor and a line for transferring a second power supply voltage, and a ramp capacitor including a first electrode connected to the first node, and a second electrode for receiving the ground voltage. The comparator may include a positive input terminal connected to the second node, a negative input terminal connected to the first node, and an output terminal for outputting the emission signal. The driving circuit may include a constant current source connected to a line for transferring a first power supply voltage, a first driving enable transistor including a gate for receiving an inverting enable signal, a first terminal connected to the constant current source, and a second terminal, an emission transistor including a gate for receiving the emission signal, a first terminal connected to the second terminal of the first driving enable transistor, and a second terminal, and a second driving enable transistor including a gate for receiving the enable signal, a first terminal connected to the second terminal of the emission transistor, and a second terminal. The light emitting element may include an anode connected to the second terminal of the second driving enable transistor, and a cathode connected to the line for transferring the second power supply voltage. In the initialization period of a current frame period, a voltage of the second node may be maintained as the data voltage in a previous frame period.

In an embodiment, the ramp voltage may gradually decrease in a sweep period in which the enable signal has a high level, the comparator may generate the emission signal having the high level when the ramp voltage is higher than the data voltage, the driving circuit may include an emission transistor that is turned on while the emission signal has the high level, and an emission time of the light emitting element may start at a start time point of the sweep period, and may end when a voltage level of the ramp voltage becomes equal to a voltage level of the data voltage.

In an embodiment, the initialization circuit may include a first initialization transistor including a gate for receiving the enable signal, a first terminal for receiving the first initialization voltage, and a second terminal connected to the first node, and a second initialization transistor including a gate for receiving an initialization signal, a first terminal for receiving a second initialization voltage, and a second terminal connected to the second node. The data writing circuit may include a first data writing transistor including a gate for receiving a writing signal, a first terminal connected to a data line, and a second terminal connected to the second node, a second data writing transistor including a gate for receiving an inverted writing signal, a first terminal connected to the data line, and a second terminal connected to the second node, and a storage capacitor including a first electrode connected to the second node, and a second electrode for receiving a ground voltage. The ramp generating circuit may include a ramp enable transistor including a gate for receiving the enable signal, a first terminal connected to the first node, and a second terminal, a ramp current source connected between the second terminal of the ramp enable transistor and a line for transferring a second power supply voltage, and a ramp capacitor including a first electrode connected to the first node, and a second electrode for receiving the ground voltage. The comparator may include a positive input terminal connected to the first node, a negative input terminal connected to the second node, and an output terminal for outputting the emission signal. The driving circuit may include a first driving enable transistor including a gate for receiving an inverting enable signal, a first terminal, and a second terminal, an emission transistor including a gate for receiving the emission signal, a first terminal connected to the second terminal of the first driving enable transistor, and a second terminal, a second driving enable transistor including a gate for receiving the enable signal, a first terminal connected to the second terminal of the emission transistor, and a second terminal, and a constant current source connected between the second terminal of the second driving enable transistor and the line for transferring the second power supply voltage. The light emitting element may include an anode connected to a line for transferring a first power supply voltage, and a cathode connected to the first terminal of the first driving enable transistor.

In an embodiment, the ramp voltage may gradually increase in a sweep period in which the enable signal has a low level, wherein the comparator may generate the emission signal having the low level when the ramp voltage is lower than the data voltage, the driving circuit may include an emission transistor that is turned on while the emission signal has the low level, and an emission time of the light emitting element may start at a start time point of the sweep period, and may end when a voltage level of the ramp voltage becomes equal to a voltage level of the data voltage.

In an embodiment, the initialization circuit may include a first initialization transistor including a gate for receiving the enable signal, a first terminal for receiving the first initialization voltage, and a second terminal connected to the first node, and a second initialization transistor including a gate for receiving an initialization signal, a first terminal for receiving a second initialization voltage, and a second terminal connected to the second node. The data writing circuit may include a first data writing transistor including a gate for receiving a writing signal, a first terminal connected to a data line, and a second terminal connected to the second node, a second data writing transistor including a gate for receiving an inverted writing signal, a first terminal connected to the data line, and a second terminal connected to the second node, and a storage capacitor including a first electrode connected to the second node, and a second electrode for receiving a ground voltage. The ramp generating circuit may include a ramp current source connected to a line for transferring a first power supply voltage, a ramp enable transistor including a gate for receiving the enable signal, a first terminal connected to the ramp current source, and a second terminal connected to the first node, and a ramp capacitor including a first electrode connected to the first node, and a second electrode for receiving the ground voltage. The comparator may include a positive input terminal connected to the first node, a negative input terminal connected to the second node, and an output terminal for outputting the emission signal. The driving circuit may include a constant current source connected to the line for transferring the first power supply voltage, a first driving enable transistor including a gate for receiving the enable signal, a first terminal connected to the constant current source, and a second terminal, an emission transistor including a gate for receiving the emission signal, a first terminal connected to the second terminal of the first driving enable transistor, and a second terminal, and a second driving enable transistor including a gate for receiving an inverted enable signal, a first terminal connected to the second terminal of the emission transistor, and a second terminal. The light emitting element may include an anode connected to the second terminal of the second driving enable transistor, and a cathode connected to a line for transferring a second power supply voltage.

In an embodiment, the ramp voltage may gradually increase in a sweep period in which the enable signal has a low level, the comparator may generate the emission signal having a high level when the ramp voltage is lower than the data voltage, the driving circuit may include an emission transistor that is turned on while the emission signal has the high level, and an emission time of the light emitting element may start at a start time point of the sweep period, and may end when a voltage level of the ramp voltage becomes equal to a voltage level of the data voltage.

In an embodiment, the initialization circuit may include a first initialization transistor including a gate for receiving the enable signal, a first terminal for receiving the first initialization voltage, and a second terminal connected to the first node, and a second initialization transistor including a gate for receiving an initialization signal, a first terminal for receiving a second initialization voltage, and a second terminal connected to the second node. The data writing circuit may include a first data writing transistor including a gate for receiving a writing signal, a first terminal connected to a data line, and a second terminal connected to the second node, a second data writing transistor including a gate for receiving an inverted writing signal, a first terminal connected to the data line, and a second terminal connected to the second node, and a storage capacitor including a first electrode connected to the second node, and a second electrode for receiving a ground voltage. The ramp generating circuit may include a ramp current source connected to a line for transferring a first power supply voltage, a ramp enable transistor including a gate for receiving the enable signal, a first terminal connected to the ramp current source, and a second terminal connected to the first node, and a ramp capacitor including a first electrode connected to the first node, and a second electrode for receiving the ground voltage. The comparator may include a positive input terminal connected to the second node, a negative input terminal connected to the first node, and an output terminal for outputting the emission signal. The driving circuit may include a first driving enable transistor including a gate for receiving the enable signal, a first terminal, and a second terminal, an emission transistor including a gate for receiving the emission signal, a first terminal connected to the second terminal of the first driving enable transistor, and a second terminal, a second driving enable transistor including a gate for receiving an inverted enable signal, a first terminal connected to the second terminal of the emission transistor, and a second terminal, and a constant current source connected between the second terminal of the second driving enable transistor and a line for transferring a second power supply voltage. The light emitting element may include an anode connected to the line for transferring the first power supply voltage, and a cathode connected to the first terminal of the first driving enable transistor.

In an embodiment, the ramp voltage may gradually decrease in a sweep period in which the enable signal has a high level, wherein the comparator may generate the emission signal having a low level when the ramp voltage is lower than the data voltage, the driving circuit may include an emission transistor that is turned on while the emission signal has the low level, and an emission time of the light emitting element may start when a voltage level of the ramp voltage becomes equal to a voltage level of the data voltage, and may end at an end time point of the sweep period.

In an embodiment, the initialization circuit may include a first initialization transistor including a gate for receiving the enable signal, a first terminal for receiving the first initialization voltage, and a second terminal connected to the first node, and a second initialization transistor including a gate for receiving an initialization signal, a first terminal for receiving a second initialization voltage, and a second terminal connected to the second node. The data writing circuit may include a first data writing transistor including a gate for receiving a writing signal, a first terminal connected to a data line, and a second terminal connected to the second node, a second data writing transistor including a gate for receiving an inverted writing signal, a first terminal connected to the data line, and a second terminal connected to the second node, and a storage capacitor including a first electrode connected to the second node, and a second electrode for receiving a ground voltage. The ramp generating circuit may include a ramp enable transistor including a gate for receiving the enable signal, a first terminal connected to the first node, and a second terminal, a ramp current source connected between the second terminal of the ramp enable transistor and a line for transferring a second power supply voltage, and a ramp capacitor including a first electrode connected to the first node, and a second electrode for receiving the ground voltage. The comparator may include a positive input terminal connected to the first node, a negative input terminal connected to the second node, and an output terminal for outputting the emission signal. The driving circuit may include a constant current source connected to a line for transferring a first power supply voltage, and an emission transistor including a gate for receiving the emission signal, a first terminal connected to the constant current source, and a second terminal. The light emitting element may include an anode connected to the second terminal of the emission transistor, and a cathode connected to the line for transferring the second power supply voltage.

In an embodiment, a frame period may include an initialization period in which the initialization signal has a high level, and the enable signal and the writing signal have a low level, a data writing period in which the writing signal has the high level, and the enable signal and the initialization signal have the low level, and a sweep period in which the enable signal has the high level, and the initialization signal and the writing signal have the low level. In the initialization period, the first initialization transistor may provide the first initialization voltage to the first node in response to the enable signal having the low level, and the second initialization transistor may provide the second initialization voltage to the second node in response to the initialization signal having the high level. In the data write period, the first data writing transistor may provide the data voltage to the second node in response to the writing signal having the high level, the second data writing transistor may provide the data voltage to the second node in response to the inverted writing signal having the low level, and the storage capacitor may store the data voltage at the second node. In the sweep period, the ramp enable transistor may provide a ramp current generated by the ramp current source to the ramp capacitor in response to the enable signal having the high level, the ramp capacitor may provide the first node with the ramp voltage that gradually decreases from the first initialization voltage based on the ramp current, the comparator may generate the emission signal having the low level during an emission time from a time point at which the ramp voltage becomes the data voltage to an end time point of the sweep period, the emission transistor may be turned on in response to the emission signal having the low level during the emission time, and the light emitting element may emit light based on the constant current generated by the constant current source during the emission time.

In an embodiment, the ramp voltage may gradually decrease in a sweep period in which the enable signal has a high level, wherein the comparator may generate the emission signal having the high level when the ramp voltage is lower than the data voltage, the driving circuit may include an emission transistor that is turned on while the emission signal has the high level, and an emission time of the light emitting element may start when a voltage level of the ramp voltage becomes equal to a voltage level of the data voltage, and may end at an end time point of the sweep period.

In an embodiment, the initialization circuit may include a first initialization transistor including a gate for receiving the enable signal, a first terminal for receiving the first initialization voltage, and a second terminal connected to the first node, and a second initialization transistor including a gate for receiving an initialization signal, a first terminal for receiving a second initialization voltage, and a second terminal connected to the second node. The data writing circuit may include a first data writing transistor including a gate for receiving a writing signal, a first terminal connected to a data line, and a second terminal connected to the second node, a second data writing transistor including a gate for receiving an inverted writing signal, a first terminal connected to the data line, and a second terminal connected to the second node, and a storage capacitor including a first electrode connected to the second node, and a second electrode for receiving a ground voltage. The ramp generating circuit may include a ramp enable transistor including a gate for receiving the enable signal, a first terminal connected to the first node, and a second terminal, a ramp current source connected between the second terminal of the ramp enable transistor and a line for transferring a second power supply voltage, and a ramp capacitor including a first electrode connected to the first node, and a second electrode for receiving the ground voltage. The comparator may include a positive input terminal connected to the second node, a negative input terminal connected to the first node, and an output terminal for outputting the emission signal. The driving circuit may include an emission transistor including a gate for receiving the emission signal, a first terminal, and a second terminal, and a constant current source connected between the second terminal of the emission transistor and the line for transferring the second power supply voltage. The light emitting element may include an anode connected to a line for transferring a first power supply voltage, and a cathode connected to the first terminal of the emission transistor.

In an embodiment, the ramp voltage may gradually increase in a sweep period in which the enable signal has a low level, wherein the comparator may generate the emission signal having the low level when the ramp voltage is higher than the data voltage, the driving circuit may include an emission transistor that is turned on while the emission signal has the low level, and an emission time of the light emitting element may start when a voltage level of the ramp voltage becomes equal to a voltage level of the data voltage, and may end at an end time point of the sweep period.

In an embodiment, the initialization circuit may include a first initialization transistor including a gate for receiving the enable signal, a first terminal for receiving the first initialization voltage, and a second terminal connected to the first node, and a second initialization transistor including a gate for receiving an initialization signal, a first terminal for receiving a second initialization voltage, and a second terminal connected to the second node. The data writing circuit may include a first data writing transistor including a gate for receiving a writing signal, a first terminal connected to a data line, and a second terminal connected to the second node, a second data writing transistor including a gate for receiving an inverted writing signal, a first terminal connected to the data line, and a second terminal connected to the second node, and a storage capacitor including a first electrode connected to the second node, and a second electrode for receiving a ground voltage. The ramp generating circuit may include a ramp current source connected to a line for transferring a first power supply voltage, a ramp enable transistor including a gate for receiving the enable signal, a first terminal connected to the ramp current source, and a second terminal connected to the first node, and a ramp capacitor including a first electrode connected to the first node, and a second electrode for receiving the ground voltage. The comparator may include a positive input terminal connected to the second node, a negative input terminal connected to the first node, and an output terminal for outputting the emission signal. The driving circuit may include a constant current source connected to the line for transferring the first power supply voltage, and an emission transistor including a gate for receiving the emission signal, a first terminal connected to the constant current source, and a second terminal. The light emitting element may include an anode connected to the second terminal of the emission transistor, and a cathode connected to a line for transferring a second power supply voltage.

In an embodiment, the ramp voltage may gradually increase in a sweep period in which the enable signal has a low level, wherein the comparator may generate the emission signal having a high level when the ramp voltage is higher than the data voltage, the driving circuit may include an emission transistor that is turned on while the emission signal has the high level, and an emission time of the light emitting element may start when a voltage level of the ramp voltage becomes equal to a voltage level of the data voltage, and may end at an end time point of the sweep period.

In an embodiment, the initialization circuit may include a first initialization transistor including a gate for receiving the enable signal, a first terminal for receiving the first initialization voltage, and a second terminal connected to the first node, and a second initialization transistor including a gate for receiving an initialization signal, a first terminal for receiving a second initialization voltage, and a second terminal connected to the second node. The data writing circuit may include a first data writing transistor including a gate for receiving a writing signal, a first terminal connected to a data line, and a second terminal connected to the second node, a second data writing transistor including a gate for receiving an inverted writing signal, a first terminal connected to the data line, and a second terminal connected to the second node, and a storage capacitor including a first electrode connected to the second node, and a second electrode for receiving a ground voltage. The ramp generating circuit may include a ramp current source connected to a line for transferring a first power supply voltage, a ramp enable transistor including a gate for receiving the enable signal, a first terminal connected to the ramp current source, and a second terminal connected to the first node, and a ramp capacitor including a first electrode connected to the first node, and a second electrode for receiving the ground voltage. The comparator may include a positive input terminal connected to the first node, a negative input terminal connected to the second node, and an output terminal for outputting the emission signal. The driving circuit may include an emission transistor including a gate for receiving the emission signal, a first terminal, and a second terminal, and a constant current source connected between the second terminal of the emission transistor and a line for transferring a second power supply voltage. The light emitting element may include an anode connected to the line for transferring the first power supply voltage, and a cathode connected to the first terminal of the emission transistor.

According to an embodiment, there is provided a display device including a plurality of pixels. Each of the plurality of pixels includes a first initialization transistor including a gate for receiving an enable signal, a first terminal for receiving a first initialization voltage, and a second terminal connected to a first node, a second initialization transistor including a gate for receiving an initialization signal, a first terminal for receiving a second initialization voltage, and a second terminal connected to a second node, a first data writing transistor including a gate for receiving a writing signal, a first terminal connected to a data line, and a second terminal connected to the second node, a second data writing transistor including a gate for receiving an inverted writing signal, a first terminal connected to the data line, and a second terminal connected to the second node, a storage capacitor including a first electrode connected to the second node, and a second electrode for receiving a ground voltage, a ramp enable transistor including a gate for receiving the enable signal, a first terminal connected to the first node, and a second terminal, a ramp current source connected between the second terminal of the ramp enable transistor and a line for transferring a second power supply voltage, a ramp capacitor including a first electrode connected to the first node, and a second electrode for receiving the ground voltage, a comparator including a positive input terminal connected to the second node, a negative input terminal connected to the first node, and an output terminal for outputting an emission signal, a constant current source connected to a line for transferring a first power supply voltage, a first driving enable transistor including a gate for receiving an inverting enable signal, a first terminal connected to the constant current source, and a second terminal, an emission transistor including a gate for receiving the emission signal, a first terminal connected to the second terminal of the first driving enable transistor, and a second terminal, a second driving enable transistor including a gate for receiving the enable signal, a first terminal connected to the second terminal of the emission transistor, and a second terminal, and a light emitting element including an anode connected to the second terminal of the second driving enable transistor, and a cathode connected to the line for transferring the second power supply voltage.

According to an embodiment, there is provided a display device including a plurality of pixels. Each of the plurality of pixels includes a first initialization transistor including a gate for receiving an enable signal, a first terminal for receiving a first initialization voltage, and a second terminal connected to a first node, a second initialization transistor including a gate for receiving an initialization signal, a first terminal for receiving a second initialization voltage, and a second terminal connected to a second node, a first data writing transistor including a gate for receiving a writing signal, a first terminal connected to a data line, and a second terminal connected to the second node, a second data writing transistor including a gate for receiving an inverted writing signal, a first terminal connected to the data line, and a second terminal connected to the second node, a storage capacitor including a first electrode connected to the second node, and a second electrode for receiving a ground voltage, a ramp enable transistor including a gate for receiving the enable signal, a first terminal connected to the first node, and a second terminal, a ramp current source connected between the second terminal of the ramp enable transistor and a line for transferring a second power supply voltage, a ramp capacitor including a first electrode connected to the first node, and a second electrode for receiving the ground voltage, a comparator including a positive input terminal connected to the first node, a negative input terminal connected to the second node, and an output terminal for outputting an emission signal, a constant current source connected to a line for transferring a first power supply voltage, an emission transistor including a gate for receiving the emission signal, a first terminal connected to the constant current source, and a second terminal, and a light emitting element including an anode connected to the second terminal of the emission transistor, and a cathode connected to the line for transferring the second power supply voltage.

As described above, in a display device according to an embodiment, a driving circuit of each pixel may provide a constant (or fixed) current to a light emitting element. Accordingly, a color shift phenomenon may be prevented in the display device. Further, in the display device, according to an embodiment, each pixel may include a ramp generating circuit that generates a ramp voltage. Accordingly, image quality deterioration due to a distortion of the ramp voltage may be prevented in the display device.

BRIEF DESCRIPTION OF THE DRAWINGS

Illustrative, non-limiting embodiments will be more clearly understood from the following detailed description in conjunction with the accompanying drawings.

DETAILED DESCRIPTION OF THE EMBODIMENTS

Figure 1:
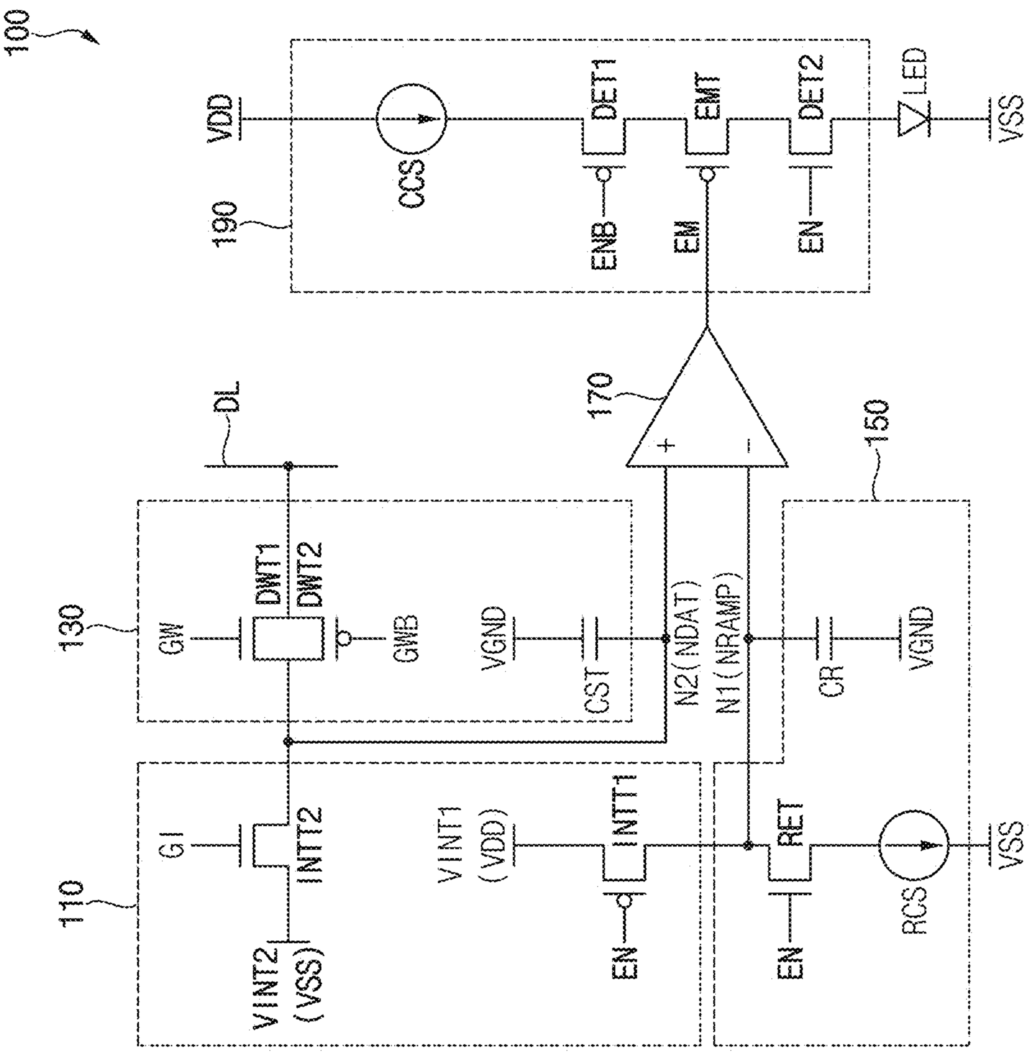
FIG. 1 is a circuit diagram illustrating a pixel of a display device, according to an embodiment.

Hereinafter, embodiments of the invention will be explained in detail with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element (or a region, a layer, a portion, or the like) is referred to as being related to another such as being "on", "connected to" or "coupled to" another element, it may be directly disposed on, connected or coupled to the other element, or intervening elements may be disposed therebetween.

Like reference numerals or symbols refer to like elements throughout. In the drawings, the thickness, the ratio, and the size of the element are exaggerated for effective description of the technical contents. As used herein, the term "and/or" includes any and all combinations of one or more of the associated listed items.

The term "and/or," includes all combinations of one or more of which associated configurations may define.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the scope of the invention. Similarly, a second element, component, region, layer or section may be termed a first element, component, region, layer or section. As used herein, the singular forms, "a", "an" and "the" are intended to include the plural forms as well, unless the context clearly indicates otherwise.

Also, terms of "below", "on lower side", "above", "on upper side", or the like may be used to describe the relationships of the elements illustrated in the drawings. These terms have relative concepts and are described on the basis of the directions indicated in the drawings.

It will be further understood that the terms "comprise", "includes" and/or "have", when used in this specification, specify the presence of stated features, integers, steps, operations, elements, components, and/or groups thereof, but do not preclude the presence or addition of one or more other features, integers, steps, operations, elements, components, and/or groups thereof. As used herein, being "disposed directly on" may mean that there is no additional layer, film, region, plate, or the like between a part and another part such as a layer, a film, a region, a plate, or the like. For example, being "disposed directly on" may mean that two layers or two members are disposed without using an additional member such as an adhesive member, therebetween.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
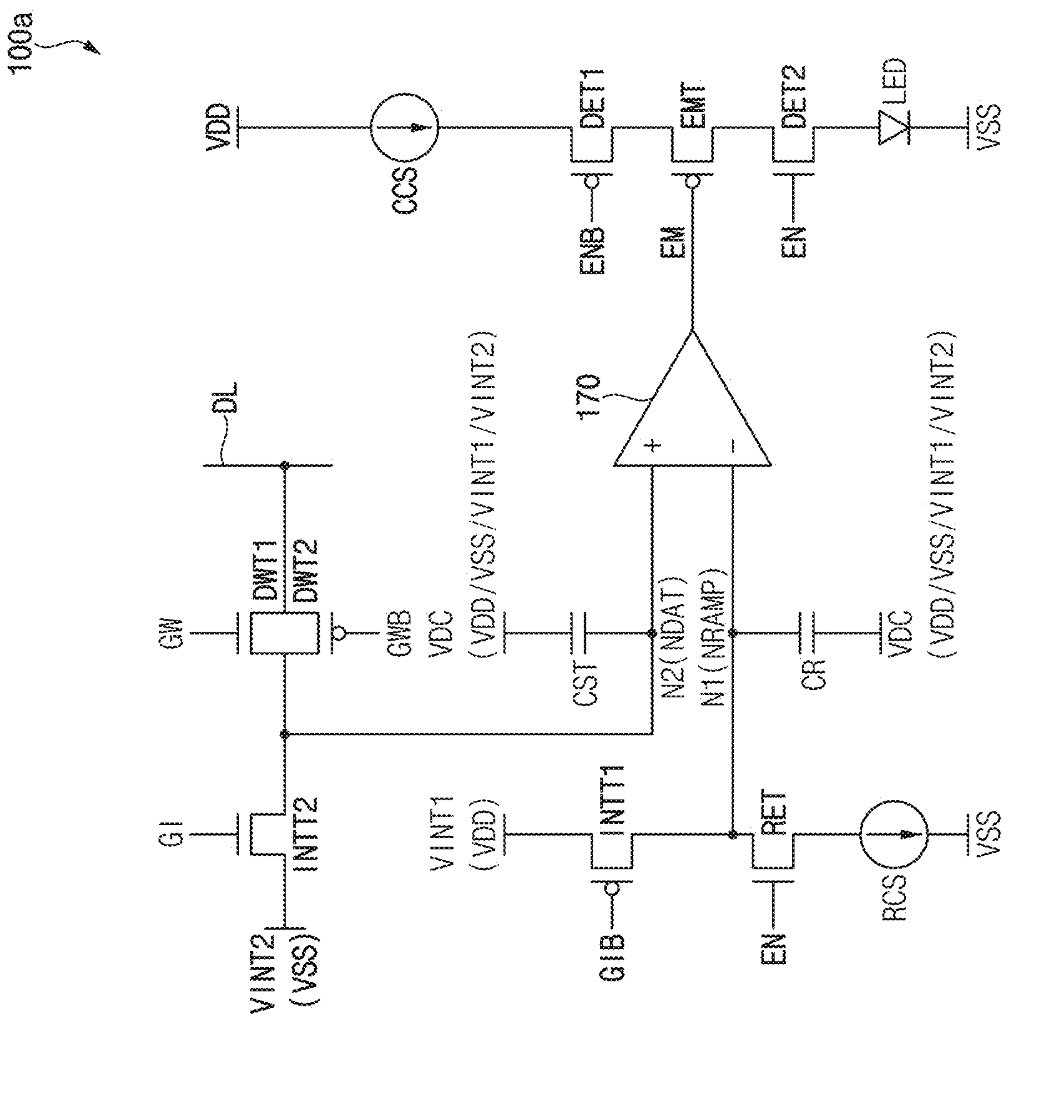
FIG. 2 is a circuit diagram illustrating an example of a pixel of a display device, according to an embodiment.
Figure 3A:
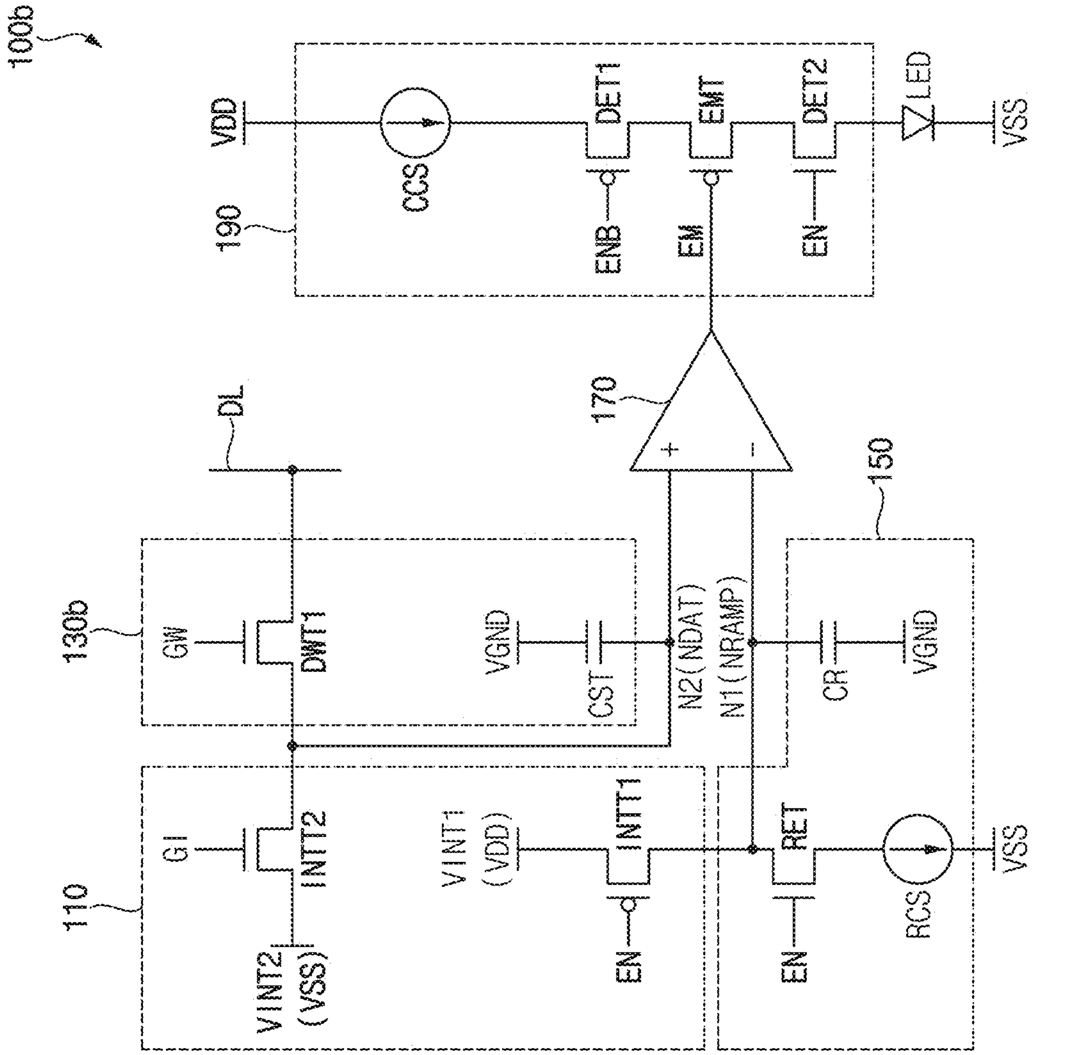
FIG. 3A is a circuit diagram illustrating an example of a pixel having one data writing transistor, according to an embodiment.
Figure 3B:
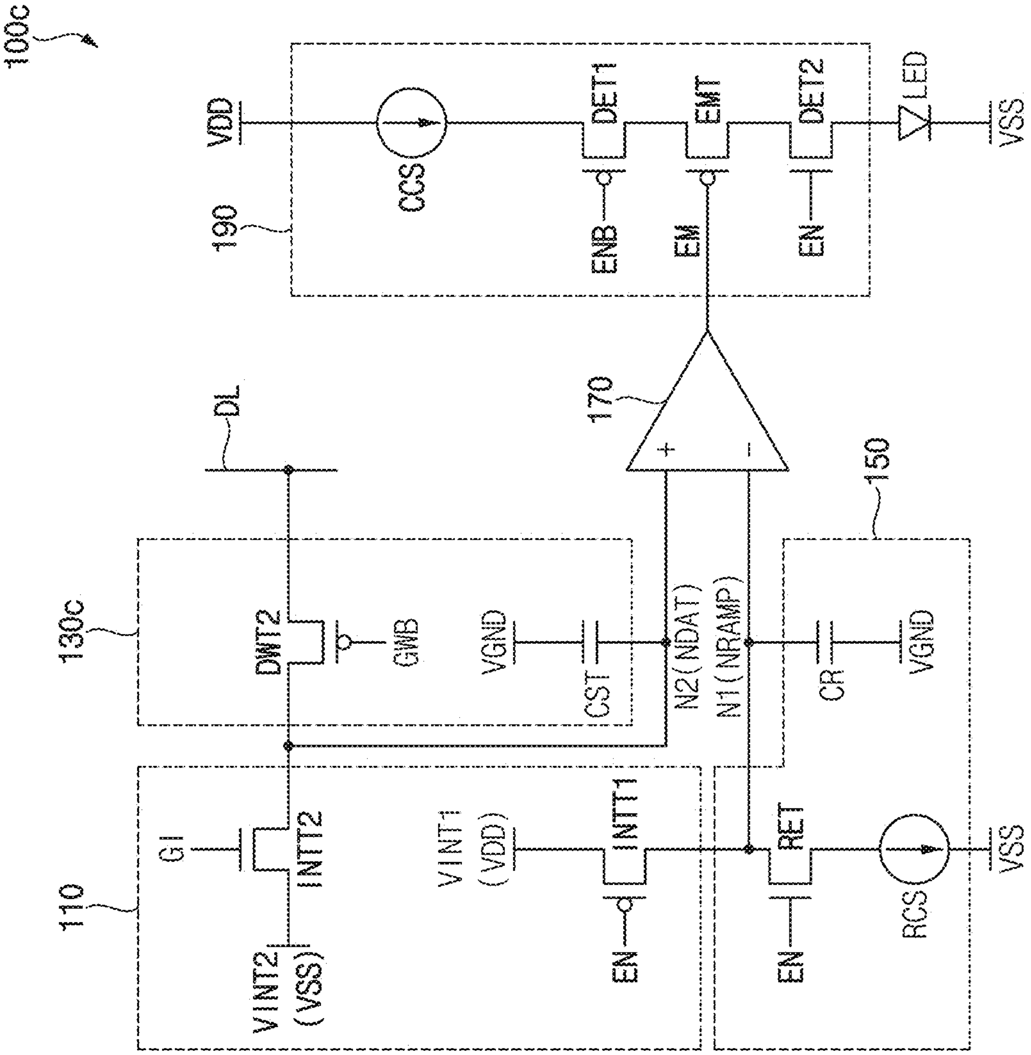
FIG. 3B is a circuit diagram illustrating an example of a pixel having one data writing transistor, according to an embodiment.
Figure 4:
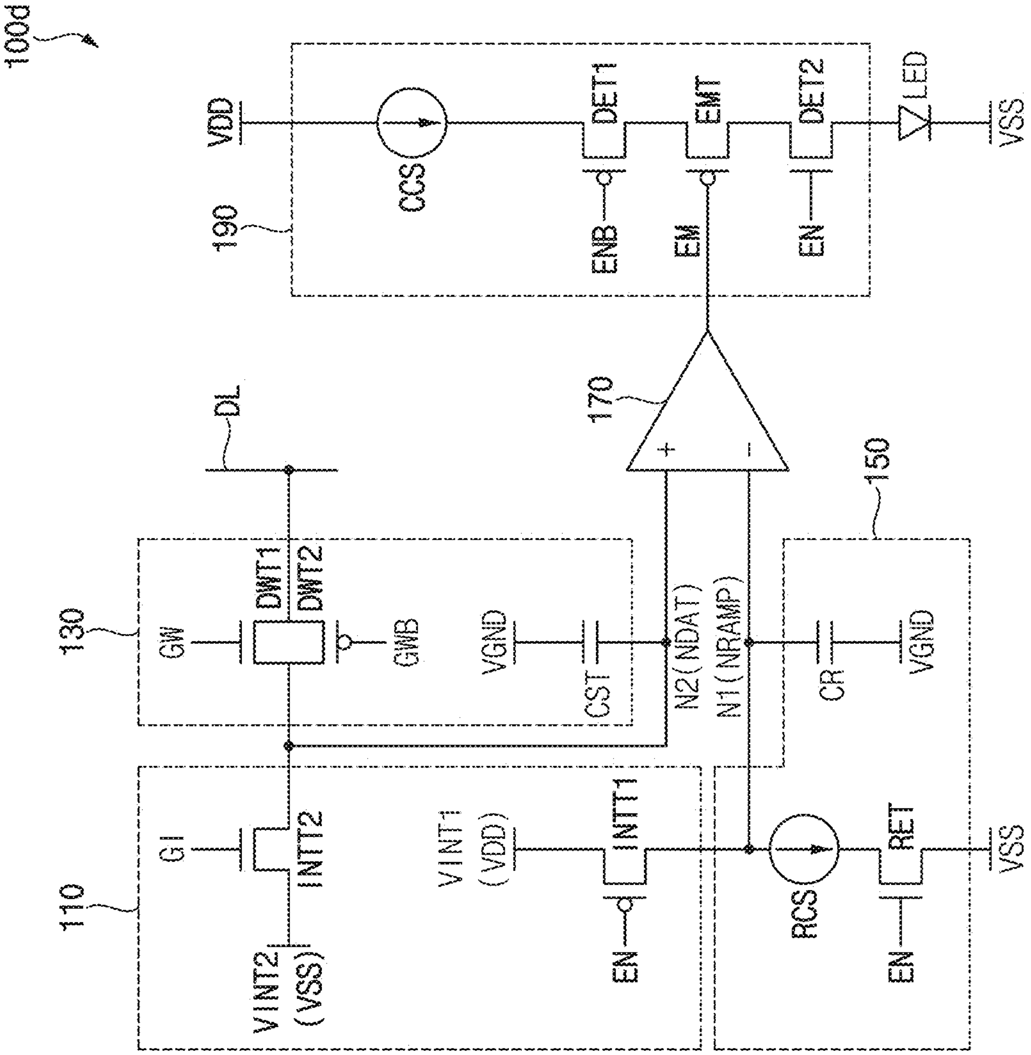
FIG. 4 is a circuit diagram illustrating another example of a pixel of a display device, according to an embodiment.
Figure 5A:
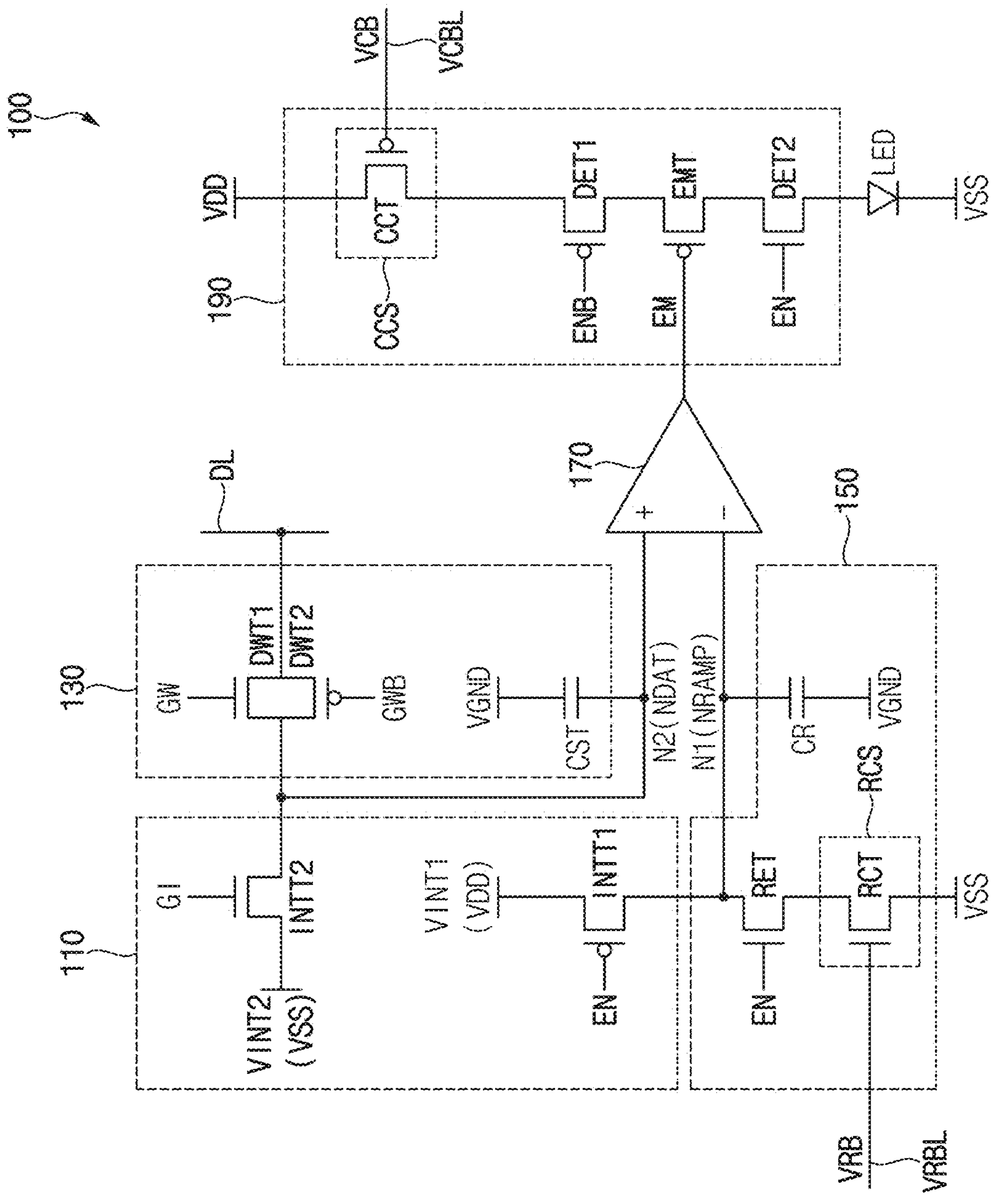
FIG. 5A is a circuit diagram illustrating an example of a pixel in which current sources are implemented as transistors receiving bias voltages, according to an embodiment.
Figure 5B:
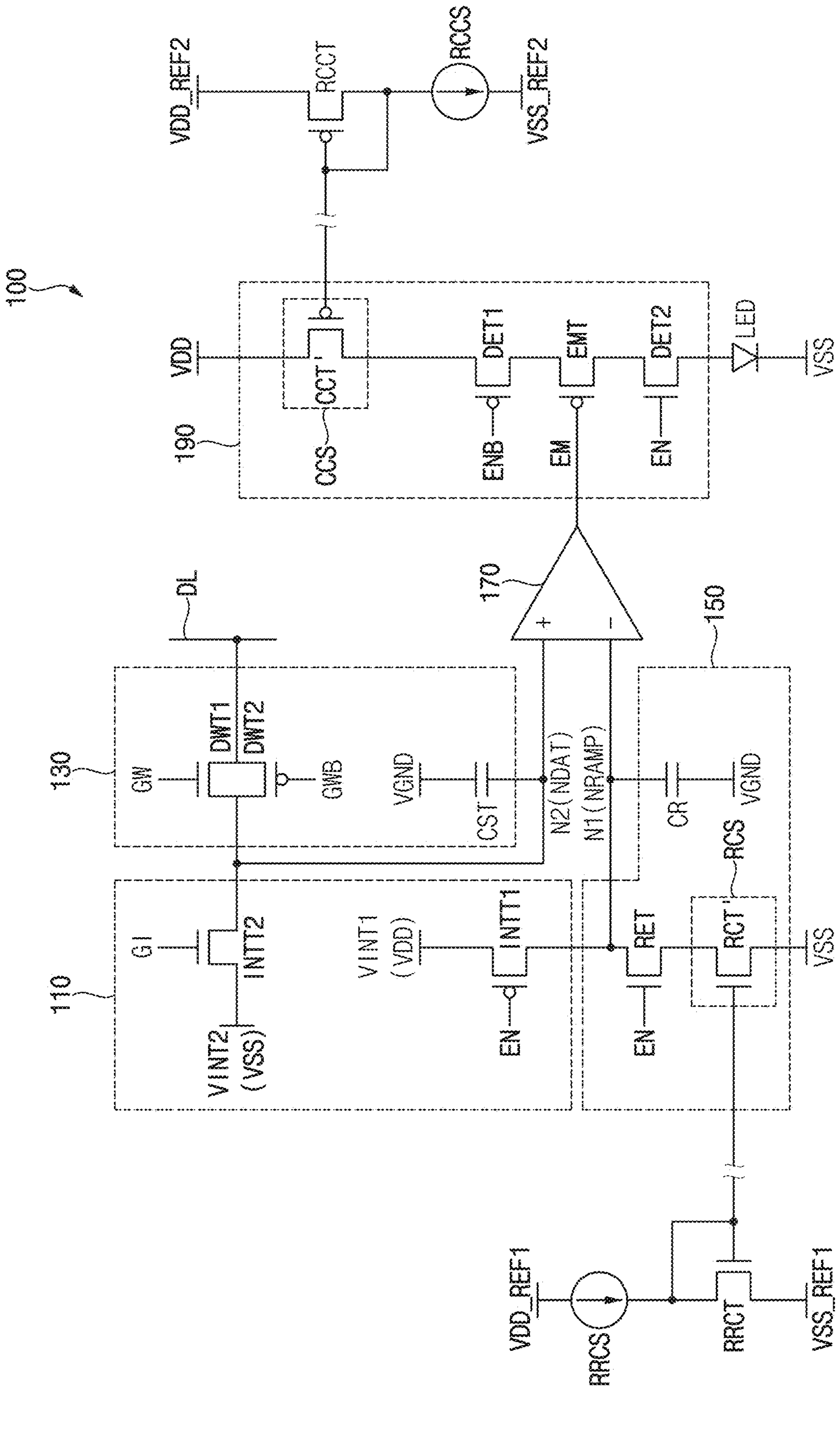
FIG. 5B is a circuit diagram illustrating an example of a pixel in which current sources are implemented as current mirrors, according to an embodiment.
Figure 6A:
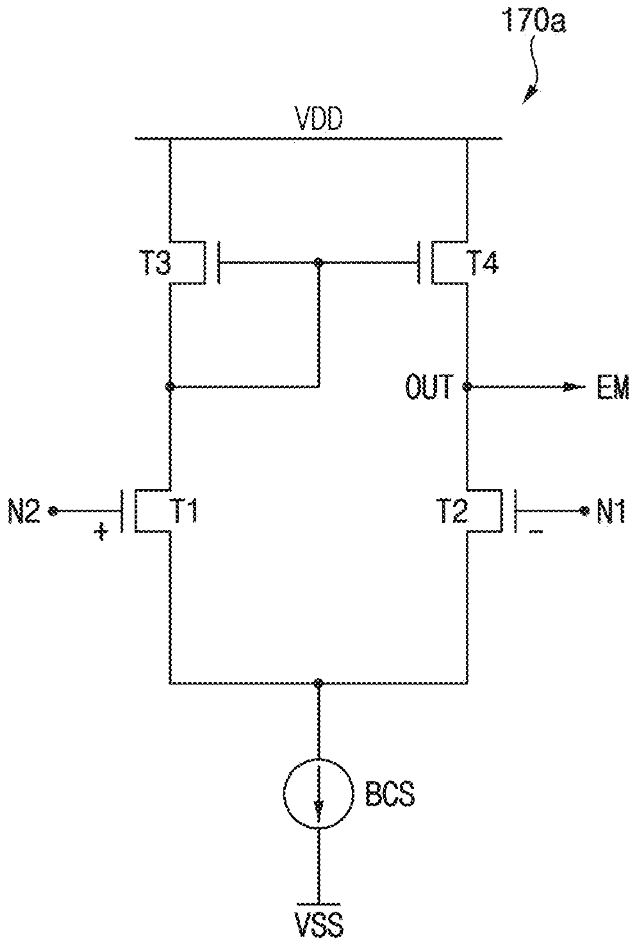
FIG. 6A is a circuit diagram illustrating an example of a comparator implemented in a form of an amplifier, according to an embodiment.
Figure 6B:
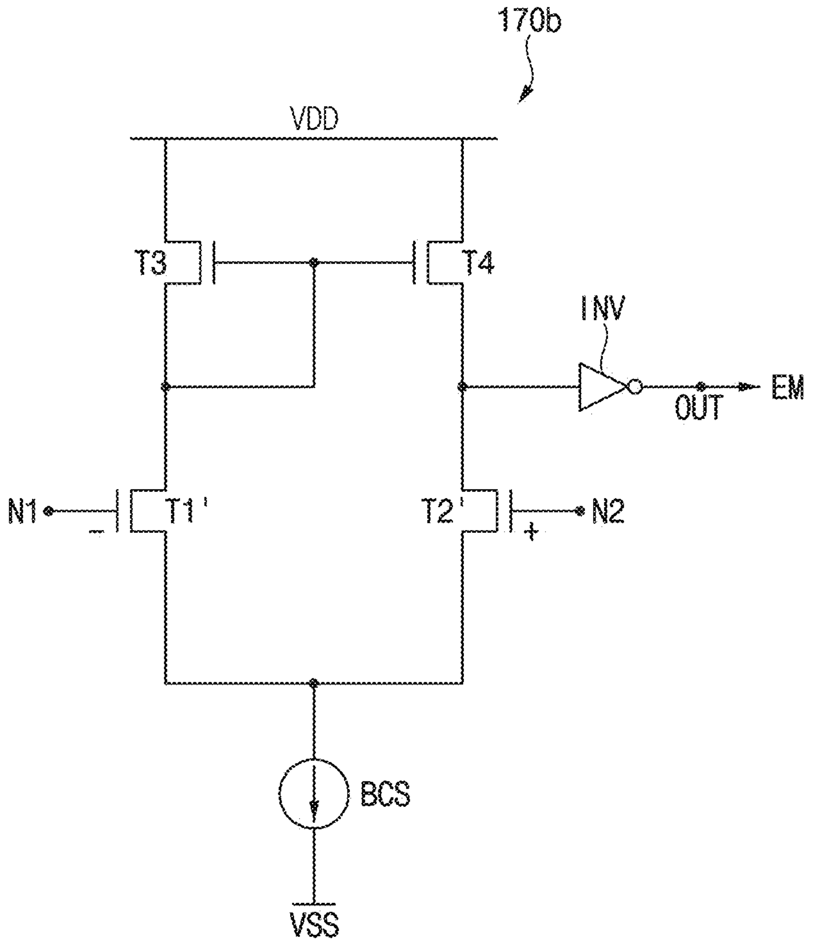
FIG. 6B is a circuit diagram illustrating an example of a comparator implemented in a form of an amplifier, according to an embodiment.
Figure 7A:
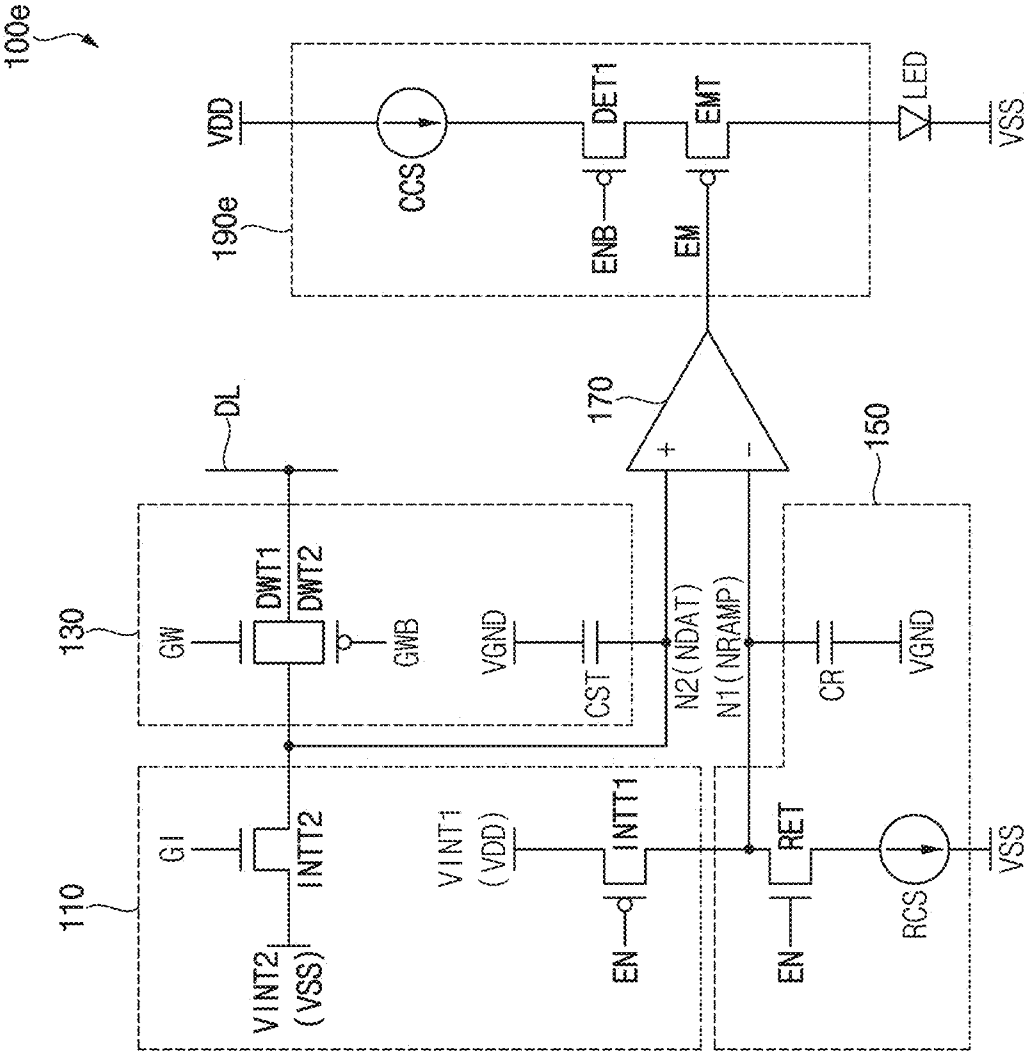
FIG. 7A is a circuit diagram illustrating an example of a pixel having one driving enable transistor, according to an embodiment.
Figure 7B:
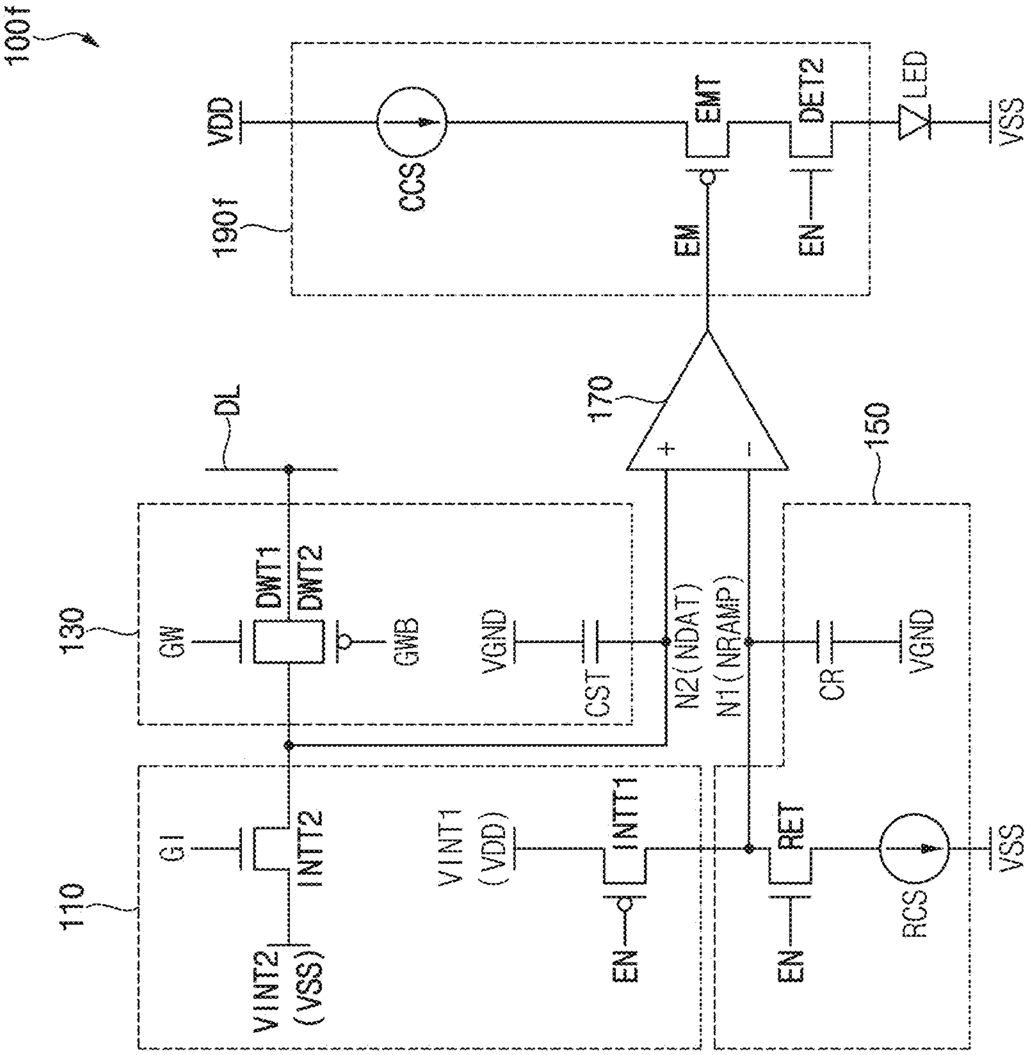
FIG. 7B is a circuit diagram illustrating an example of a pixel having one driving enable transistor, according to an embodiment.

FIG. 1 is a circuit diagram illustrating a pixel of a display device, according to an embodiment, FIG. 2 is a circuit diagram illustrating an example of a pixel of a display device, according to an embodiment, FIGS. 3A and 3B are circuit diagrams illustrating examples of a pixel having one data writing transistor, according to an embodiment, FIG. 4 is a circuit diagram illustrating another example of a pixel of a display device, according to an embodiment, FIG. 5A is a circuit diagram illustrating an example of a pixel in which current sources are implemented as transistors receiving bias voltages, according to an embodiment, FIG. 5B is a circuit diagram illustrating an example of a pixel in which current sources are implemented as current mirrors, according to an embodiment, FIGS. 6A and 6B are circuit diagrams illustrating examples of a comparator implemented in a form of an amplifier, according to an embodiment, and FIGS. 7A and 7B are circuit diagrams illustrating examples of a pixel having one driving enable transistor, according to an embodiment.

In an embodiment and referring to FIG. 1, each pixel 100 of a display device may include an initialization circuit 110, a data writing circuit 130, a ramp generating circuit 150, a comparator 170, a driving circuit 190 and a light emitting element LED.

In an embodiment, the initialization circuit 110 may initialize a first node N1 by providing a first initialization voltage VINT1 to the first node N1. In some embodiments, the initialization circuit 110 may further initialize a second node N2 by providing a second initialization voltage VINT2 to the second node N2. Here, the first node N1 may be a ramp node NRAMP to which a ramp voltage is provided, and the second node N2 may be a data node NDAT to which a data voltage is provided. In some embodiments, the first initialization voltage VINT1 may be a first power supply voltage VDD (e.g., a high power supply voltage), and the second initialization voltage VINT2 may be a second power supply voltage VSS (e.g. a low power supply voltage). In other embodiments, the first initialization voltage VINT1 may be different from the first power supply voltage VDD, and the second initialization voltage VINT2 may be different from the second power supply voltage VSS. For example, the first initialization voltage VINT1 may be less than or equal to the first power supply voltage VDD and higher than or equal to a highest data voltage, and the second initialization voltage VINT2 may be higher than or equal to the second power supply voltage VSS and lower than or equal to a lowest data voltage.

In an embodiment, the initialization circuit 110 may include a first initialization transistor INTT1 for transferring the first initialization voltage VINT1 to the first node N1, and a second initialization transistor INTT2 for transferring the second initialization voltage VINT2 to the second node N2. In the pixel 100 of FIG. 1, the first initialization transistor INTT1 may transfer the first initialization voltage VINT1 to the first node N1 in response to an enable signal EN, and the second initialization transistor INTT2 may transfer the second initialization voltage VINT2 to the second node N2 in response to an initialization signal GI. Further, the first initialization transistor INTT1 may be implemented as a p-type metal oxide semiconductor (PMOS) transistor, and the second initialization transistor INTT2 may be implemented as an n-type metal oxide semiconductor (NMOS) transistor. Thus, the first initialization transistor INTT1 may transfer the first initialization voltage VINT1 to the first node N1 while the enable signal EN has a low level, and the second initialization transistor INTT2 may transfer the second initialization voltage VINT2 to the second node N2 while the initialization signal GI has a high level. For example, as illustrated in FIG. 1, the first initialization transistor INTT1 may include a gate for receiving the enable signal EN, a first terminal for receiving the first initialization voltage VINT1, and a second terminal connected to the first node N1, and the second initialization transistor INTT2 may include a gate for receiving the initialization signal GI, a first terminal for receiving the second initialization voltage VINT2, and a second terminal connected to the second node N2.

In an embodiment, in a pixel 100*a* of FIG. 2, the first initialization transistor INTT1 may transfer the first initialization voltage VINT1 to the first node N1 in response to an inverted initialization signal GIB that is an inverted signal of the initialization signal GI, and the second initialization transistor INTT2 may transfer the second initialization voltage VINT2 to the second node N2 in response to the initialization signal GI. Further, since the first initialization transistor INTT1 is implemented as the PMOS transistor and the second initialization transistor INTT2 is implemented as the NMOS transistor, the first and second initialization transistors INTT1 and INTT2 may respectively transfer the first and second initialization voltages VINT1 and VINT2 to the first and second nodes N1 and N2 while the initialization signal GI has the high level, or while the inverted initialization signal GIB has the low level.

In an embodiment, as described below with reference to FIGS. 13 and 14, the initialization circuit 110 may include only the first initialization transistor INTT1 that transfers the first initialization voltage VINT1 to the first node N1. In this case, in an initialization period, the first node N1 may be initialized based on the first initialization voltage VINT1, but the second node N2 may not be initialized, and a voltage of the second node N2 may be maintained as a (previous) data voltage in a previous frame period.

In an embodiment, the data writing circuit 130 may provide a data voltage of a data line DL to the second node N2, and may store the data voltage at the second node N2. In an embodiment, as illustrated in FIG. 1, the data writing circuit 130 may include a first data writing transistor DWT1 that transfers the data voltage to the second node N2 in response to a writing signal GW, a second data writing transistor DWT2 that transfers the data voltage to the second node N2 in response to an inverted writing signal GWB that is an inverted signal of the writing signal GW, and a storage capacitor CST that stores the data voltage at the second node N2. Further, the first data writing transistor DWT1 may be implemented as an NMOS transistor, and the second data writing transistor DWT2 may be implemented as a PMOS transistor. Thus, the first and second data writing transistors DWT1 and DWT2 may transfer the data voltage of the data line DL to the second node N2 while the writing signal GW has a high level, or while the inverted writing signal GWB has a low level.

In an embodiment, as illustrated in FIG. 1, the first data writing transistor DWT1 may include a gate for receiving the writing signal GW, a first terminal connected to the data line DL, and a second terminal connected to the second node N2, the second data writing transistor DWT2 may include a gate for receiving the inverted writing signal GWB, a first terminal connected to the data line DL, and a second terminal connected to the second node N2, and the storage capacitor CST may include a first electrode connected to the second node N2 and a second electrode for receiving a ground voltage VGND. Although FIG. 1 illustrates an example in which the second electrode of the storage capacitor CST is connected to a line for transferring the ground voltage VGND, according to embodiments, the second electrode of the storage capacitor CST may be connected to a line for transferring an arbitrary direct current (DC) voltage VDC as illustrated in FIG. 2. For example, in the pixel 100*a* of FIG. 2, the second electrode of the storage capacitor CST may receive the first power supply voltage VDD, the second power supply voltage VSS, the first initialization voltage VINT1 or the second initialization voltage VINT2.

In an embodiment, as illustrated in FIGS. 3A and 3B, the data writing circuit 130 may have one of the first data writing transistor DWT1 and the second data writing transistor DWT2. For example, in a pixel 100*b* of FIG. 3A, the data writing circuit 130*b* may include the first data writing transistor DWT1 that transfers the data voltage to the second node N2 in response to the writing signal GW, and may not include the second data writing transistor DWT2. In another example, in a pixel 100*c* of FIG. 3B, the data writing circuit 130*c* may include the second data writing transistor DWT2 that transfers the data voltage to the second node N2 in response to the inverted writing signal GWB, and may not include the first data writing transistor DWT1.

In an embodiment, the ramp generating circuit 150 may provide a ramp voltage to the first node N1 in response to the enable signal EN. In some embodiments, as illustrated in FIG. 1, the ramp generating circuit 150 may include a ramp current source RCS that generates a ramp current, a ramp enable transistor RET that is connected in series with the ramp current source RCS and that selectively connects the ramp current source RCS to the first node N1 in response to the enable signal EN, and a ramp capacitor CR that is connected to the first node N1 and that generates the ramp voltage based on the ramp current. The ramp enable transistor RET may be implemented as an NMOS transistor, and thus may connect the ramp current source RCS to the first node N1 while the enable signal EN has a high level. Further, in the example of FIG. 1, while the enable signal EN has the high level, the ramp current source RCS may provide a negative ramp current to the ramp capacitor CR. That is, while the enable signal EN has the high level, the ramp current may flow from the ramp capacitor CR to a line for transferring the second power supply voltage VSS. Thus, while the enable signal EN has the high level, a voltage of the first node N1 to which the ramp capacitor CR is connected may gradually decrease from the first initialization voltage VINT1. In some embodiments, the voltage of the first node N1 that gradually decreases (or increases) may be referred to as the ramp voltage. Further, in some embodiments, the gradually decreasing voltage may be referred to as a ramp-down voltage.

In an embodiment and as illustrated in FIG. 1, the ramp enable transistor RET may include a gate for receiving the enable signal EN, a first terminal connected to the first node N1, and a second terminal, the ramp current source RCS may be connected between the second terminal of the ramp enable transistor RET and the line for transferring the second power supply voltage VSS, and the ramp capacitor CR may include a first electrode connected to the first node N1 and a second electrode for receiving the ground voltage VGND. Although FIG. 1 illustrates an example in which the second electrode of the ramp capacitor CR is connected to the line for transferring the ground voltage VGND, in other embodiments, the second electrode of the ramp capacitor CR may be connected to a line for transferring an arbitrary DC voltage VDC as illustrated in FIG. 2. For example, in the pixel 100*a* of FIG. 2, the second electrode of the ramp capacitor CR may receive the first power supply voltage VDD, the second power supply voltage VSS, the first initialization voltage VINT1 or the second initialization voltage VINT2. Further, although FIG. 1 illustrates an example in which the ramp enable transistor RET and the ramp current source RCS are connected in an order of the ramp enable transistor RET and the ramp current source RCS between the first node N1 and the line for transferring the second power supply voltage VSS, the connection order of the transistor RET and the ramp current source RCS is not limited to the example of FIG. 1. For example, in a pixel 100*d* of FIG. 4, the ramp current source RCS may be directly connected to the first node N1, and the ramp enable transistor RET may be connected between the ramp current source RCS and the line for transferring the second power supply voltage VSS.

In an embodiment, as illustrated in FIG. 5A, the ramp current source RCS may be implemented as a biased transistor. That is, the ramp current source RCS may include a ramp current transistor RCT that includes a gate for receiving a ramp bias voltage VRB and that generates the ramp current based on the ramp bias voltage VRB. In some embodiments, wherein gates of the ramp current transistors RCT of a plurality of pixels of the display device may be connected to the same line VRBL for transferring the ramp bias voltage VRB. For example, the gates of the ramp current transistors RCT of all pixels of the display device may be connected to the same ramp bias voltage line VRBL. In another example, the display device may include red, green and blue pixels, the ramp current transistors RCT of the red pixels may receive the same red ramp bias voltage, the ramp current transistors RCT of the green pixels may receive the same green ramp bias voltage, the ramp current transistors RCT of the blue pixels may receive the same blue ramp bias voltage, and the red, green and blue ramp bias voltages may be different from each other.

In an embodiment, as illustrated in FIG. 5B, the ramp current source RCS may be implemented in the form of a current mirror. For example, the display device may include a reference ramp current source RRCS and a reference ramp current transistor RRCT connected in series between a first reference high power supply voltage VDD_REF1 and a first reference low power supply voltage VSS_REF1. A terminal (e.g., a drain) and a gate of the reference ramp current transistor RRCT may be connected to each other. Further, the ramp current source RCS may include a ramp current transistor RCT' including a gate connected to a gate of the reference ramp current transistor RRCT. Accordingly, the reference ramp current transistor RRCT and the ramp current transistor RCT' may form a current mirror, and the ramp current transistor RCT' may generate the ramp current that is substantially the same as a current flowing through the reference ramp current transistor RRCT, or a current generated by the reference ramp current source RRCS. In some embodiments, gates of the ramp current transistors RCT' of the plurality of pixels may be connected to the gate of the same reference ramp transistor RRCT. For example, the gates of the ramp current transistors RCT' of all pixels may be connected to the gate of the same reference ramp transistor RRCT. In another example, the display device may include red, green and blue reference ramp current sources and red, green and blue reference ramp current transistors respectively connected thereto, the ramp current transistors RCT' of the red pixels may be connected to the same red reference ramp current transistor, the ramp current transistors RCT' of the green pixels may be connected to the same green reference ramp current transistor, and the ramp current transistors RCT' of the blue pixels may be connected to the same blue reference ramp current transistor.

In an embodiment, the first reference high power supply voltage VDD_REF1 may have a voltage level substantially the same as a voltage level of the first power supply voltage VDD, or may have a voltage level different from the voltage level of the first power supply voltage VDD. Further, in a case where the first reference high power supply voltage VDD_REF1 and the first power supply voltage VDD have substantially the same voltage level, the first reference high power supply voltage VDD_REF1 and the first power supply voltage VDD may be transferred through the same line, or may be transferred through different lines. In some embodiments, the first reference low power supply voltage VSS_REF1 may have a voltage level substantially the same as a voltage level of the second power supply voltage VSS. Further, the first reference low power supply voltage VSS_REF1 and the second power supply voltage VSS may be transferred through the same line, or may be transferred through different lines. Meanwhile, FIG. 5B illustrates an example in which the reference ramp current transistor RRCT and the ramp current transistor RCT' are implemented as NMOS transistors, and are directly connected to a line for transferring the first reference low power supply voltage VSS_REF1 and the line for transferring the second power supply voltage VSS. However, as illustrated in FIGS. 17, 19, 25 and 27, in a case where the ramp current source RCS is directly connected to the line for transferring the first power supply voltage VDD, the reference ramp current transistor RRCT and the ramp current transistor RCT' may be implemented as PMOS transistors, and may be directly connected to a line for transferring the first reference high power supply voltage VDD_REF1 and the line for transferring the first power supply voltage VDD. In this case, the first reference high power supply voltage VDD_REF1 and the first power supply voltage VDD may have substantially the same voltage level.

In an embodiment, in a conventional display device, a single ramp generating circuit provides a ramp voltage to a plurality of pixels. In this case, a ramp voltage may be distorted due to signal delay in a line for transferring the ramp voltage, and image quality may deteriorate. However, in the display device, according to embodiments, the plurality of pixels may respectively include the ramp generating circuits. Thus, since the ramp voltage is not transferred through external lines connected to the plurality of pixels, the distortion of the ramp voltage due to the signal delay may not occur, and the deterioration of image quality due to the distortion of the ramp voltage may be prevented.

In an embodiment, the comparator 170 may generate an emission signal EM by comparing the ramp voltage at the first node N1 and the data voltage at the second node N2. In some embodiments, as illustrated in FIG. 1, the comparator 170 may include a positive input terminal ("+") connected to the second node N2, a negative input terminal ("−") connected to the first node N1, and an output terminal for outputting the emission signal EM. In this case, the comparator 170 may generate the emission signal EM having a high level when the data voltage applied to the positive input terminal is higher than the ramp voltage applied to the negative input terminal, and may generate the emission signal EM having a low level when the data voltage applied to the positive input terminal is lower than the ramp voltage applied to the negative input terminal. That is, the comparator 170 may generate the emission signal EM having the low level while the ramp voltage is higher than the data voltage.

In an embodiment, as illustrated in FIG. 6A, the comparator 170*a* (or an amplifier 170*a*) may include a first transistor T1 having a gate that forms the positive input terminal ("+"), a second transistor T2 having a gate that forms the negative input terminal ("−"), third and fourth transistors T3 and T4 that forms a current mirror, and a bias current source BCS that provides a bias current. Further, the comparator 170*a* may have a node between the fourth transistor T4 and the second transistor T2 as an output terminal OUT, and may output the emission signal EM at the output terminal OUT by amplifying a difference between a voltage applied to the positive input terminal and a voltage applied to the negative input terminal. For example, the first transistor T1 may include a gate connected to the second node N2, a first terminal connected to the third transistor T3 and a second terminal connected to the bias current source BCS, the second transistor T2 may include a gate connected to the first node N1, a first terminal connected to the output terminal OUT and a second terminal connected to the bias current source BCS, the third transistor T3 may include a gate connected to the first terminal of the transistor T1, a first terminal for receiving the first power supply voltage VDD and a second terminal connected to the first terminal of the first transistor T1, and the fourth transistor T4 may include a gate connected to the first terminal of the first transistor T1, a first terminal for receiving the first power supply voltage VDD and a second terminal connected to the output terminal OUT. Further, the bias current source BCS may be connected between the second terminals of the first and second transistors T1 and T2 and the line for transferring the second power supply voltage VSS. In some embodiments, as illustrated in FIG. 6A, the first and second transistors T1 and T2 may be implemented as, but not limited to, NMOS transistors, and the third and fourth transistors T3 and T4 may be implemented as, but not limited to, PMOS transistors.

In an embodiment, as illustrated in FIG. 6B, the comparator 170*b* (or an amplifier 170*b*) may include a first transistor T1', a second transistor T2', a third transistor T3, a fourth transistor T4, a bias current source BCS and an inverter INV that outputs the emission signal EM by inverting a voltage of a node between the fourth transistor T4 and the second transistor T2. The comparator 170*b* of FIG. 6B may have a similar configuration to the comparator 170*a* of FIG. 6A, except that a gate of the first transistor T1' may form the negative input terminal ("−"), a gate of the second transistor T2' may form the positive input terminal ("+"), the comparator 170*b* may further include the inverter INV, and an output terminal OUT of the comparator 170*b* is an output terminal of the inverter INV.

In an embodiment, although FIGS. 6A and 6B illustrate examples in which the comparator 170 is implemented in a form of the amplifier 170*a* and 170*b*, the configuration of the comparator 170 is not limited to the examples of FIGS. 6A and 6B. For example, the comparator 170 may be implemented as an amplifier having a configuration different from those of the amplifiers 170*a* and 170*b* illustrated in FIGS. 6A and 6B, or may be implemented as a circuit other than an amplifier.

In an embodiment, the driving circuit 190 may provide a constant (or fixed) current to the light emitting element LED in response to the emission signal EM. The driving circuit 190 may include a constant current source CCS that generates the constant current, and an emission transistor EMT that is disposed between the constant current source CCS and the light emitting element LED and that selectively connects the constant current source CCS to the light emitting element LED in response to the emission signal EM. In some embodiments, the emission transistor EMT may be implemented as a PMOS transistor. In this case, the emission transistor EMT may be turned on while the emission signal EM has a low level.

In an embodiment, the driving circuit 190 may further include at least one driving enable transistor DET1 and DET2 that is selectively turned on in response to the enable signal EN or an inverted enable signal ENB. In some embodiments, as illustrated in FIG. 1, the driving circuit 190 may further includes a first driving enable transistor DET1 that receives the inverted enable signal ENB that is an inverted signal of the enable signal EN, and a second driving enable transistor DET2 that receives the enable signal EN. Further, the first driving enable transistor DET1 may be implemented as a PMOS transistor, and the second driving enable transistor DET2 may be implemented as an NMOS transistor. Thus, the first and second driving enable transistors DET1 and DET2 are turned on while the enable signal EN has a high level, or while the inverted enable signal ENB has a low level. Further, since the emission transistor EMT is implemented as an NMOS transistor, the constant current source CCS may be connected to the light emitting element LED when the enable signal EN has the high level, the inverted enable signal ENB has the low level and the emission signal EM has the low level.

In an embodiment, as illustrated in FIG. 1, the constant current source CCS may be connected to the line for transferring the first power supply voltage VDD, the first driving enable transistor DET1 may include a gate for receiving the inverting enable signal ENB, a first terminal connected to the constant current source CCS and a second terminal, the emission transistor EMT may include a gate for receiving the emission signal EM, a first terminal connected to the second terminal of the first driving enable transistor DET1 and a second terminal, and the second driving enable transistor DET2 may include a gate for receiving the enable signal EN, a first terminal connected to the second terminal of the emission transistor EMT and a second terminal connected to the light emitting element LED.

In an embodiment, as illustrated in FIGS. 7A and 7B, the driving circuit 190 may include one of the first driving enable transistor DET1 and the second driving enable transistor DET2. For example, in a pixel 100*e* of FIG. 7A, the driving circuit 190*e* may include the first driving enable transistor DET1 that is turned on in response to the inverted enable signal ENB, and may not include the second driving enable transistor DET2. In another example, in a pixel 100*f* of FIG. 7B, the driving circuit 190*f* may include the second driving enable transistor DET2 that is turned on in response to the enable signal EN, and may not include the first driving enable transistor DET1.

Further, in an embodiment, as illustrated in FIG. 5A, the constant current source CCS may be implemented as a biased transistor. That is, the constant current source CCS may include a constant current transistor CCT that includes a gate for receiving a constant current bias voltage VCB and that generates the constant current based on the constant current bias voltage VCB. In some embodiments, gates of the constant current transistors CCT of the plurality of pixels of the display device may be connected to the same line VCBL for transferring the constant current bias voltage VCB. For example, gates of the constant current transistors CCT of all pixels of the display device may be connected to the same constant current bias voltage line VCBL. In another example, the constant current transistors CCT of the red pixels may receive the same red constant current bias voltage, the constant current transistors CCT of the green pixels may receive the same green constant current bias voltage, the constant current transistors CCT of the blue pixels may receive the same blue constant current bias voltage, and the red, green and blue constant current bias voltages may be different from each other.

In an embodiment, as illustrated in FIG. 5B, the constant current source CCS may be implemented in the form of a current mirror. For example, the display device may include a reference constant current transistor RCCT and a reference constant current source RCCS connected in series between a second reference high power supply voltage VDD_REF2 and a second reference low power supply voltage VSS_REF2. A terminal (e.g., drain) and a gate of the reference constant current transistor RCCT may be connected to each other. Further, the constant current source CCS may include a constant current transistor CCT' including a gate connected to the gate of a reference constant current transistor RCCT. Accordingly, the reference constant current transistor RCCT and the constant current transistor CCT' may form a current mirror, and the constant current transistor CCT' may generate the constant current that is substantially the same as a current flowing through the reference constant current transistor RCCT, or a current generated by the reference constant current source RCCS.

In an embodiment, gates of the constant current transistors CCT' of the plurality of pixels may be connected to the gate of the reference constant current transistor RCCT. For example, the gates of the constant current transistors CCT' of all pixels may be connected to the gate of the reference constant current transistor RCCT. In another example, the display device may include red, green and blue reference constant current sources and red, green and blue reference constant current transistors respectively connected thereto, the constant current transistors CCT' of the red pixels may be connected to the same red reference current source, the constant current transistors CCT' of the green pixels may be connected to the same green reference constant current transistor, and the constant current transistors CCT' of the blue pixels may be connected to the same blue reference constant current transistor.

In an embodiment, the second reference high power supply voltage VDD_REF2 may have a voltage level substantially the same as the first power supply voltage VDD. Further, the second reference high power supply voltage VDD_REF2 and the first power supply voltage VDD may be transferred through the same line, or may be transferred through different lines. In some embodiments, the second reference low power supply voltage VSS_REF2 may have a voltage level substantially the same as a voltage level of the second power supply voltage VSS, or may have a voltage level different from the voltage level of the second power supply voltage VSS. Further, in a case where the second reference low power supply voltage VSS_REF2 and the second power supply voltage VSS have substantially the same voltage level, the second reference low power supply voltage VSS_REF2 and the second power supply voltage VSS may be transferred through the same line, or may be transferred through different lines. Meanwhile, FIG. 5B illustrates an example in which the reference constant current transistor RCCT and the constant current transistor CCT' are implemented as PMOS transistors, and are directly connected to a line for transferring the second reference high power supply voltage VDD_REF2 and the line for transferring the first power supply voltage VDD. However, as illustrated in FIGS. 15, 19, 23 and 27, in a case where the constant current source CCS is directly connected to the line for transferring the second power supply voltage VSS, the reference constant current transistor RCCT and the constant current transistor CCT' may be implemented as NMOS transistors, and may be directly connected to a line for transferring the second reference low power supply voltage VSS_REF2 and the line for transferring the second power supply voltage VSS. In this case, the second reference low power supply voltage VSS_REF2 and the second power supply voltage VSS may have substantially the same voltage level.

In an embodiment, a conventional display device, an amount of a driving current provided to a light emitting element is adjusted according to a gray level indicated by image data or a voltage level of the data voltage. However, a wavelength of light emitted by the light emitting element such as a micro light emitting diode is shifted according to the amount of the driving current. Thus, if the driving current provided to the light emitting element is changed, a color shift phenomenon may occur, and an image may be distorted. However, in the display device according to embodiments, the driving circuit 190 of each pixel 100 may provide the constant (or fixed) current to the light emitting element LED by using the constant current source CCS. Accordingly, the color shift phenomenon may be prevented in the display device according to embodiments.

In an embodiment, the light emitting element LED may emit light based on the constant current provided by the driving circuit 190. For example, as illustrated in FIG. 1, the light emitting element LED may include an anode connected to the second terminal of the second driving enable transistor DET2, and a cathode connected to the line for transferring the second power supply voltage VSS. In some embodiments, the light emitting element LED may be a micro light emitting diode (μLED), but is not limited thereto. In other embodiments, the light emitting element LED may be an organic light emitting diode (OLED). In still other embodiments, the light emitting element LED may be a nano light emitting diode (NED), a quantum dot (QD) light emitting diode, an inorganic light emitting diode, or any other suitable light emitting element.

In an embodiment and as described above, in the display device the driving circuit 190 of each pixel 100 may provide the constant current to the light emitting element LED. Accordingly, the color shift phenomenon may be prevented in the display device, according to embodiments. Further, in the display device according to embodiments, each pixel 100 may include the ramp generating circuit 150 that generates the ramp voltage. Accordingly, the deterioration of image quality due to the distortion of the ramp voltage may be prevented in the display device according to embodiments.

Figure 8:
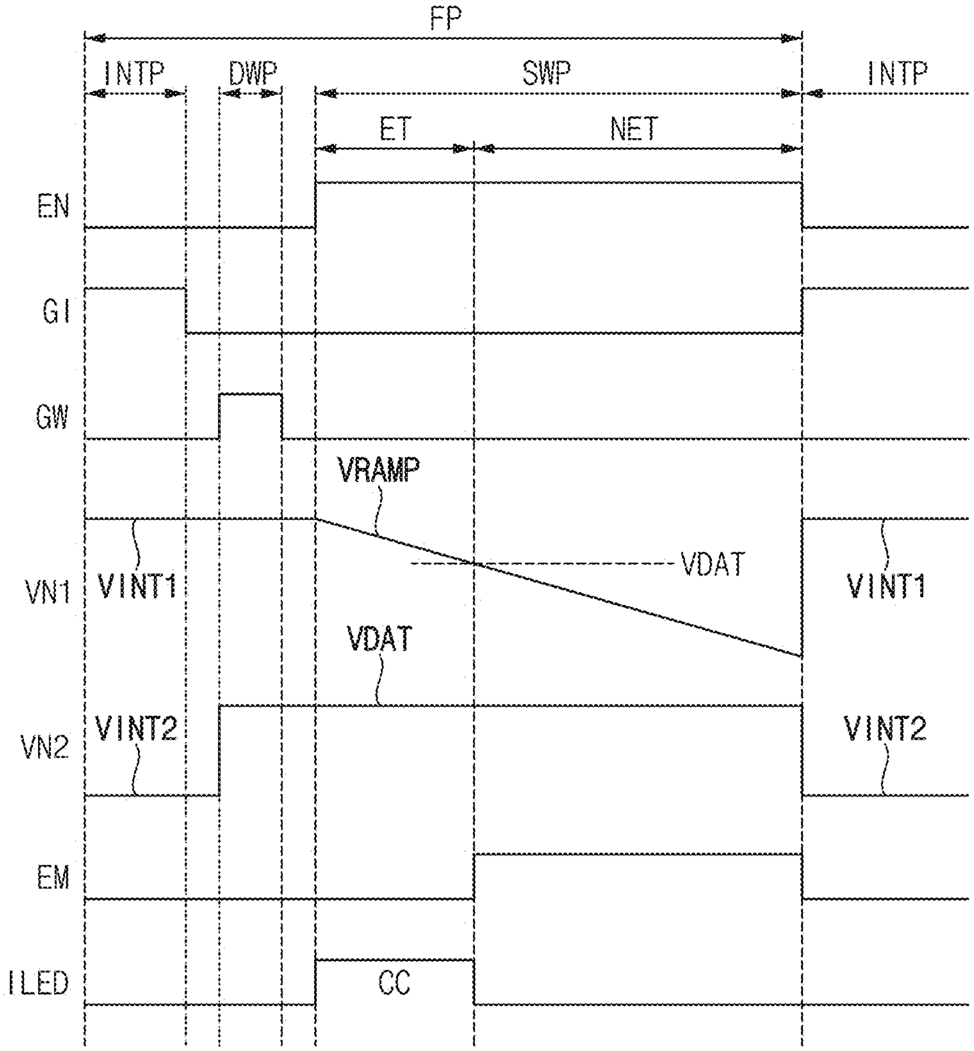
FIG. 8 is a timing diagram for describing an example of an operation of a pixel of FIG. 1, according to an embodiment.
Figure 9:
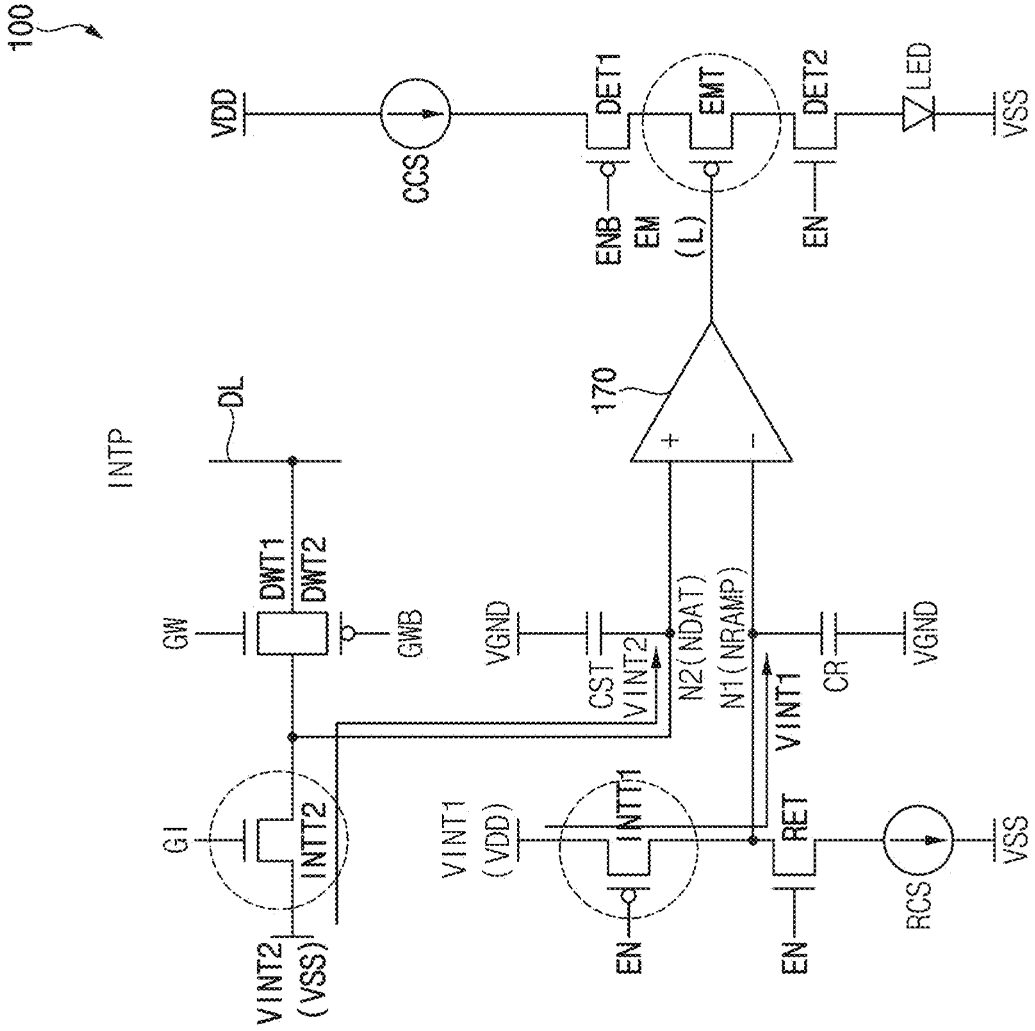
FIG. 9 is a circuit diagram for describing an example of an operation of a pixel in an initialization period, according to an embodiment.
Figure 10:
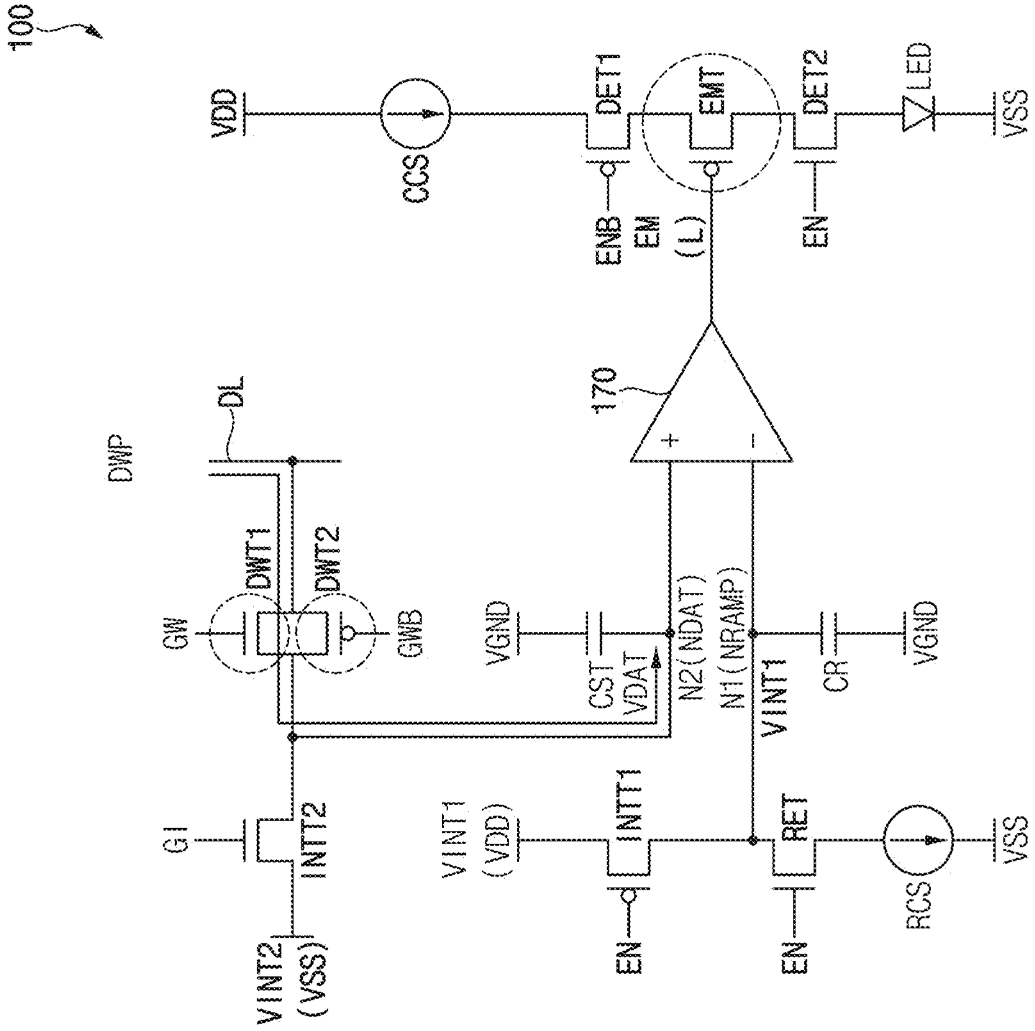
FIG. 10 is a circuit diagram for describing an example of an operation of a pixel in a data writing period, according to an embodiment.
Figure 11:
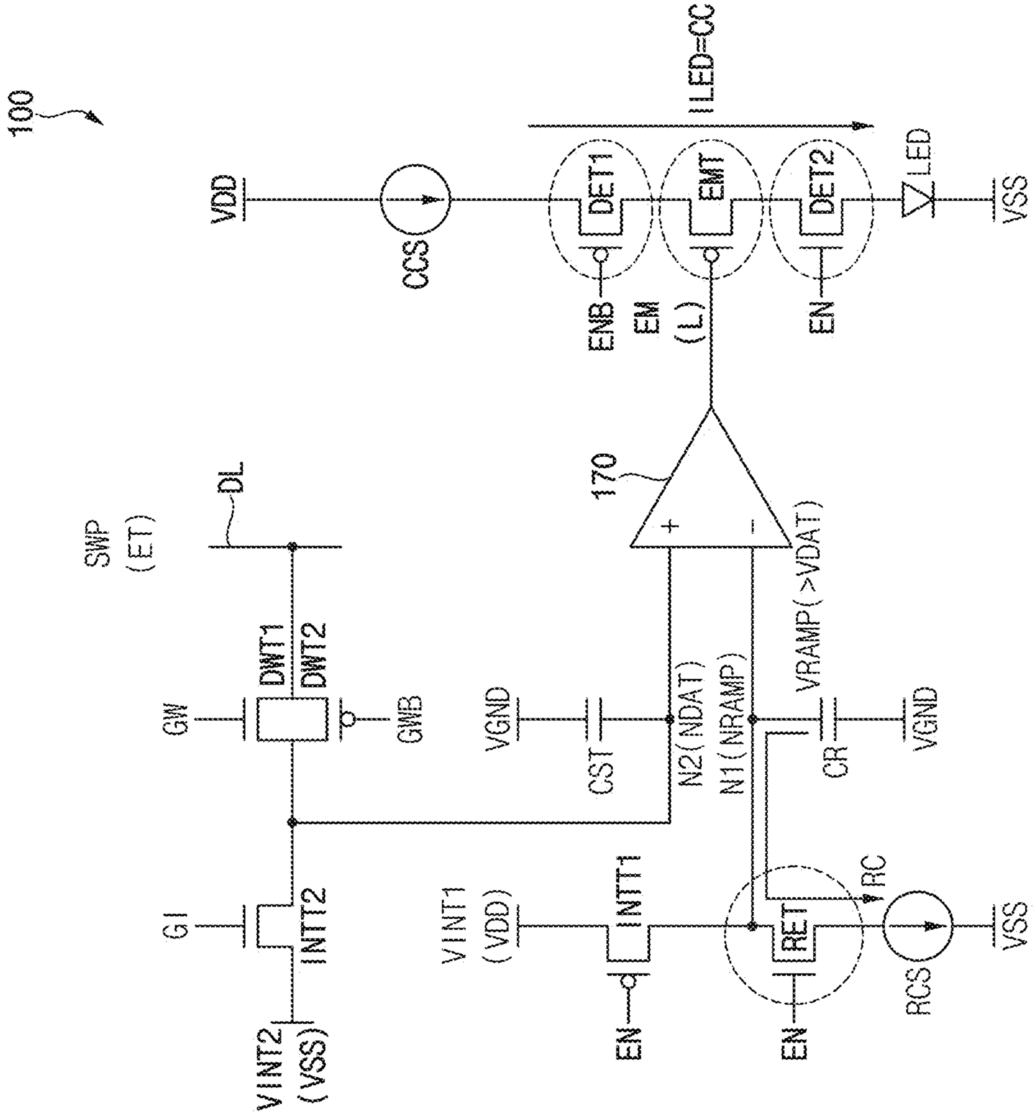
FIG. 11 is a circuit diagram for describing an example of an operation of a pixel in an emission time within a sweep period, according to an embodiment.
Figure 12:
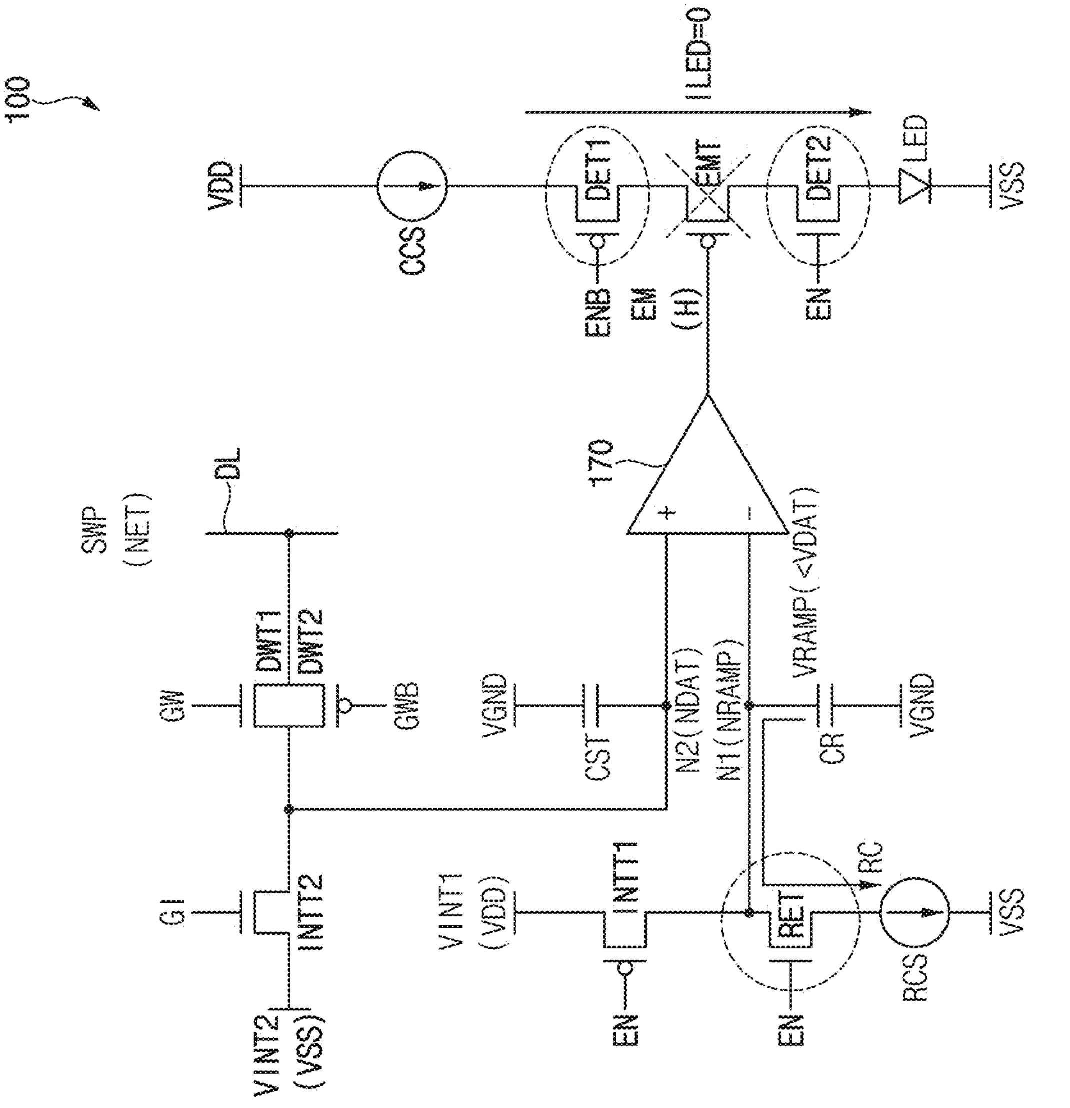
FIG. 12 is a circuit diagram for describing an example of an operation of a pixel in a non-emission time within a sweep period, according to an embodiment.

FIG. 8 is a timing diagram for describing an example of an operation of a pixel of FIG. 1, according to an embodiment, FIG. 9 is a circuit diagram for describing an example of an operation of a pixel in an initialization period, according to an embodiment, FIG. 10 is a circuit diagram for describing an example of an operation of a pixel in a data writing period, according to an embodiment, FIG. 11 is a circuit diagram for describing an example of an operation of a pixel in an emission time within a sweep period, according to an embodiment, and FIG. 12 is a circuit diagram for describing an example of an operation of a pixel in a non-emission time within a sweep period, according to an embodiment.

In an embodiment and referring to FIGS. 1 and 8, a frame period FP for a pixel 100 may include an initialization period INTP in which a first node N1 and/or a second node N2 are initialized, a data writing period DWP in which a data voltage VDAT is provided, and a sweep period SWP in which a ramp voltage VRAMP at the first node N1 gradually decreases. The sweep period SWP may include an emission time ET during which a light emitting element LED emits light, and a non-emission time NET during which the light emitting element LED does not emit light.

In an embodiment, in the initialization period INTP, an initialization signal GI may have a high level, and an enable signal EN and a writing signal GW may have a low level. Thus, as illustrated in FIG. 9, a first initialization transistor INTT1 may provide a first initialization voltage VINT1 to the first node N1 in response to the enable signal EN having the low level, and a second initialization transistor INTT2 may provide a second initialization voltage VINT2 to the second node N2 in response to the initialization signal GI having the high level. Accordingly, a voltage VN1 of the first node N1 may be initialized to the first initialization voltage VINT1, and a voltage VN2 of the second node N2 may be initialized to the second initialization voltage VINT2. The second initialization voltage VINT2 applied to a positive input terminal of a comparator 170 may be lower than the first initialization voltage VINT1 applied to the negative input terminal of the comparator 170, and thus the comparator 170 may generate an emission signal EM having a low level ("L"). Accordingly, in the initialization period INTP, the emission transistor EMT may be turned on in response to the emission signal EM having the low level ("L"). However, in the initialization period INTP, first and second driving enable transistors DET1 and DET2 may be turned off, and thus a constant current of a constant current source CCS may not be provided to the light emitting element LED.

In an embodiment, in the data writing period DWP, the writing signal GW may have the high level, and the enable signal EN and the initialization signal GI may have the low level. Thus, as illustrated in FIG. 10, a first data writing transistor DWT1 may transfer the data voltage VDAT of a data line DL to the second node N2 in response to the writing signal GW having the high level, a second data writing transistor DWT2 may transfer the data voltage VDAT of the data line DL to the second node N2 in response to an inverted writing signal GWB having the low level, and a storage capacitor CST may store the data voltage VDAT at the second node N2. The data voltage VDAT applied to the positive input terminal of the comparator 170 may be lower than the first initialization voltage VINT1 applied to the negative input terminal of the comparator 170, and thus the comparator 170 may generate the emission signal EM having the low level ("L"). However, in the data writing period DWP, the first and second driving enable transistors DET1 and DET2 may be turned off, and thus the constant current of the constant current source CCS may not be provided to the light emitting element LED.

In an embodiment, In the sweep period SWP, the enable signal EN may have the high level, and the initialization signal GI and the writing signal GW may have the low level. Thus, as illustrated in FIG. 11, a ramp enable transistor RET may provide a negative ramp current RC generated by a ramp current source RCS to the ramp capacitor CR in response to the enable signal EN having the high level. That is, a current may flow from a ramp capacitor CR to a line for transferring a second power supply voltage VSS. Accordingly, the ramp capacitor CR may provide the first node N1 with the ramp voltage VRAMP that gradually decreases from the first initialization voltage VINT1 based on the ramp current RC.

In an embodiment, during the emission time ET in which the ramp voltage VRAMP applied to the negative input terminal of the comparator 170 is higher than the data voltage VDAT applied to the positive input terminal of the comparator 170, the comparator 170 may generate the emission signal EM having the low level ("L"). That is, the comparator 170 may the emission signal EM having the low level ("L") during the emission time ET from a start time point of the sweep period SWP to a time point at which the ramp voltage VRAMP becomes the data voltage VDAT. Further, the first driving enable transistor DET1 may be turned on in response to an inverted enable signal ENB having the low level, the second driving enable transistor DET2 may be turned on in response to the enable signal EN having the high level, and the emission transistor EMT may be turned on in response to the emission signal EM having the low level ("L") during the emission time ET. Accordingly, during the emission time ET, the constant current source CCS may be connected to the light emitting element LED, and thus a current ILED applied to the light emitting element LED may be the constant current CC generated by the constant current source CCS. Thus, the light emitting element LED may emit light based on the constant current CC generated by the constant current source CCS during the emission time ET. As described above, since the emission time ET of the light emitting element LED ends at the time point when a voltage level of the ramp voltage VRAMP becomes a voltage level of the data voltage VDAT, a time length of the emission time ET may be determined according to the voltage level of the data voltage VDAT. That is, (the time length of) the emission time (ET) of the light emitting element LED of each pixel 100 may be determined according to the voltage level of the data voltage VDAT for the pixel 100. For example, in a case where image data for the pixel 100 represent a relatively high gray level, the data voltage VDAT may have a relatively low voltage level, the emission time ET may be relatively long, and luminance of the pixel 100 may be relatively high. In another embodiment, in a case where the image data for the pixel 100 represents a relatively low gray level, the data voltage VDAT may have a relatively high voltage level, the emission time ET may be relatively short, and the luminance of the pixel 100 may relatively low.

In an embodiment, as illustrated in FIG. 12, during the non-emission time NET in which the ramp voltage VRAMP applied to the negative input terminal of the comparator 170 is lower than the data voltage VDAT applied to the positive input terminal of the comparator 170, the comparator 170 may generate the emission signal EM having a high level ("H"). Thus, the emission transistor EMT may be turned off in response to the emission signal EM having the high level ("H") during the non-emission time NET. In this case, even if the first and second driving enable transistors DET1 and DET2 are turned on, the current ILED applied to the light emitting element LED may be about 0 A, and the light emitting element LED may not emit light.

In an embodiment and as described above, in the display device, the ramp voltage VRAMP may gradually decrease in the sweep period SWP in which the enable signal EN has the high level, the comparator 170 may generate the emission signal EM having the low level ("L") when the ramp voltage VRAMP is higher than the data voltage VDAT, and the emission transistor EMT may be implemented as the PMOS transistor that is turned on while the emission signal EM has the low level ("L"). Therefore, the emission time ET of the light emitting element LED may start at the start time point of the sweep period SWP, and may end when the voltage level of the ramp voltage VRAMP becomes equal to the voltage level of the data voltage VDAT.

Figure 13:
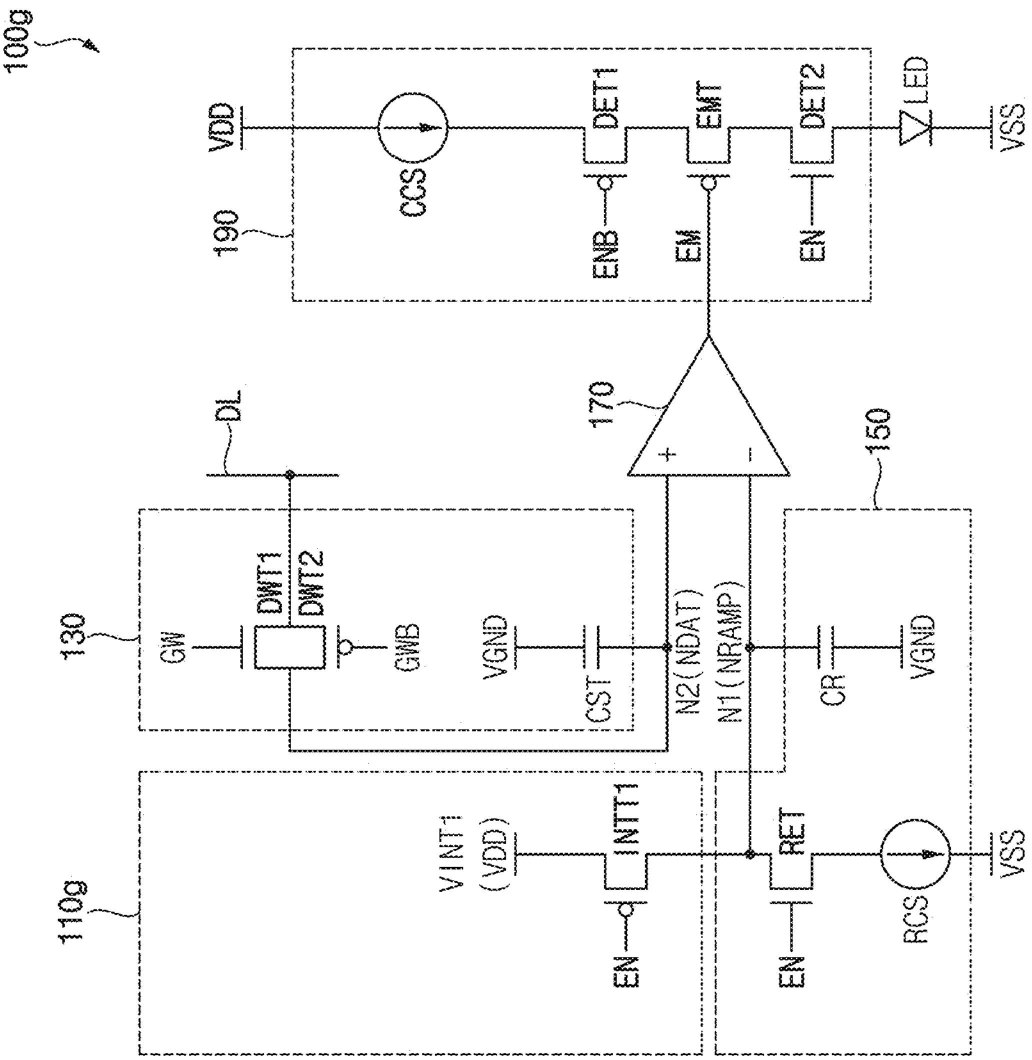
FIG. 13 is a circuit diagram illustrating another example of a pixel of a display device, according to an embodiment.
Figure 14:
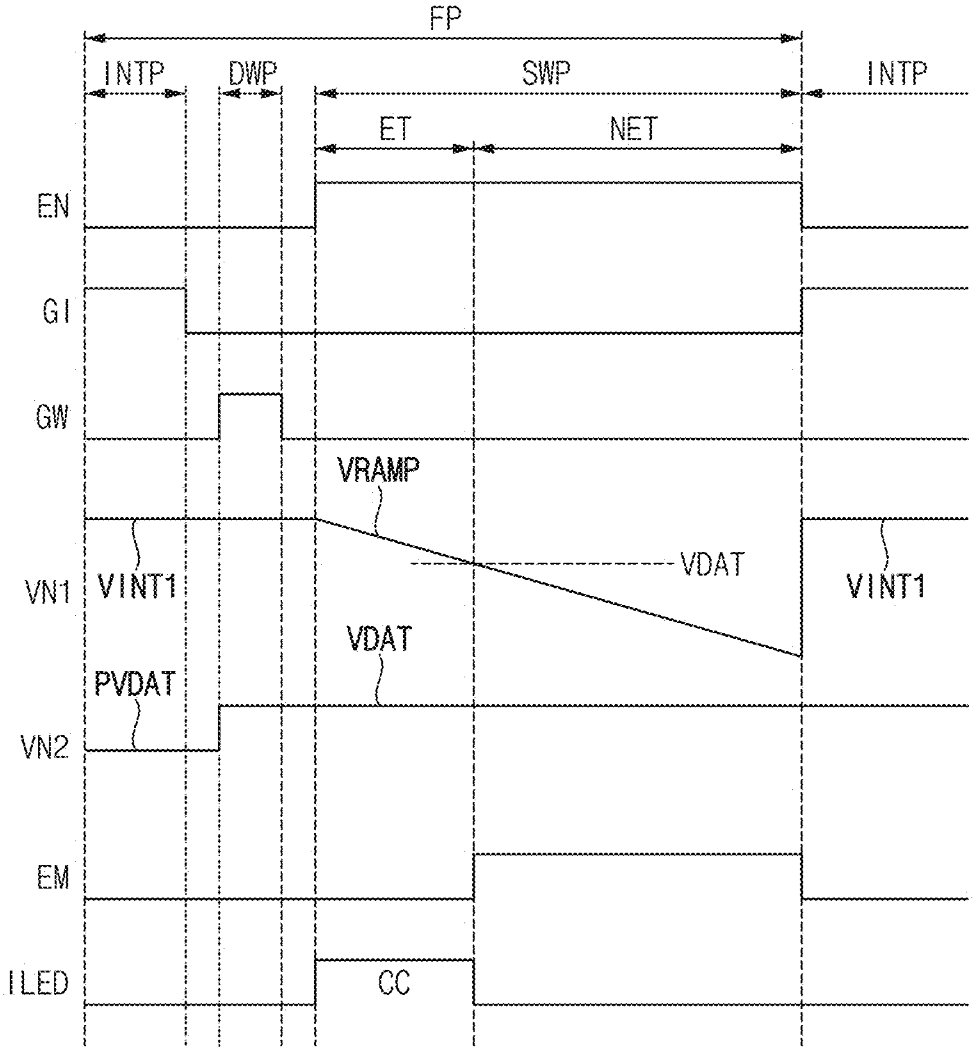
FIG. 14 is a timing diagram for describing an example of an operation of a pixel of FIG. 13, according to an embodiment.

FIG. 13 is a circuit diagram illustrating another example of a pixel of a display device, according to an embodiment, and FIG. 14 is a timing diagram for describing an example of an operation of a pixel of FIG. 13, according to an embodiment.

In an embodiment and referring to FIGS. 13 and 14, a pixel 100*g* may include an initialization circuit 110*g*, a data writing circuit 130, a ramp generating circuit 150, a comparator 170, a driving circuit 190 and a light emitting element LED. The pixel 100*g* of FIG. 13 may have a similar configuration to a pixel 100 of FIG. 1, except that the initialization circuit 110*g* may not include a second initialization transistor INTT2 for initializing a second node N2. Thus, the initialization circuit 110*g* may initialize a first node N1 in an initialization period INTP, but may not initialize the second node N2. That is, in the initialization period INTP, a voltage VN1 of the first node N1 may be initialized to a first initialization voltage VINT1, but a voltage VN2 of the second node N2 may be maintained as a data voltage PVDAT in a previous frame period.

Figure 15:
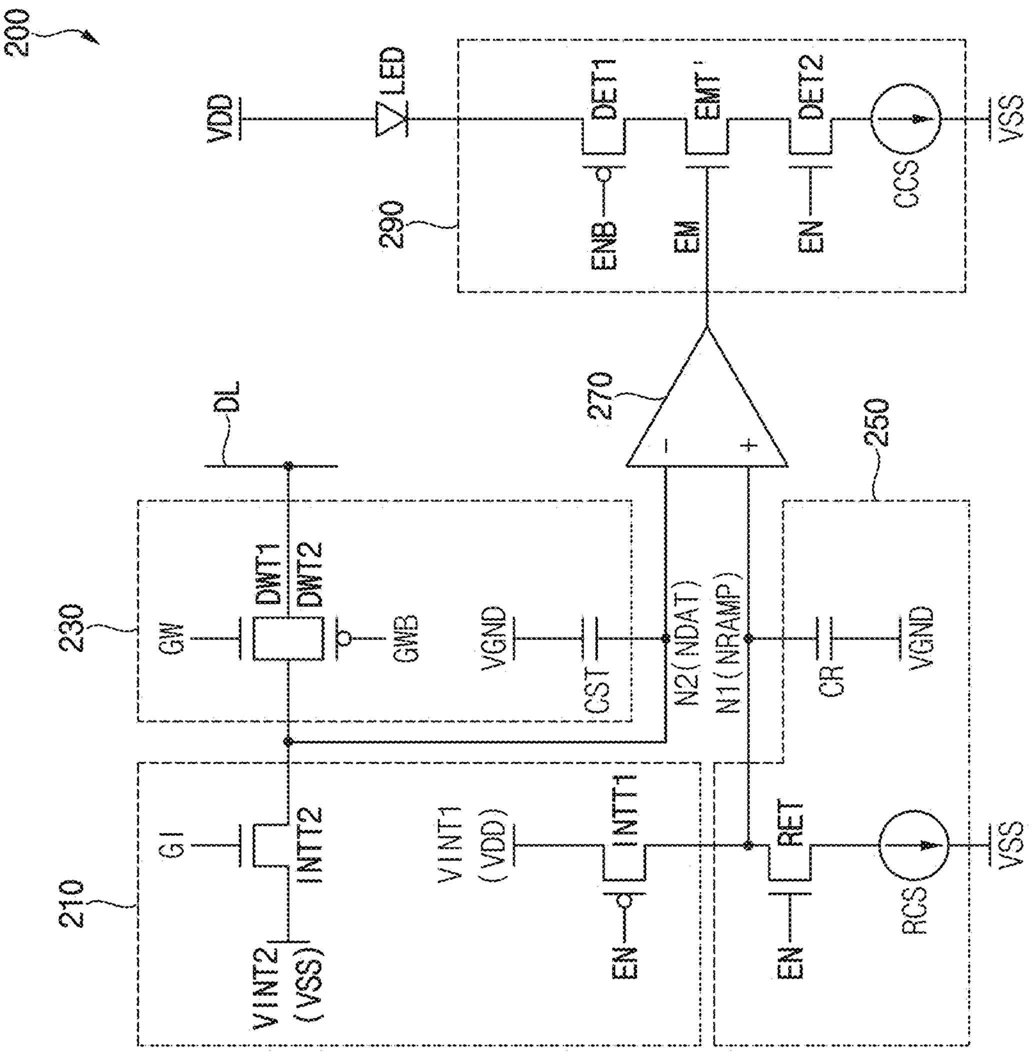
FIG. 15 is a circuit diagram illustrating a pixel of a display device, according to an embodiment.
Figure 16:
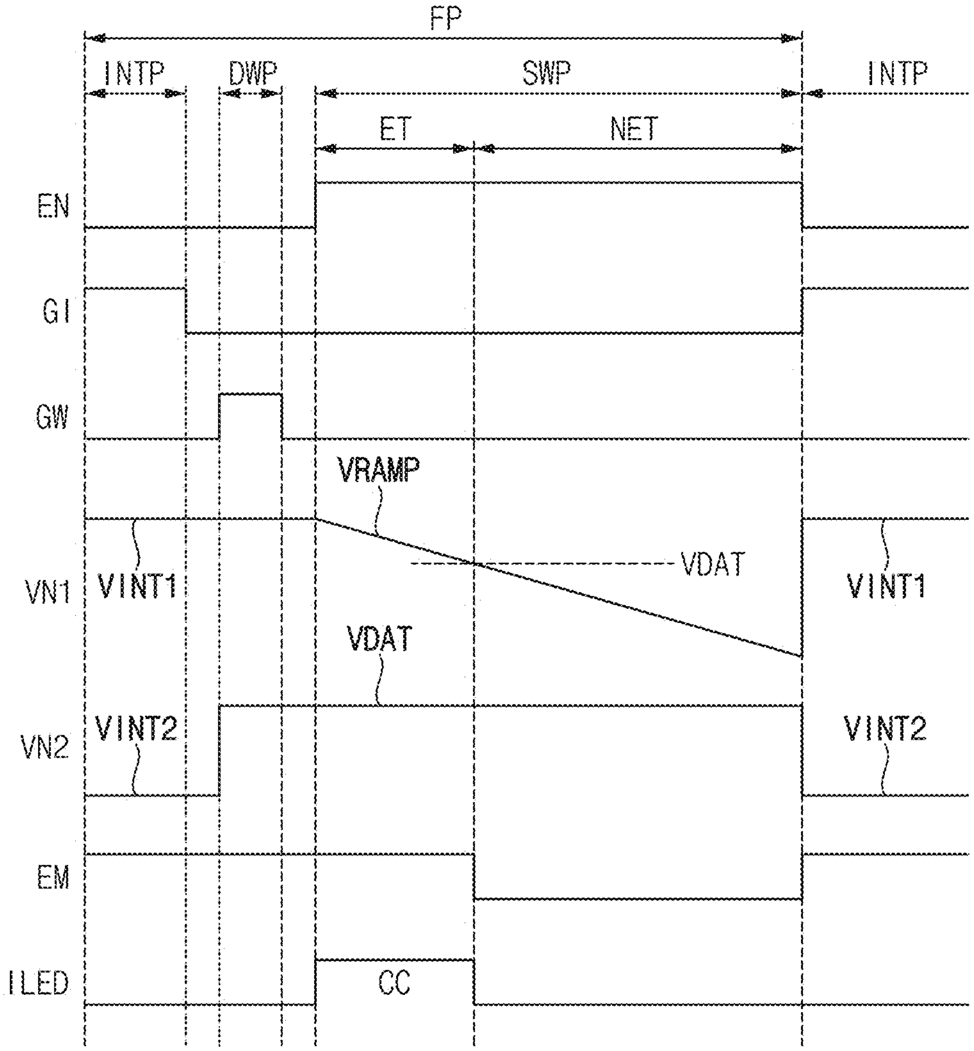
FIG. 16 is a timing diagram for describing an example of an operation of a pixel of FIG. 15, according to an embodiment.

FIG. 15 is a circuit diagram illustrating a pixel of a display device, according to an embodiment, and FIG. 16 is a timing diagram for describing an example of an operation of a pixel of FIG. 15, according to an embodiment.

In an embodiment and referring to FIGS. 15 and 16, a pixel 200 may include an initialization circuit 210, a data writing circuit 230, a ramp generating circuit 250, a comparator 270, a driving circuit 290 and a light emitting element LED. The pixel 200 of FIG. 15 may have a similar configuration to a pixel 100 of FIG. 1, except that a positive input terminal ("+") and a negative input terminal ("−") of the comparator 270 may be connected to a first node N1 and a second node N2, respectively, and an emission transistor EMT' may be implemented as an NMOS transistor. Although FIG. 15 illustrates an example in which the light emitting element LED is directly connected to a line for transferring a first power supply voltage VDD, and a constant current source CCS is directly connected to a line for transferring a second power supply voltage VSS, the positions of the constant current source CCS and the light emitting element LED are not limited to the example of FIG. 15. For example, in the pixel 200, as illustrated in FIG. 1, the constant current source CCS may be directly connected to the line for transferring the first power supply voltage VDD, and the light emitting element LED may be connected to the line for transferring the second power supply voltage VSS.

In an embodiment, the initialization circuit 210 may include a first initialization transistor INTT1 including a gate for receiving an enable signal EN, a first terminal for receiving a first initialization voltage VINT1, and a second terminal connected to the first node N1, and a second initialization transistor INTT2 including a gate for receiving an initialization signal GI, a first terminal for receiving a second initialization voltage VINT2, and a second terminal connected to the second node N2.

In an embodiment, the data writing circuit 230 may include a first data writing transistor DWT1 including a gate for receiving a writing signal GW, a first terminal connected to a data line DL, and a second terminal connected to the second node N2, a second data writing transistor DWT2 including a gate for receiving an inverted writing signal GWB, a first terminal connected to the data line DL, and a second terminal connected to the second node N2, and a storage capacitor CST including a first electrode connected to the second node N2, and a second electrode for receiving a ground voltage VGND. Although FIG. 15 illustrates an example in which the data writing circuit 230 includes both of the first and second data writing transistors DWT1 and DWT2, in an embodiment, the data writing circuit 230 may include only one of the first and second data writing transistors DWT1 and DWT2.

In an embodiment, the ramp generating circuit 250 may include a ramp enable transistor RET including a gate for receiving the enable signal EN, a first terminal connected to the first node N1, a second terminal, and a ramp current source RCS connected between the second terminal of the ramp enable transistor RET and the line for transferring the second power supply voltage VSS, and a ramp capacitor CR including a first electrode connected to the first node N1, and a second electrode for receiving the ground voltage VGND.

In an embodiment, the comparator 270 may include the positive input terminal ("+") connected to the first node N1, the negative input terminal ("−") connected to the second node N2, and an output terminal for outputting an emission signal EM. Thus, in a sweep period SWP, the comparator 270 may generate the emission signal EM having a high level when a ramp voltage VRAMP applied to the positive input terminal is higher than a data voltage VDAT applied to the negative input terminal.

In an embodiment, the driving circuit 290 may include a first driving enable transistor DET1 including a gate for receiving an inverted enable signal ENB, a first terminal, and a second terminal, the emission transistor EMT' including a gate for receiving the emission signal EM, a first terminal connected to the second terminal of the first driving enable transistor DET1, and a second terminal, a second driving enable transistor DET2 including a gate for receiving the enable signal EN, a first terminal connected to the second terminal of the emission transistor EMT', and a constant current source CCS connected between the second terminal of the second driving enable transistor DET2 and the line for transferring the second power supply voltage VSS.

In an embodiment, the light emitting element LED may include an anode connected to the line for transferring the first power supply voltage VDD, and a cathode connected to the first terminal of the first driving enable transistor DET1.

In an embodiment and as illustrated in FIGS. 15 and 16, the ramp voltage VRAMP may gradually decrease in the sweep period SWP in which the enable signal EN has a high level, the comparator 270 may generates the emission signal EM having a high level when the ramp voltage VRAMP is higher than the data voltage VDAT, and the emission transistor EMT' may be implemented as the NMOS transistor that is turned on while the emission signal EM has the high level. Thus, the emission time ET of the light emitting element LED may start at a start time point of the sweep period SWP, and may end when a voltage level of the gradually decreasing ramp voltage VRAMP becomes equal to a voltage level of the data voltage VDAT.

Figure 17:
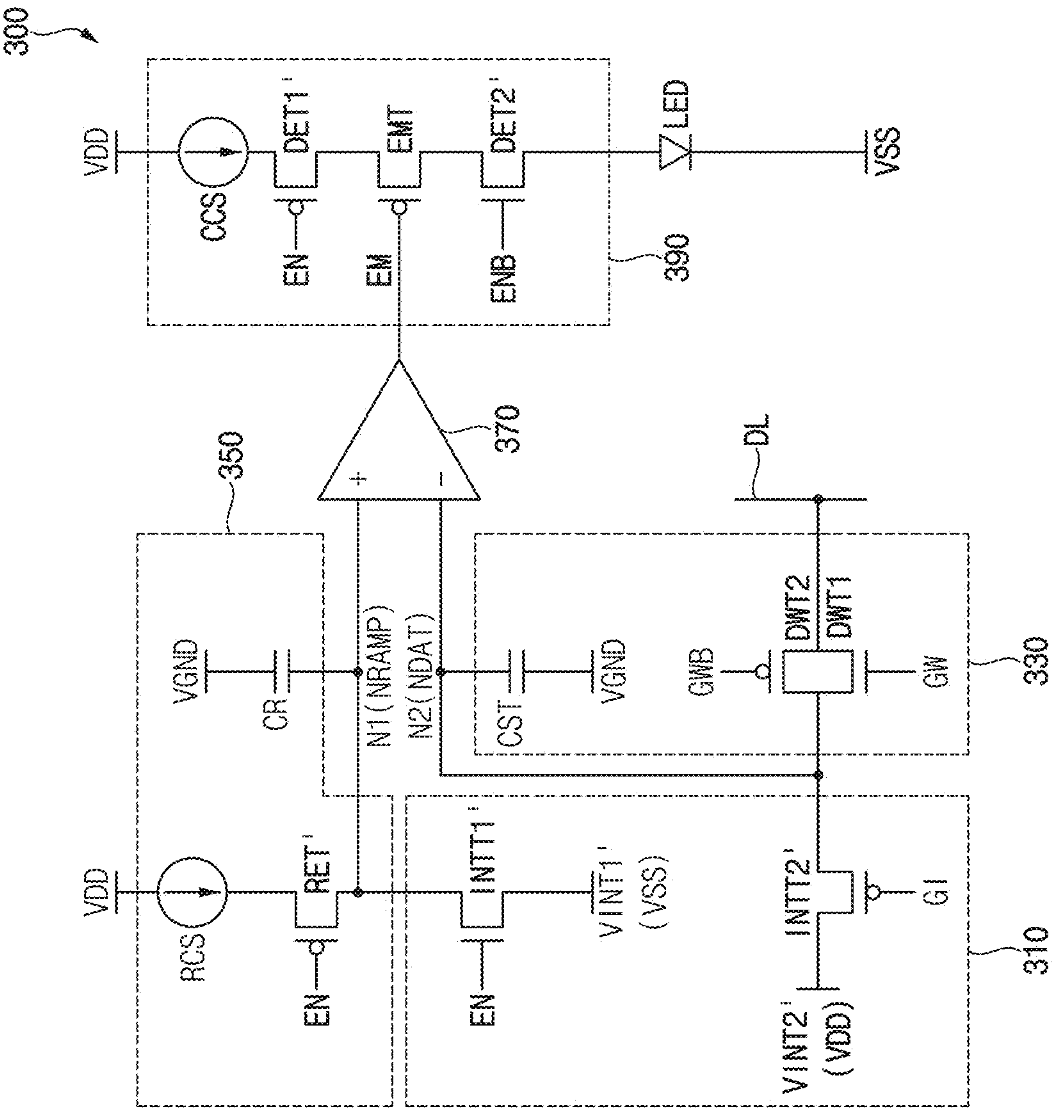
FIG. 17 is a circuit diagram illustrating a pixel of a display device, according to an embodiment.
Figure 18:
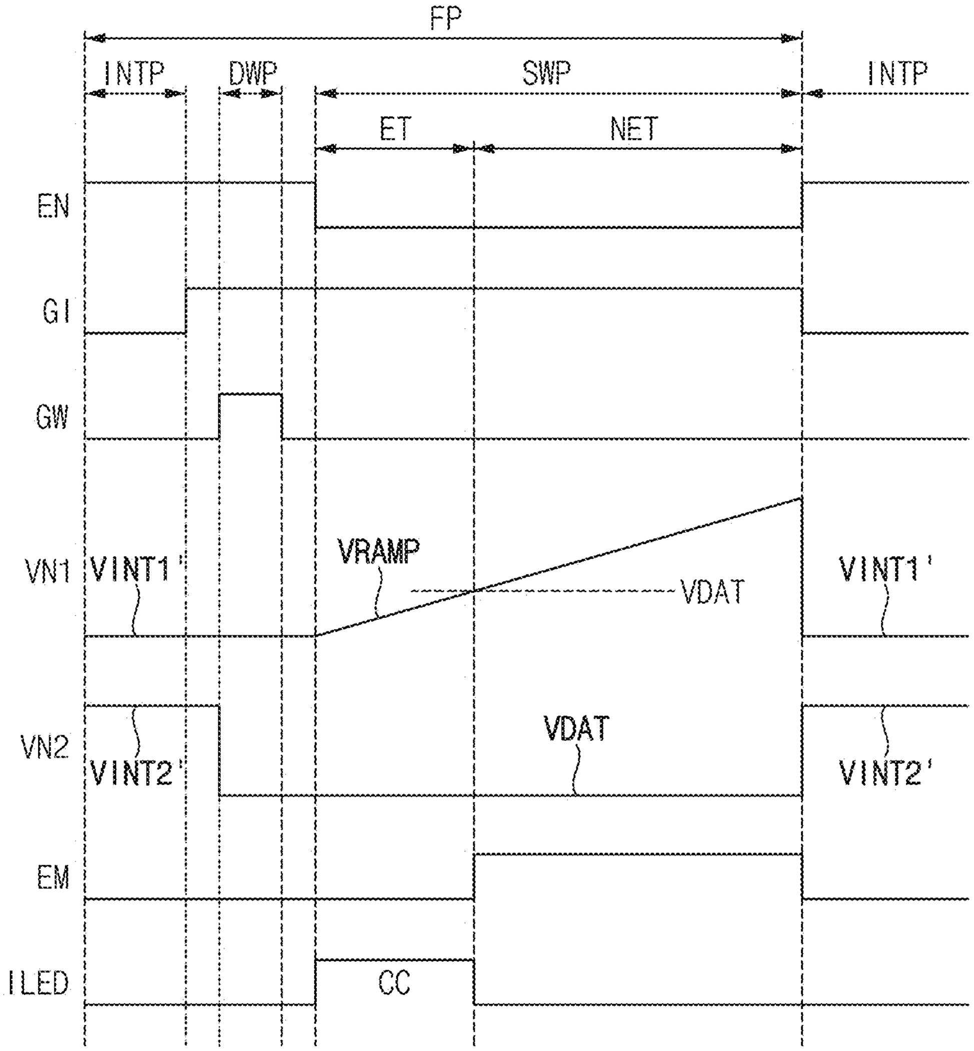
FIG. 18 is a timing diagram for describing an example of an operation of a pixel of FIG. 17, according to an embodiment.

FIG. 17 is a circuit diagram illustrating a pixel of a display device, according to an embodiment, and FIG. 18 is a timing diagram for describing an example of an operation of a pixel of FIG. 17, according to an embodiment.

In an embodiment and referring to FIGS. 17 and 18, a pixel 300 may include an initialization circuit 310, a data writing circuit 330, a ramp generating circuit 350, a comparator 370, a driving circuit 390 and a light emitting element LED. The pixel 300 of FIG. 17 may have a similar configuration to a pixel 100 of FIG. 1, except that a first initialization voltage VINT1' may be lower than a second initialization voltage VINT2', a positive input terminal ("+") and a negative input terminal ("−") of the comparator 370 may be connected to a first node N1 and a second node N2, respectively, and a ramp voltage VRAMP may gradually increase in a sweep period SWP.

In an embodiment, the initialization circuit 310 may include a first initialization transistor INTT1' including a gate that receives an enable signal EN, a first terminal for receiving a first initialization voltage VINT1', and a second terminal connected to the first node N1, and a second initialization transistor INTT2' including a gate for receiving an initialization signal GI, a first terminal for receiving a second initialization voltage VINT2', and a second terminal connected to the second node N2. In some embodiments, the first initialization voltage VINT1' may be a second power supply voltage VSS, and the second initialization voltage VINT2' may be a first power supply voltage VDD. In other embodiments, the first initialization voltage VINT1' may be different from the second power supply voltage VSS, and the second initialization voltage VINT2' may be different from the first power supply voltage VDD. For example, the first initialization voltage VINT1' may be greater than or equal to the second power supply voltage VSS and lower than or equal to a lowest data voltage, and the second initialization voltage VINT2' may be lower than or equal to the first power supply voltage VDD and higher than or equal to a highest data voltage.

Further, in an embodiment, the first initialization transistor INTT1' may be implemented as an NMOS transistor, and the second initialization transistor INTT2' may be implemented as a PMOS transistor. The enable signal EN may have a high level in an initialization period INTP and a data writing period DWP, and may have a low level in a sweep period SWP. The initialization signal GI may have the low level in the initialization period INTP, and may have the high level in the data writing period DWP and the sweep period SWP. Thus, the first initialization transistor INTT1' may be turned on in the initialization period INTP and the data writing period DWP, and the second initialization transistor INTT2' may be turned on in the initialization period INTP.

In an embodiment, the data writing circuit 330 may include a first data writing transistor DWT1 including a gate for receiving a writing signal GW, a first terminal connected to a data line DL, and a second terminal connected to the second node N2, a second data writing transistor DWT2 including a gate for receiving an inverted writing signal GWB, a first terminal connected to the data line DL, and a second terminal connected to the second node N2, and a storage capacitor CST including a first electrode connected to the second node N2, and a second electrode for receiving a ground voltage VGND. Although FIG. 17 illustrates an example in which the data writing circuit 330 includes both of the first and second data writing transistors DWT1 and DWT2, in some embodiments, the data writing circuit 330 may include only one of the first and second data writing transistors DWT1 and DWT2.

In an embodiment, the ramp generating circuit 350 may include a ramp current source RCS connected to a line for transferring the first power supply voltage VDD, a ramp enable transistor RET' including a gate for receiving the enable signal EN, a first terminal connected to the ramp current source RCS, and a second terminal connected to the first node N1, and a ramp capacitor CR including a first electrode connected to the first node N1, and a second electrode for receiving the ground voltage VGND. The ramp enable transistor RET' may be implemented as a PMOS transistor, and may be turned on during the sweep period SWP in which the enable signal EN has the low level. Further, during the sweep period SWP, the ramp current source RCS may provide a positive ramp current to the ramp capacitor CR. That is, during the sweep period SWP, the ramp current may flow from the line for transferring the first power supply voltage VDD to the ramp capacitor CR. Accordingly, during the sweep period SWP, a voltage of the first node N1 to which the ramp capacitor CR is connected may gradually increase from the first initialization voltage VINT1. Further, in some embodiments, the gradually increasing voltage may be referred to as a ramp-up voltage.

In an embodiment, the comparator 370 may include the positive input terminal ("+") connected to the first node N1, the negative input terminal ("−") connected to the second node N2, and an output terminal for outputting an emission signal EM. Thus, in the sweep period SWP, the comparator 370 may generate the emission signal EM having the low level when the ramp voltage VRAMP applied to the positive input terminal is lower than the data voltage VDAT applied to the negative input terminal.

In an embodiment, the driving circuit 390 may include a constant current source CCS connected to the line for transferring the first power supply voltage VDD, a first driving enable transistor DET1' including a gate for receiving the enable signal EN, a first terminal connected to the constant current source CCS, and a second terminal, an emission transistor EMT including a gate for receiving the emission signal EM, a first terminal connected to the second terminal of the first driving enable transistor DET1', and a second terminal, a second driving enable transistor DET2' including a gate for receiving an inverted enable signal ENB, a first terminal connected to the second terminal of the emission transistor EMT, and a second terminal.

In an embodiment, the light emitting element LED may include an anode connected to the second terminal of the second driving enable transistor DET2', and a cathode connected to a line for transferring the second power supply voltage VSS.

In an embodiment and as illustrated in FIGS. 17 and 18, the ramp voltage VRAMP may gradually increase in the sweep period SWP in which the enable signal EN has the low level, the comparator 370 may generate the emission signal EM having the low level when the ramp voltage VRAMP is lower than the data voltage VDAT, and the emission transistor EMT may be turned on while the emission signal EM has the low level. Thus, an emission time ET of the light emitting element LED may start at a start time point of the sweep period SWP, and may end when a voltage level of the gradually increasing ramp voltage becomes equal to a voltage level of the data voltage VDAT.

Figure 19:
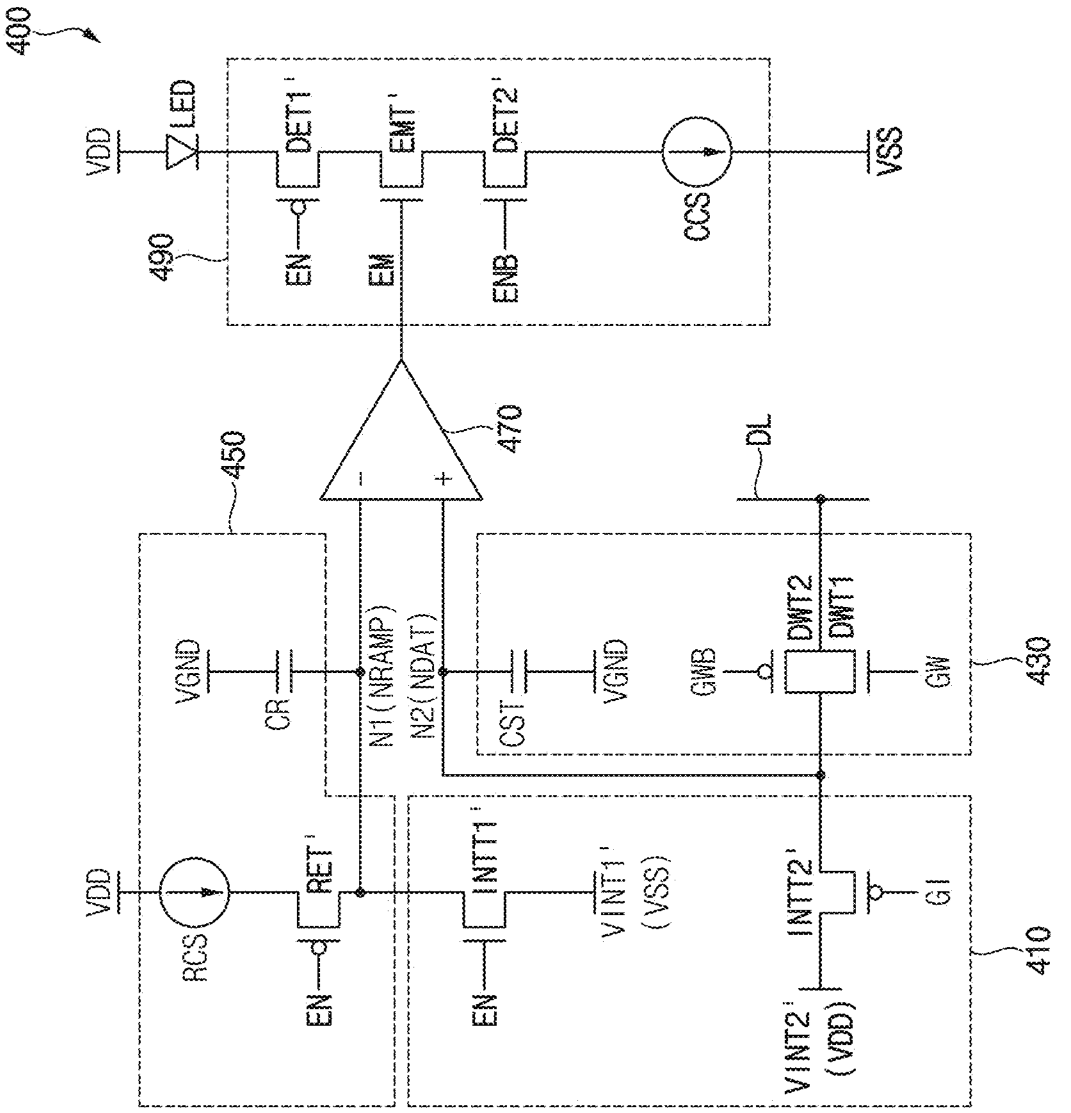
FIG. 19 is a circuit diagram illustrating a pixel of a display device, according to an embodiment.
Figure 20:
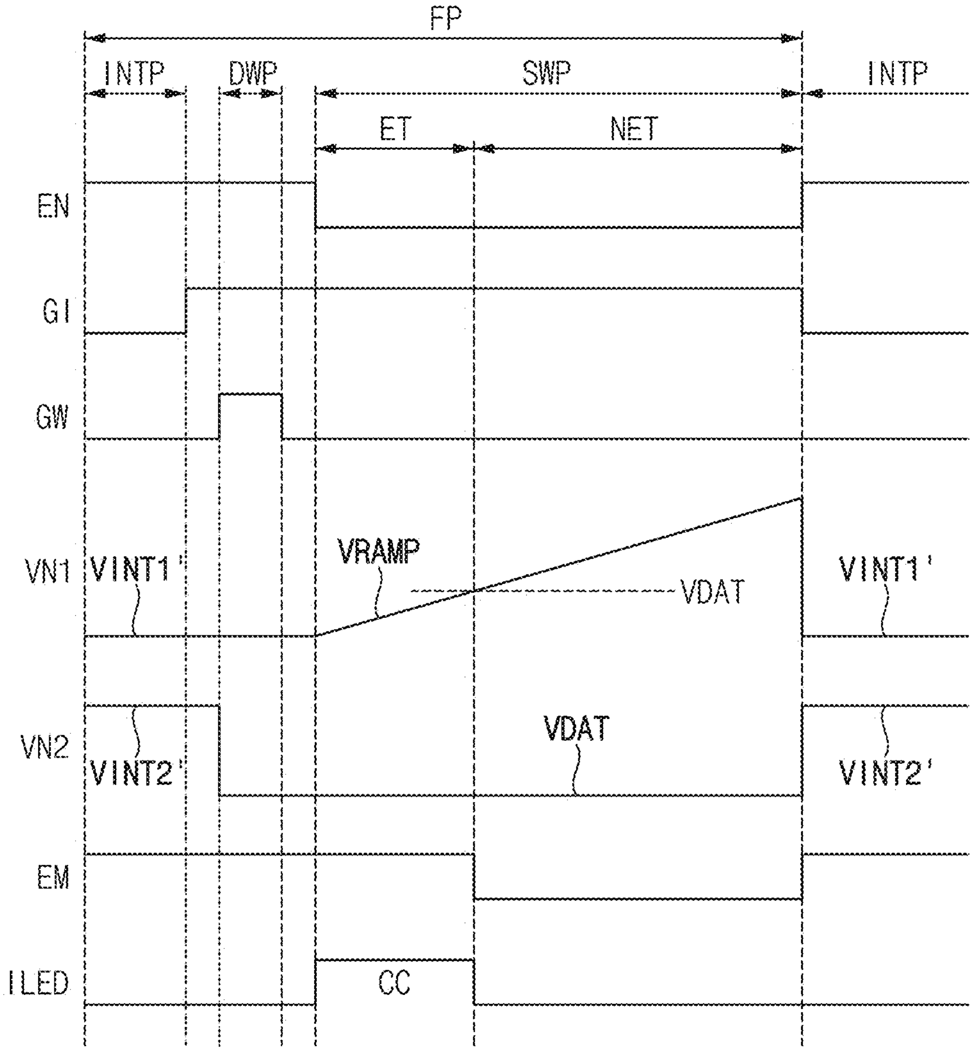
FIG. 20 is a timing diagram for describing an example of an operation of a pixel of FIG. 19, according to an embodiment.

FIG. 19 is a circuit diagram illustrating a pixel of a display device, according to an embodiment, and FIG. 20 is a timing diagram for describing an example of an operation of a pixel of FIG. 19, according to an embodiment.

In an embodiment and referring to FIGS. 19 and 20, a pixel 400 may include an initialization circuit 410, a data writing circuit 430, a ramp generating circuit 450, a comparator 470, a driving circuit 490 and a light emitting element LED. The pixel 400 of FIG. 19 may have a similar configuration to a pixel 300 of FIG. 17, except that a positive input terminal ("+") and negative input terminal ("−") of the comparator 470 may be connected to a second node N2 and a first node N1, respectively, and an emission transistor EMT' may be implemented as an NMOS transistor. Further, in the pixel 400 of FIG. 19, positions of a constant current source CCS and the light emitting element LED may be exchanged.

In an embodiment, the initialization circuit 410 may include a first initialization transistor INTT1' including a gate for receiving an enable signal EN, a first terminal for receiving a first initialization voltage VINT1', and a second terminal connected to the first node N1, and a second initialization transistor INTT2' including a gate for receiving an initialization signal GI, a first terminal for receiving a second initialization voltage VINT2', and a second terminal connected to the second node N2.

In an embodiment, the data writing circuit 430 may include a first data writing transistor DWT1 including a gate for receiving a writing signal GW, a first terminal connected to a data line DL, and a second terminal connected to the second node N2, a second data writing transistor DWT2 including a gate for receiving an inverted writing signal GWB, a first terminal connected to the data line DL, and a second terminal connected to the second node N2, and a storage capacitor CST including a first electrode connected to the second node N2, and a second electrode for receiving a ground voltage VGND. Although FIG. 19 illustrates an example in which the data writing circuit 430 includes both of the first and second data writing transistors DWT1 and DWT2, in some embodiments, the data writing circuit 430 may include only one of the first and second data writing transistors DWT1 and DWT2.

In an embodiment, the ramp generating circuit 450 may include a ramp current source RCS connected to a line for transferring a first power supply voltage VDD, a ramp enable transistor RET' including a gate for receiving the enable signal EN, a first terminal connected to the ramp current source RCS, and a second terminal connected to the first node N1, and a ramp capacitor CR including a first electrode connected to the first node N1, and a second electrode for receiving the ground voltage VGND.

In an embodiment, the comparator 470 may include the positive input terminal ("+") connected to the second node N2, the negative input terminal ("−") connected to the first node N1, and an output terminal for outputting an emission signal EM. Thus, in a sweep period SWP, the comparator 470 may generate the emission signal EM having a high level when a ramp voltage VRAMP applied to the negative input terminal is lower than a data voltage VDAT applied to the positive input terminal.

In an embodiment, the driving circuit 490 may include a first driving enable transistor DET1' including a gate for receiving the enable signal EN, a first terminal, and a second terminal, the emission transistor EMT' including a gate for receiving the emission signal EM, a first terminal connected to the second terminal of the first driving enable transistor DET1', and a second terminal, a second driving enable transistor DET2' including a gate for receiving an inverted enable signal ENB, a first terminal connected to the second terminal of the emission transistor EMT', and a second terminal, and a constant current source CCS connected between the second terminal of the second driving enable transistor DET2' and a line for transferring a second power supply voltage VSS.

In an embodiment, the light emitting element LED may include an anode connected to the line for transferring the first power supply voltage VDD, and a cathode connected to the first terminal of the first driving enable transistor DET1'.

In an embodiment and as illustrated in FIGS. 19 and 20, the ramp voltage VRAMP may gradually increase in the sweep period SWP in which the enable signal EN has a low level, the comparator 470 may generate the emission signal EM having a high level when the ramp voltage VRAMP is lower than the data voltage VDAT, and the emission transistor EMT' may be turned on while the emission signal EM has the high level. Thus, an emission time ET of the light emitting element LED may start at a start time point of the sweep period SWP, and may end when a voltage level of the gradually increasing ramp voltage becomes equal to a voltage level of the data voltage VDAT.

Figure 21:
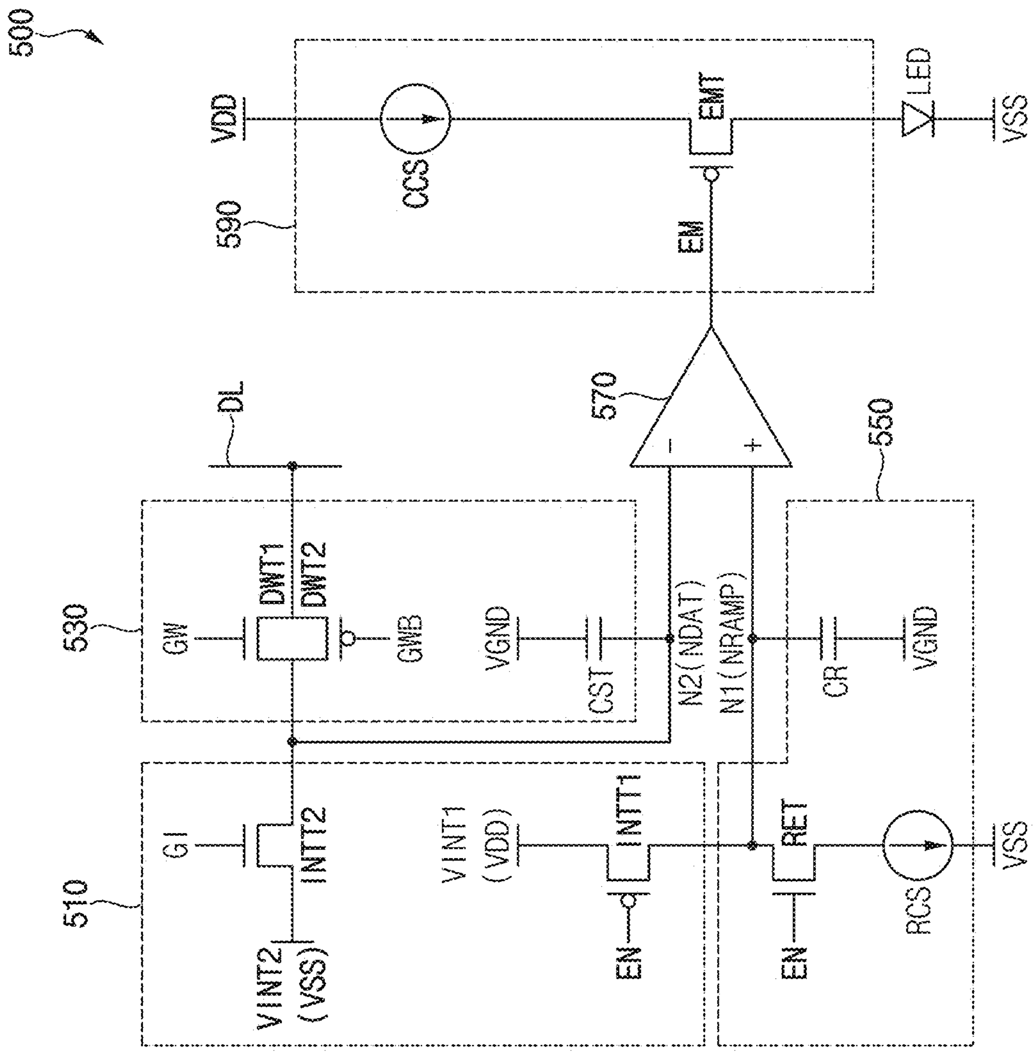
FIG. 21 is a circuit diagram illustrating a pixel of a display device, according to an embodiment.
Figure 22:
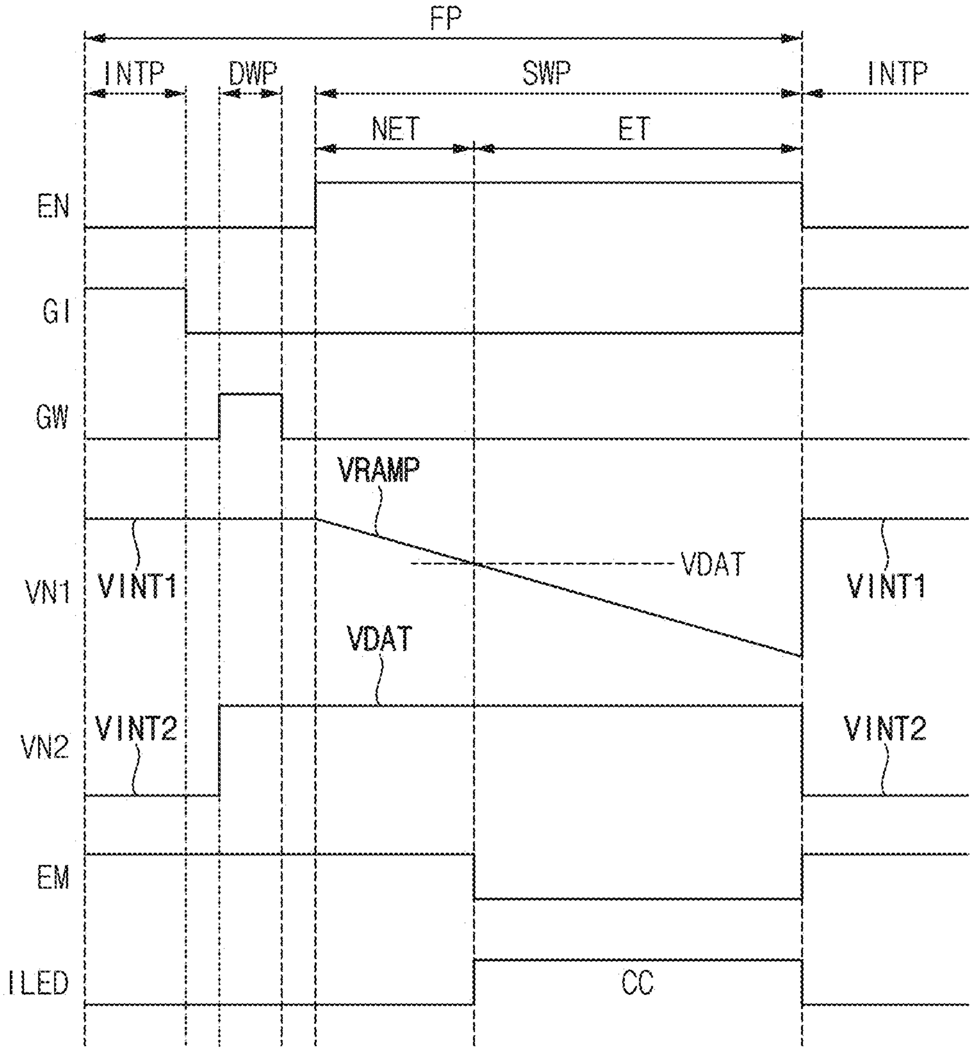
FIG. 22 is a timing diagram for describing an example of an operation of a pixel of FIG. 21, according to an embodiment.

FIG. 21 is a circuit diagram illustrating a pixel of a display device, according to an embodiment, and FIG. 22 is a timing diagram for describing an example of an operation of a pixel of FIG. 21, according to an embodiment.

In an embodiment and referring to FIGS. 21 and 22, a pixel 500 may include an initialization circuit 510, a data writing circuit 530, a ramp generating circuit 550, a comparator 570, a driving circuit 590 and a light emitting element LED. The pixel 500 of FIG. 21 have a similar configuration to a pixel 100 of FIG. 1, that a positive input terminal ("+") and a negative input terminal ("−") of the comparator 570 may be connected to a first node N1 and a second node N2, respectively.

In an embodiment, the initialization circuit 510 may include a first initialization transistor INTT1 including a gate for receiving an enable signal EN, a first terminal for receiving a first initialization voltage VINT1, and a second terminal connected to the first node N1, and a second initialization transistor INTT2 including a gate for receiving an initialization signal GI, a first terminal for receiving a second initialization voltage VINT2, and a second terminal connected to the second node N2.

In an embodiment, the data writing circuit 530 may include a first data writing transistor DWT1 including a gate for receiving a writing signal GW, a first terminal connected to a data line DL, and a second terminal connected to the second node N2, a second data writing transistor DWT2 including a gate for receiving an inverted writing signal GWB, a first terminal connected to the data line DL, and a second terminal connected to the second node N2, and a storage capacitor CST including a first electrode connected to the second node N2, and a second electrode for receiving a ground voltage VGND. Although FIG. 21 illustrates an example in which the data writing circuit 530 includes both of the first and second data writing transistors DWT1 and DWT2, in some embodiments, the data writing circuit 530 may include only one of the first and second data writing transistors DWT1 and DWT2.

In an embodiment, the ramp generating circuit 550 may include a ramp enable transistor RET including a gate for receiving the enable signal EN, a first terminal connected to the first node N1, and a second terminal, a ramp current source RCS connected between the second terminal of the ramp enable transistor RET and a line for transferring a second power supply voltage VSS, and a ramp capacitor CR including a first electrode connected to the first node N1, and a second electrode for receiving the ground voltage VGND.

In an embodiment, the comparator 570 may include the positive input terminal ("+") connected to the first node N1, the negative input terminal ("−") connected to the second node N2, and an output terminal for outputting an emission signal EM. Thus, in a sweep period SWP, the comparator 570 may generate the emission signal EM having a low level when a ramp voltage VRAMP applied to the positive input terminal is lower than a data voltage VDAT applied to the negative input terminal.

In an embodiment, the driving circuit 590 may include a constant current source CCS connected to a line for transferring a first power supply voltage VDD, and an emission transistor EMT including a gate for receiving the emission signal EM, a first terminal connected to the constant current source CCS, and a second terminal. In some embodiments, as illustrated in FIG. 21, the driving circuit 590 may not include a driving enable transistor. In other embodiments, the driving circuit 590 may further include at least one driving enable transistor DET1 and DET2 as illustrated in FIG. 1.

In an embodiment, the light emitting element LED may include an anode connected to the second terminal of the emission transistor EMT, and a cathode connected to the line for transferring the second power supply voltage VSS.

In an embodiment, each frame period FP may include an initialization period INTP in which the initialization signal GI may have a high level, and the enable signal EN and the writing signal GW have a low level, a data writing period DWP in which the writing signal GW may have the high level, and the enable signal EN and the initialization signal GI may have the low level, and the sweep period SWP in which the enable signal EN may have the high level, and the initialization signal GI and the writing signal GW may have the low level.

In an embodiment, in the initialization period INTP, the first initialization transistor INTT1 may provide the first initialization voltage VINT1 to the first node N1 in response to the enable signal EN having the low level, and the second initialization transistor INTT2 may provide the second initialization voltage VINT2 to the second node N2 in response to the initialization signal GI having the high level.

In an embodiment, in the data write period DWP, the first data writing transistor DWT1 may provide the data voltage VDAT to the second node N2 in response to the writing signal GW having the high level, the second data writing transistor DWT2 may provide the data voltage VDAT to the second node N2 in response to the inverted writing signal GWB having the low level, and the storage capacitor CST may store the data voltage VDAT at the second node N2.

In an embodiment, in the sweep period SWP, the ramp enable transistor RET may provide a ramp current generated by the ramp current source RCS to the ramp capacitor CR in response to the enable signal EN having the high level, the ramp capacitor CR may provide the first node N1 with the ramp voltage VRAMP that gradually decreases from the first initialization voltage VINT1 based on the ramp current, the comparator 570 may generate the emission signal EM having the low level during an emission time ET from a time point at which the ramp voltage VRAMP becomes the data voltage VDAT to an end time point of the sweep period SWP, the emission transistor EMT may be turned on in response to the emission signal EM having the low level during the emission time ET, and the light emitting element LED may emit light based on a constant current generated by the constant current source CCS during the emission time ET.

In an embodiment and as illustrated in FIGS. 21 and 22, the ramp voltage VRAMP may gradually decrease in the sweep period SWP in which the enable signal EN has a high level, the comparator 570 may generate the emission signal EM having a low level when the ramp voltage VRAMP is lower than the data voltage VDAT, and the emission transistor EMT may be turned on while the emission signal EM has the low level. Thus, the emission time ET of the light emitting element LED may start when a voltage level of the gradually decreasing ramp voltage VRAMP becomes equal to a voltage level of the data voltage VDAT, and may end at an end time point of the sweep period SWP.

Figure 23:
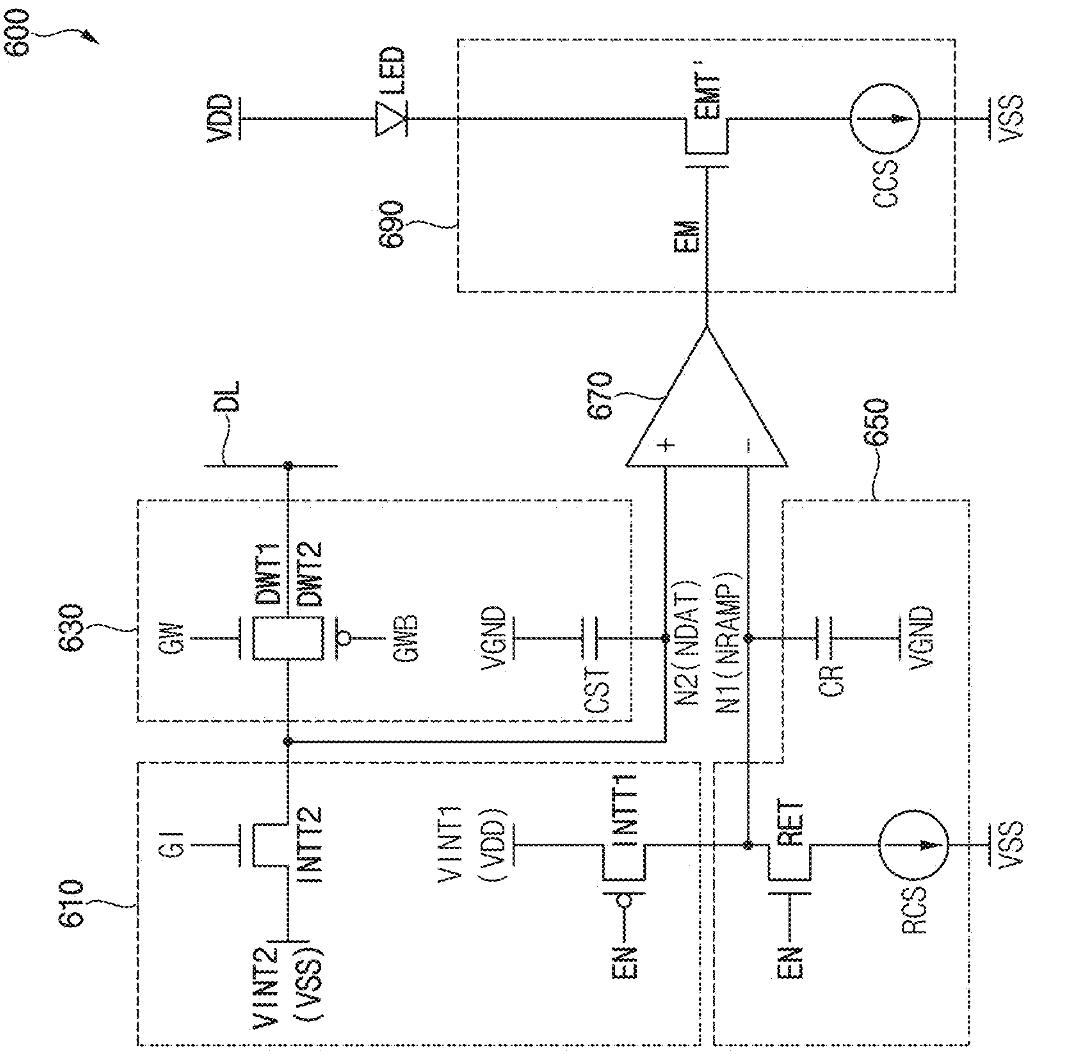
FIG. 23 is a circuit diagram illustrating a pixel of a display device, according to an embodiment.
Figure 24:
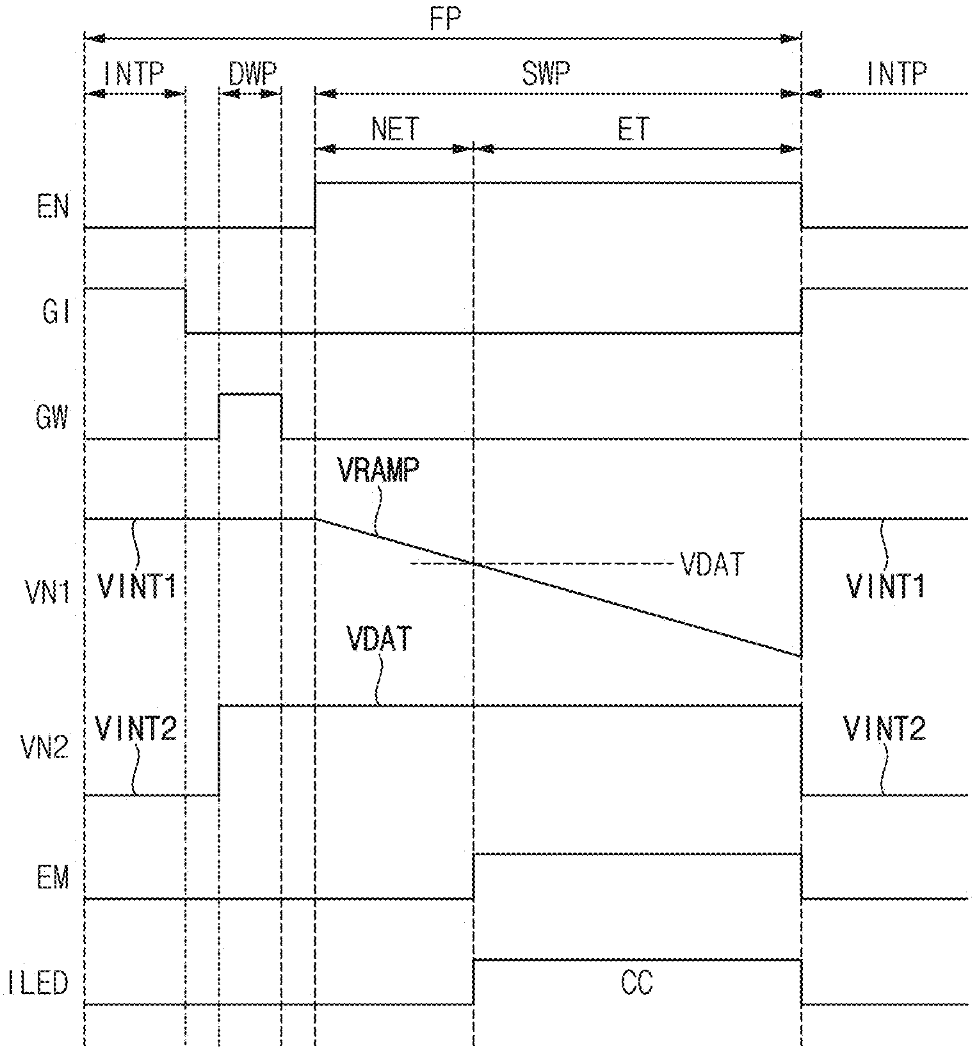
FIG. 24 is a timing diagram for describing an example of an operation of a pixel of FIG. 23, according to an embodiment.

FIG. 23 is a circuit diagram illustrating a pixel of a display device, according to an embodiment, and FIG. 24 is a timing diagram for describing an example of an operation of a pixel of FIG. 23, according to an embodiment.

In an embodiment, referring to FIGS. 23 and 24, a pixel 600 may include an initialization circuit 610, a data writing circuit 630, a ramp generating circuit 650, a comparator 670, a driving circuit 690 and a light emitting element LED. The pixel 600 of FIG. 23 may have a similar configuration to a pixel 200 of FIG. 15, except that a positive input terminal ("+") and a negative input terminal ("−") of the comparator 670 may be connected to a second node N2 and a first node N1, respectively.

In an embodiment, the initialization circuit 610 may include a first initialization transistor INTT1 including a gate for receiving an enable signal EN, a first terminal for receiving a first initialization voltage VINT1, and a second terminal connected to the first node N1, and a second initialization transistor INTT2 including a gate for receiving an initialization signal GI, a first terminal for receiving a second initialization voltage VINT2, and a second terminal connected to the second node N2.

In an embodiment, the data writing circuit 630 may include a first data writing transistor DWT1 including a gate for receiving a writing signal GW, a first terminal connected to a data line DL, and a second terminal connected to the second node N2, a second data writing transistor DWT2 including a gate for receiving an inverted writing signal GWB, a first terminal connected to the data line DL, and a second terminal connected to the second node N2, and a storage capacitor CST including a first electrode connected to the second node N2, and a second electrode for receiving a ground voltage VGND. Although FIG. 23 illustrates an example in which the data writing circuit 630 includes both of the first and second data writing transistors DWT1 and DWT2, in some embodiments, the data writing circuit 630 may include only one of the first and second data writing transistors DWT1 and DWT2.

The ramp generating circuit 650 may include a ramp enable transistor RET including a gate for receiving the enable signal EN, a first terminal connected to the first node N1, and a second terminal, a ramp current source RCS connected between the second terminal of the ramp enable transistor RET and a line for transferring a second power supply voltage VSS, and a ramp capacitor CR including a first electrode connected to the first node N1, and a second electrode for receiving the ground voltage VGND.

In an embodiment, the comparator 670 may include the positive input terminal ("+") connected to the second node N2, the negative input terminal ("−") connected to the first node N1, and an output terminal for outputting an emission signal EM. Thus, in a sweep period SWP, the comparator 670 may generate the emission signal EM having a high level when a ramp voltage VRAMP applied to the negative input terminal is lower than a data voltage VDAT applied to the positive input terminal.

In an embodiment, the driving circuit 690 may include an emission transistor EMT' including a gate for receiving the emission signal EM, a first terminal, and a second terminal, and a constant current source CCS connected between the second terminal of the emission transistor EMT' and the line for transferring the second power supply voltage VSS.

In an embodiment, the light emitting element LED may include an anode connected to a line for transferring a first power supply voltage VDD, and a cathode connected to the first terminal of the emission transistor EMT'.

In an embodiment and as illustrated in FIGS. 23 and 24, the ramp voltage VRAMP may gradually decrease in the sweep period DWP in which the enable signal EN has a high level, the comparator 670 may generate the emission signal EM having the high level when the ramp voltage VRAMP is lower than the data voltage VDAT, and the emission transistor EMT' may be turned on while the emission signal EM has the high level. Thus, an emission time ET of the light emitting element LED may start when a voltage level of the gradually decreasing ramp voltage VRAMP becomes equal to a voltage level of the data voltage VDAT, and may end at an end time point of the sweep period SWP.

Figure 25:
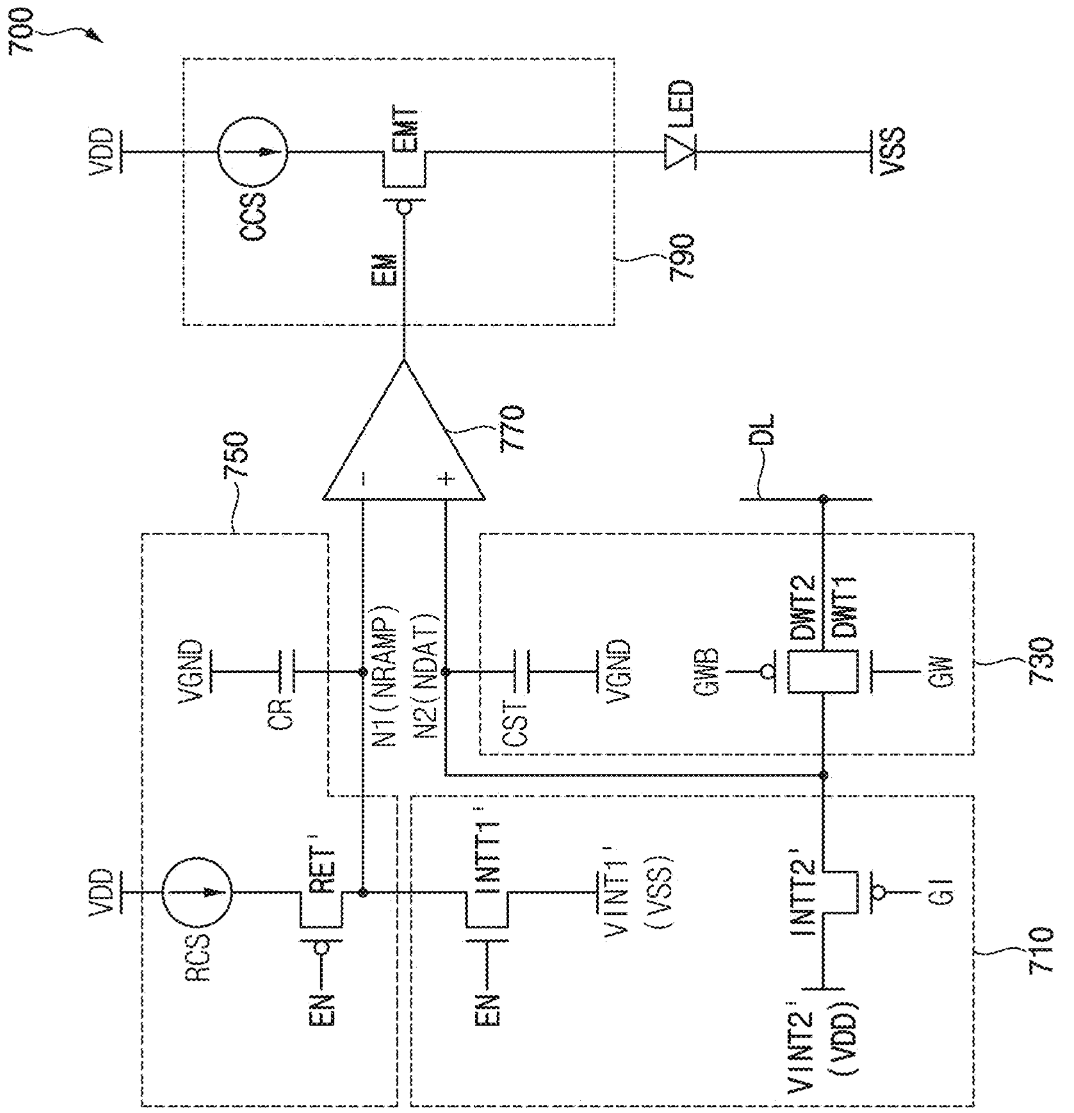
FIG. 25 is a circuit diagram illustrating a pixel of a display device, according to an embodiment.
Figure 26:
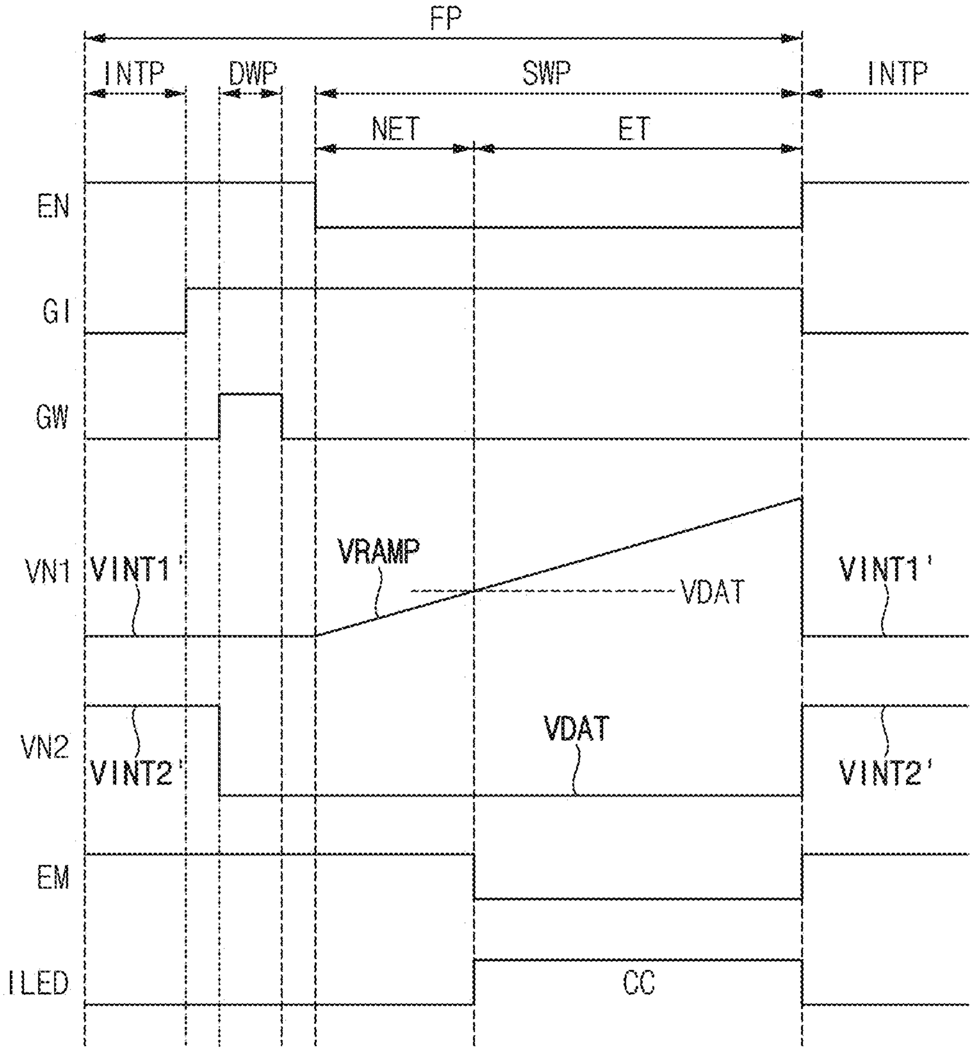
FIG. 26 is a timing diagram for describing an example of an operation of a pixel of FIG. 25, according to an embodiment.

FIG. 25 is a circuit diagram illustrating a pixel of a display device, according to an embodiment, and FIG. 26 is a timing diagram for describing an example of an operation of a pixel of FIG. 25, according to an embodiment.

In an embodiment and referring to FIGS. 25 and 26, a pixel 700 may include an initialization circuit 710, a data writing circuit 730, a ramp generating circuit 750, a comparator 770, a driving circuit 790 and a light emitting element (LED). The pixel 700 of FIG. 25 may have a similar configuration to a pixel 300 of FIG. 17, except that a positive input terminal ("+") and negative input terminal ("−") of the comparator 770 may be connected to a second node N2 and a first node N1, respectively.

In an embodiment, the initialization circuit 710 may include a first initialization transistor INTT1' including a gate for receiving an enable signal EN, a first terminal for receiving a first initialization voltage VINT1', and a second terminal connected to the first node N1, and a second initialization transistor INTT2' including a gate for receiving an initialization signal GI, a first terminal for receiving a second initialization voltage VINT2', and a second terminal connected to the second node N2.

In an embodiment, the data writing circuit 730 may include a first data writing transistor DWT1 including a gate for receiving a writing signal GW, a first terminal connected to a data line DL, and a second terminal connected to the second node N2, a second data writing transistor DWT2 including a gate for receiving an inverted writing signal GWB, a first terminal connected to the data line DL, and a second terminal connected to the second node N2, and a storage capacitor CST including a first electrode connected to the second node N2, and a second electrode for receiving a ground voltage VGND. Although FIG. 25 illustrates an example in which the data writing circuit 730 includes both of the first and second data writing transistors DWT1 and DWT2, in some embodiments, the data writing circuit 730 may include only one of the first and second data writing transistors DWT1 and DWT2.

In an embodiment, the ramp generating circuit 750 may include a ramp current source RCS connected to a line for transferring a first power supply voltage VDD, a ramp enable transistor RET' including a gate for receiving the enable signal EN, a first terminal connected to the ramp current source RCS, and a second terminal connected to the first node N1, and a ramp capacitor CR including a first electrode connected to the first node N1, and a second electrode for receiving the ground voltage VGND.

In an embodiment, the comparator 770 may include the positive input terminal ("+") connected to the second node N2, the negative input terminal ("−") connected to the first node N1, and an output terminal for outputting an emission signal EM. Thus, in a sweep period SWP, the comparator 770 may generate the emission signal EM having a low level when a ramp voltage VRAMP applied to the negative input terminal is higher than a data voltage VDAT applied to the positive input terminal.

In an embodiment, the driving circuit 790 may include a constant current source CCS connected to the line for transferring the first power supply voltage VDD, and an emission transistor EMT including a gate for receiving the emission signal EM, a first terminal connected to the constant current source CCS, and a second terminal.

In an embodiment, the light emitting element LED may include an anode connected to the second terminal of the emission transistor EMT, and a cathode connected to a line for transferring a second power supply voltage VSS.

In an embodiment and as illustrated in FIGS. 25 and 26, the ramp voltage VRAMP may gradually increase in the sweep period DWP in which the enable signal EN has a low level, the comparator 770 may generate the emission signal EM having the low level when the ramp voltage VRAMP is higher than the data voltage VDAT, and the emission transistor EMT may be turned on while the emission signal EM has the low level. Thus, an emission time ET of the light emitting element LED may start when a voltage level of the gradually increasing ramp voltage VRAMP becomes equal to a voltage level of the data voltage VDAT, and may end at an end time point of the sweep period SWP.

Figure 27:
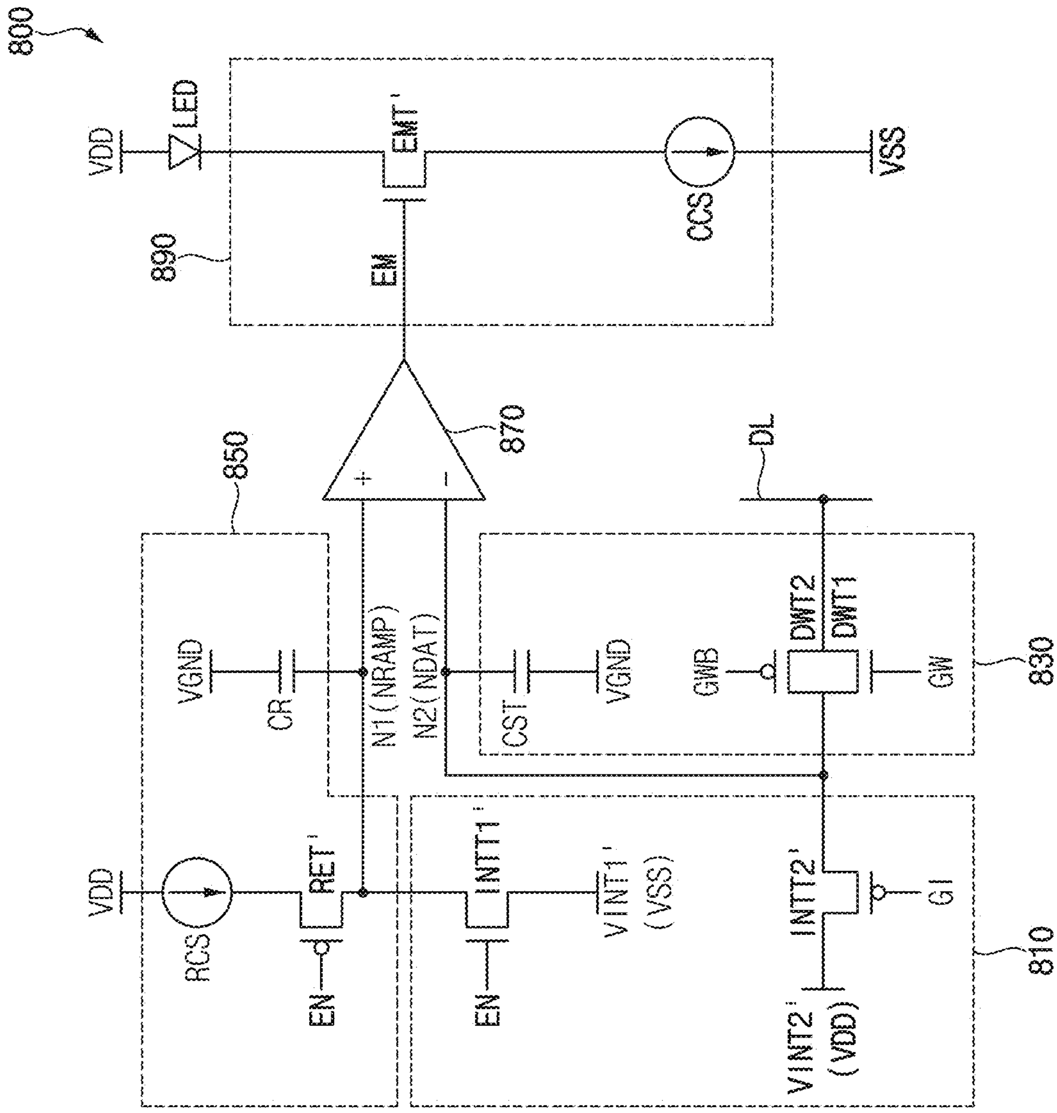
FIG. 27 is a circuit diagram illustrating a pixel of a display device, according to an embodiment.
Figure 28:
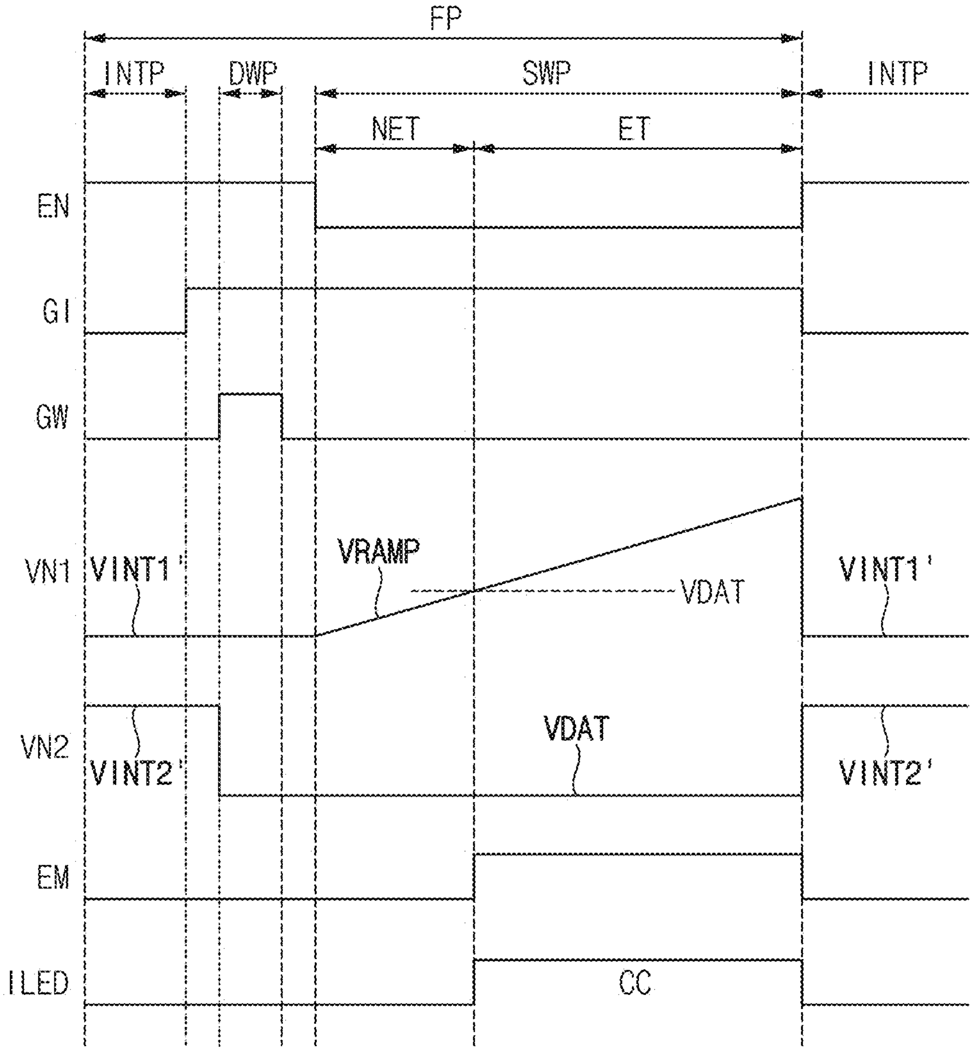
FIG. 28 is a timing diagram for describing an example of an operation of a pixel of FIG. 27, according to an embodiment.

FIG. 27 is a circuit diagram illustrating a pixel of a display device, according to an embodiment, and FIG. 28 is a timing diagram for describing an example of an operation of a pixel of FIG. 27, according to an embodiment.

In an embodiment and referring to FIGS. 27 and 28, a pixel 800 may include an initialization circuit 810, a data writing circuit 830, a ramp generating circuit 850, a comparator 870, a driving circuit 890 and a light emitting element LED. The pixel 800 of FIG. 27 may have a similar configuration to a pixel 400 of FIG. 19, except that a positive input terminal ("+") and negative input terminal ("−") of the comparator 870 may be connected to a first node N1 and a second node N2, respectively.

In an embodiment, the initialization circuit 810 may include a first initialization transistor INTT1' including a gate for receiving an enable signal EN, a first terminal for receiving a first initialization voltage VINT1', and a second terminal connected to the first node N1, and a second initialization transistor INTT2' including a gate for receiving an initialization signal GI, a first terminal for receiving a second initialization voltage VINT2', and a second terminal connected to the second node N2.

In an embodiment, the data writing circuit 830 may include a first data writing transistor DWT1 including a gate for receiving a writing signal GW, a first terminal connected to a data line DL, and a second terminal connected to the second node N2, a second data writing transistor DWT2 including a gate for receiving an inverted writing signal GWB, a first terminal connected to the data line DL, and a second terminal connected to the second node N2, and a storage capacitor CST including a first electrode connected to the second node N2, and a second electrode for receiving a ground voltage VGND. Although FIG. 27 illustrates an example in which the data writing circuit 830 includes both of the first and second data writing transistors DWT1 and DWT2, in some embodiments, the data writing circuit 830 may include only one of the first and second data writing transistors DWT1 and DWT2.

In an embodiment, the ramp generating circuit 850 may include a ramp current source RCS connected to a line for transferring a first power supply voltage VDD, a ramp enable transistor RET including a gate for receiving the enable signal EN, a first terminal connected to the ramp current source RCS, and a second terminal connected to the first node N1, and a ramp capacitor CR including a first electrode connected to the first node N1, and a second electrode for receiving the ground voltage VGND.

In an embodiment, the comparator 870 may include the positive input terminal ("+") connected to the first node N1, the negative input terminal ("−") connected to the second node N2, and an output terminal for outputting an emission signal EM. Thus, in a sweep period SWP, the comparator 870 may generate the emission signal EM having a high level when a ramp voltage VRAMP applied to the positive input terminal is higher than a data voltage VDAT applied to the negative input terminal.

In an embodiment, the driving circuit 890 may include an emission transistor EMT' including a gate for receiving the emission signal EM, a first terminal, and a second terminal, and a constant current source CCS connected between the second terminal of the emission transistor EMT' and a line for transferring a second power supply voltage VSS.

In an embodiment, the light emitting element LED may include an anode connected to the line for transferring the first power supply voltage VDD, and a cathode connected to the first terminal of the emission transistor EMT'.

In an embodiment and as illustrated in FIGS. 27 and 28, the ramp voltage VRAMP may gradually increase in the sweep period SWP in which the enable signal EN has a low level, the comparator 870 may generate the emission signal EM having a high level when the ramp voltage VRAMP is higher than the data voltage VDAT, and the emission transistor EMT' may be turned on while the emission signal EM has the high level. Thus, an emission time ET of the light emitting element LED may start when a voltage level of the gradually increasing ramp voltage VRAMP becomes equal to a voltage level of the data voltage VDAT, and may end at an end time point of the sweep period SWP.

Figure 29:
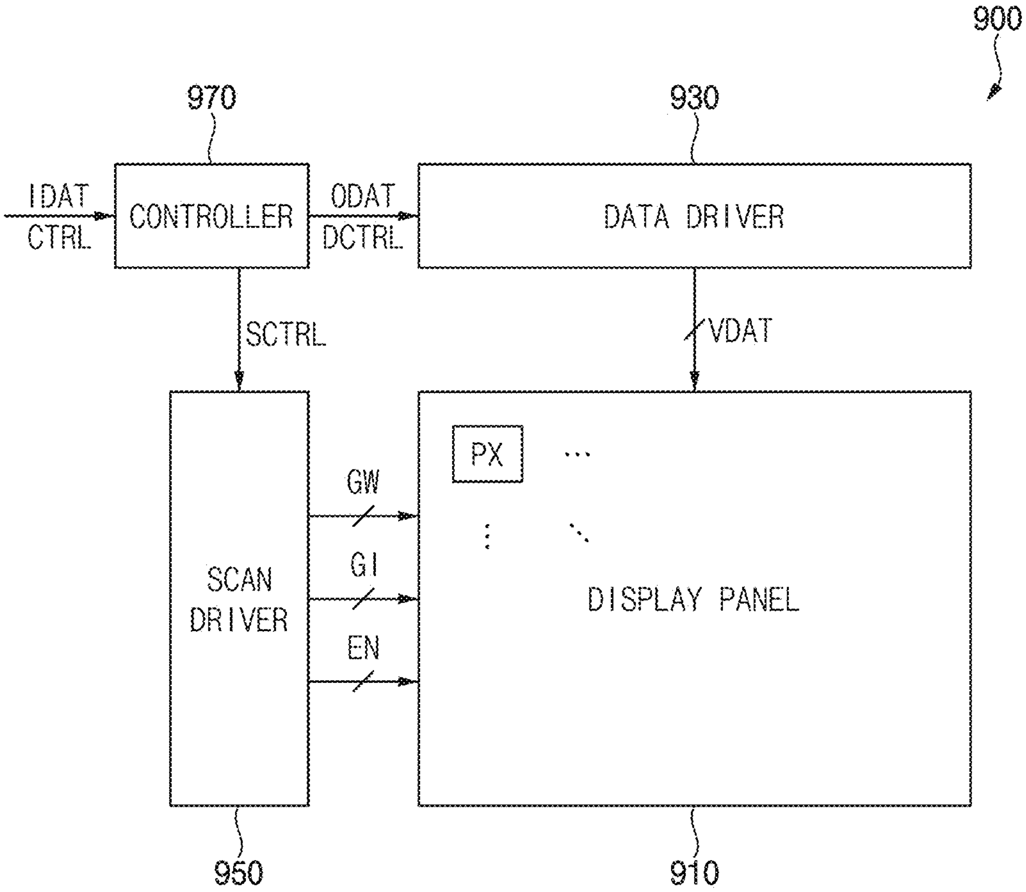
FIG. 29 is a block diagram illustrating a display device, according to an embodiment.

FIG. 29 is a block diagram illustrating a display device, according to embodiments.

In an embodiment and referring to FIG. 29, a display device 900 may include a display panel 910 including a plurality of pixels PX, a data driver 930 providing data voltages VDAT to the plurality of pixels PX, a scan driver 950 providing writing signals GW, initialization signals GI and enable signals EN to the plurality of pixels PX, and a controller 970 controlling the data driver 930 and the scan driver 950.

In an embodiment, the display panel 910 may include the plurality of pixels PX.

According to embodiments, each pixel PX of the display panel 910 may be a pixel 100 of FIG. 1, a pixel 200 of FIG. 15, a pixel 300 of FIG. 17, a pixel 400 of FIG. 19, a pixel 500 of FIG. 21, a pixel 600 of FIG. 23, a pixel 700 of FIG. 25 or a pixel 800 of FIG. 27.

In an embodiment, the data driver 930 may provide the data voltages VDAT to the plurality of pixels PX based on output image data ODAT and a data control signal DCTRL received from the controller 970. In some embodiments, the data control signal DCTRL may include, but not limited to, an output data enable signal, a horizontal start signal and a load signal. In some embodiments, the data driver 930 and the controller 970 may be implemented as a single integrated circuit, and the single integrated circuit may be referred to as a timing controller embedded data driver (TED). In other embodiments, the data driver 930 and the controller 970 may be implemented as separate integrated circuits.

In an embodiment, the scan driver 950 may provide the writing signals GW, the initialization signals GI and the enable signals EN to the plurality of pixels PX based on a scan control signal SCTRL received from the controller 970. In some embodiments, the scan control signal SCTRL may include, but not limited to, a scan start signal and a scan clock signal. In some embodiments, the scan driver 950 may be integrated or formed in the display panel 910. In other embodiments, the scan driver 950 may be implemented as one or more integrated circuits.

In an embodiment, the controller 970 (e.g., a timing controller) may receive input image data IDAT and a control signal CTRL from an external host processor (e.g., a graphics processing unit (GPU), an application processor (AP) or a graphics card). In some embodiments, the control signal CTRL may include, but not limited to, a vertical synchronization signal, a horizontal synchronization signal, an input data enable signal, a master clock signal, etc. The controller 970 may generate the output image data ODAT, the data control signal DCTRL and the scan control signal SCTRL based on the input image data IDAT and the control signal CTRL. The controller 970 may control an operation of the data driver 930 by providing the output image data ODAT and the data control signal DCTRL to the data driver 930, and may control an operation of the scan driver 950 by providing the scan control signal SCTRL to the scan driver 950.

In the display device 900 according to an embodiment, a driving circuit of each pixel PX may provide a constant (or fixed) current to a light emitting element. Accordingly, a color shift phenomenon may be prevented in the display device 900. Further, in the display device 900, according to an embodiment, each pixel PX may include a ramp generating circuit that generates a ramp voltage. Accordingly, image quality deterioration due to a distortion of the ramp voltage may be prevented in the display device 900.

Figure 30:
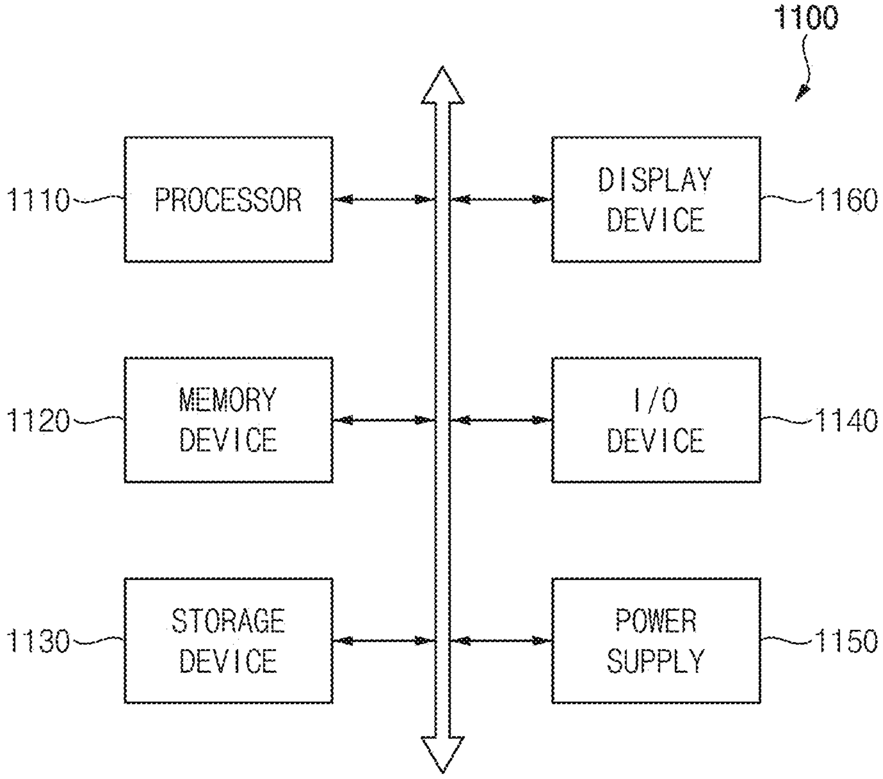
FIG. 30 is a block diagram illustrating an electronic device including a display device, according to an embodiment.

FIG. 30 is a block diagram illustrating an electronic device including a display device, according to an embodiment.

In an embodiment and referring to FIG. 30, an electronic device 1100 may include a processor 1110, a memory device 1120, a storage device 1130, an input/output (I/O) device 1140, a power supply 1150, and a display device 1160. The electronic device 1100 may further include a plurality of ports for communicating with a video card, a sound card, a memory card, a universal serial bus (USB) device, other electric devices, etc.

In an embodiment, the processor 1110 may perform various computing functions or tasks. The processor 1110 may be an application processor (AP), a microprocessor, a central processing unit (CPU), etc. The processor 1110 may be coupled to other components via an address bus, a control bus, a data bus, etc. Further, in some embodiments, the processor 1110 may be further coupled to an extended bus such as a peripheral component interconnection (PCI) bus.

In an embodiment, the memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM)

device, a static random access memory (SRAM) device, a mobile dynamic random access memory (mobile DRAM) device, etc.

In an embodiment, the storage device 1130 may be a solid state drive (SSD) device, a hard disk drive (HDD) device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

In an embodiment, in the display device 1160, a driving circuit of each pixel may provide a constant (or fixed) current to a light emitting element. Accordingly, a color shift phenomenon may be prevented in the display device 1160. Further, in the display device 1160, according to embodiments, each pixel may include a ramp generating circuit that generates a ramp voltage. Accordingly, image quality deterioration due to a distortion of the ramp voltage may be prevented in the display device 1160.

In an embodiment, the invention may be applied to any display device 1160 and any electronic device 1100 including the display device 1160. For example, the invention may be applied to a smart phone, a wearable electronic device, a tablet computer, a mobile phone, a television (TV) (e.g., a digital TV, a 3D TV, etc.), a personal computer (PC), a home appliance, a laptop computer, a personal digital assistant (PDA), a portable multimedia player (PMP), a digital camera, a music player, a portable game console, a navigation device, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the invention. Accordingly, all such modifications are intended to be included within the scope of the invention. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims. Moreover, the embodiments or parts of the embodiments may be combined in whole or in part without departing from the scope of the invention.

What is claimed is:

1. An electronic display device including a plurality of pixels, each of the plurality of pixels comprising:
- a light emitting element;
- an initialization circuit configured to provide a first initialization voltage to a first node, the initialization circuit including a first initialization transistor configured to transfer the first initialization voltage to the first node;
- a data writing circuit configured to provide a data voltage to a second node;
- a ramp generating circuit configured to provide a ramp voltage to the first node in response to an enable signal, the ramp generating circuit including a ramp current source configured to generate a ramp current, a ramp enable transistor connected in series with the ramp current source, and configured to selectively provide the ramp current to the first node in response to the enable signal, and a ramp capacitor connected to the first node, and configured to generate the ramp voltage based on the ramp current;
- a comparator configured to generate an emission signal by comparing the ramp voltage at the first node and the data voltage at the second node; and
- a driving circuit configured to provide a constant current to the light emitting element in response to the emission signal.

2. The electronic device of claim 1, wherein an emission time of the light emitting element of each of the plurality of pixels is determined according to a voltage level of the data voltage for each of the plurality of pixels.

3. The electronic device of claim 1, wherein the plurality of pixels include the ramp generating circuits.

4. The electronic device of claim 1, wherein the ramp current source includes:
- a ramp current transistor configured to generate the ramp current based on a ramp bias voltage,
- wherein gates of the ramp current transistor are connected to a same line for transferring the ramp bias voltage.

5. The electronic device of claim 1, further comprising:
- a reference ramp current source; and
- a reference ramp current transistor connected in series with the reference ramp current source, the reference ramp current transistor including a reference ramp current transistor drain and a reference ramp current transistor gate connected to each other,
- wherein the ramp current source includes:
  - a ramp current transistor configured to generate the ramp current, and
- wherein gates of ramp current transistors of the plurality of pixels are connected to the reference ramp current transistor gate.

6. The electronic device of claim 1, wherein the initialization circuit further includes:
- a second initialization transistor configured to transfer a second initialization voltage to the second node.

7. The electronic device of claim 1, wherein the data writing circuit includes at least one of a first data writing transistor for transferring the data voltage to the second node in response to a writing signal, and a second data writing transistor for transferring the data voltage to the second node in response to an inverted writing signal.

8. The electronic device of claim 7, wherein the data writing circuit further includes:
- a storage capacitor connected to the second node, and configured to store the data voltage.

9. The electronic device of claim 1, wherein the driving circuit includes:
- a constant current source configured to generate the constant current; and
- an emission transistor configured to selectively provide the constant current to the light emitting element in response to the emission signal.

10. The electronic device of claim 9, wherein the driving circuit further includes:
- at least one driving enable transistor connected in series with the emission transistor, the at least one driving enable transistor being selectively turned on in response to the enable signal or an inverted enable signal.

11. The electronic device of claim 1, wherein the ramp voltage gradually decreases in a sweep period in which the enable signal has a high level,
- wherein the comparator generates the emission signal having a low level when the ramp voltage is higher than the data voltage, wherein the driving circuit includes an emission transistor that is turned on while the emission signal has the low level, and wherein an emission time of the light emitting element starts at a start time point of the sweep period, and ends when a voltage level of the ramp voltage becomes equal to a voltage level of the data voltage.

12. The electronic device of claim 1, wherein the initialization circuit includes:

the first initialization transistor including a first initialization transistor gate for receiving the enable signal, a first initialization transistor first terminal for receiving the first initialization voltage, and a first initialization transistor second terminal connected to the first node; and a second initialization transistor including a second initialization transistor gate for receiving an initialization signal, a second initialization transistor first terminal for receiving a second initialization voltage, and a second initialization transistor second terminal connected to the second node, wherein the data writing circuit includes:

a first data writing transistor including a first data writing transistor gate for receiving a writing signal, a first data writing transistor first terminal connected to a data line, and a first data writing transistor second terminal connected to the second node;

a second data writing transistor including a second data writing transistor gate for receiving an inverted writing signal, a second data writing transistor first terminal connected to the data line, and a second data writing transistor second terminal connected to the second node; and a storage capacitor including a storage capacitor first electrode connected to the second node, and a storage capacitor second electrode for receiving a ground voltage, wherein the ramp generating circuit includes:

the ramp enable transistor including a ramp enable transistor gate for receiving the enable signal, a ramp enable transistor first terminal connected to the first node, and a ramp enable transistor second terminal;

the ramp current source connected between the ramp enable transistor second terminal and a line for transferring a second power supply voltage; and the ramp capacitor including a ramp capacitor first electrode connected to the first node, and a ramp capacitor second electrode for receiving the ground voltage, wherein the comparator includes a comparator positive input terminal connected to the second node, a comparator negative input terminal connected to the first node, and an comparator output terminal for outputting the emission signal, wherein the driving circuit includes:

a constant current source connected to a line for transferring a first power supply voltage;

a first driving enable transistor including a first driving enable transistor gate for receiving an inverting enable signal, a first driving enable transistor first terminal connected to the constant current source, and a first driving enable transistor second terminal;

an emission transistor including a emission transistor gate for receiving the emission signal, a emission transistor first terminal connected to the first driving enable transistor second terminal, and a emission transistor second terminal; and a second driving enable transistor including a second driving enable transistor gate for receiving the enable signal, a second driving enable transistor first terminal connected to the emission transistor second terminal, and a second driving enable transistor second terminal, and wherein the light emitting element includes a light emitting element anode connected to the second driving enable transistor second terminal, and a light emitting element cathode connected to the line for transferring the second power supply voltage.

13. The electronic device of claim 12, wherein a frame period includes:

an initialization period in which the initialization signal has a high level, and the enable signal and the writing signal have a low level;

a data writing period in which the writing signal has the high level, and the enable signal and the initialization signal have the low level; and a sweep period in which the enable signal has the high level, and the initialization signal and the writing signal have the low level, wherein, in the initialization period, the first initialization transistor provides the first initialization voltage to the first node in response to the enable signal having the low level, and the second initialization transistor provides the second initialization voltage to the second node in response to the initialization signal having the high level, wherein, in the data write period, the first data writing transistor provides the data voltage to the second node in response to the writing signal having the high level, the second data writing transistor provides the data voltage to the second node in response to the inverted writing signal having the low level, and the storage capacitor stores the data voltage at the second node, and wherein, in the sweep period, the ramp enable transistor provides a ramp current generated by the ramp current source to the ramp capacitor in response to the enable signal having the high level, wherein the ramp capacitor provides the first node with the ramp voltage, wherein the ramp voltage gradually decreases from the first initialization voltage based on the ramp current, the comparator generates the emission signal having the low level during an emission time from a start time point of the sweep period to a time point at which the ramp voltage becomes the data voltage, the first driving enable transistor is turned on in response to the inverted enable signal having the low level, the second driving enable transistor is turned on in response to the enable signal having the high level, the emission transistor is turned on in response to the emission signal having the low level during the emission time, and the light emitting element emits light based on the constant current during the emission time.

14. The electronic device of claim 1, wherein the initialization circuit includes:

the first initialization transistor including a first initialization transistor gate for receiving the enable signal, a first initialization transistor first terminal for receiving the first initialization voltage, and a first initialization transistor second terminal connected to the first node, wherein the data writing circuit includes:

a first data writing transistor including a first data writing transistor gate for receiving a writing signal, a first data writing transistor first terminal connected to a data line, and a first data writing transistor second terminal connected to the second node;

a second data writing transistor including a second data writing transistor gate for receiving an inverted writing signal, a second data writing transistor first terminal connected to the data line, and a second data writing transistor second terminal connected to the second node; and a storage capacitor including a storage capacitor first electrode connected to the second node, and a storage capacitor second electrode for receiving a ground voltage, wherein the ramp generating circuit includes:

the ramp enable transistor including a ramp enable transistor gate for receiving the enable signal, a ramp enable transistor first terminal connected to the first node, and a ramp enable transistor second terminal;

the ramp current source connected between the ramp enable transistor second terminal and a line for transferring a second power supply voltage; and the ramp capacitor including a ramp capacitor first electrode connected to the first node, and a ramp capacitor second electrode for receiving the ground voltage, wherein the comparator includes a comparator positive input terminal connected to the second node, a comparator negative input terminal connected to the first node, and a comparator output terminal for outputting the emission signal, wherein the driving circuit includes:

a constant current source connected to a line for transferring a first power supply voltage;

a first driving enable transistor including a first driving enable transistor gate for receiving an inverting enable signal, a first driving enable transistor first terminal connected to the constant current source, and a first driving enable transistor second terminal;

an emission transistor including an emission transistor gate for receiving the emission signal, an emission transistor first terminal connected to the first driving enable transistor second terminal, and an emission transistor second terminal; and a second driving enable transistor including a second driving enable transistor gate for receiving the enable signal, a second driving enable transistor first terminal connected to the emission transistor second terminal, and a second driving enable transistor second terminal, wherein the light emitting element includes a light emitting element anode connected to the second driving enable transistor second terminal, and a light emitting element cathode connected to the line for transferring the second power supply voltage, and wherein, in the initialization period of a current frame period, a voltage of the second node is maintained as the data voltage in a previous frame period.

15. The electronic device of claim 1, wherein the ramp voltage gradually decreases in a sweep period in which the enable signal has a high level, wherein the comparator generates the emission signal having the high level when the ramp voltage is higher than the data voltage, wherein the driving circuit includes an emission transistor that is turned on while the emission signal has the high level, and wherein an emission time of the light emitting element starts at a start time point of the sweep period, and ends when a voltage level of the ramp voltage becomes equal to a voltage level of the data voltage.

16. The electronic device of claim 1, wherein the initialization circuit includes:

a first initialization transistor including a first initialization transistor gate for receiving the enable signal, a first initialization transistor first terminal for receiving the first initialization voltage, and a first initialization transistor second terminal connected to the first node; and a second initialization transistor including a second initialization transistor gate for receiving an initialization signal, a second initialization transistor first terminal for receiving a second initialization voltage, and a second initialization transistor second terminal connected to the second node, wherein the data writing circuit includes:

a first data writing transistor including a first data writing transistor gate for receiving a writing signal, a first data writing transistor first terminal connected to a data line, and a first data writing transistor second terminal connected to the second node;

a second data writing transistor including a second data writing transistor gate for receiving an inverted writing signal, a second data writing transistor first terminal connected to the data line, and a second data writing transistor second terminal connected to the second node; and a storage capacitor including a storage capacitor first electrode connected to the second node, and a storage capacitor second electrode for receiving a ground voltage, wherein the ramp generating circuit includes:

a ramp enable transistor including a ramp enable transistor gate for receiving the enable signal, a ramp enable transistor first terminal connected to the first node, and a ramp enable transistor second terminal;

a ramp current source connected between the ramp enable transistor second terminal and a line for transferring a second power supply voltage; and a ramp capacitor including a ramp capacitor first electrode connected to the first node, and a ramp capacitor second electrode for receiving the ground voltage, wherein the comparator includes a comparator positive input terminal connected to the first node, a comparator negative input terminal connected to the second node, and a comparator output terminal for outputting the emission signal, wherein the driving circuit includes:

a first driving enable transistor including a first driving enable transistor gate for receiving an inverting enable signal, a first driving enable transistor first terminal, and a first driving enable transistor second terminal;

an emission transistor including a emission transistor gate for receiving the emission signal, a emission transistor first terminal connected to the second terminal of the first driving enable transistor, and a emission transistor second terminal;

a second driving enable transistor including a second driving enable transistor gate for receiving the enable signal, a second driving enable transistor first terminal connected to the emission transistor second terminal, and a second driving enable transistor second terminal; and a constant current source connected between the second driving enable transistor second terminal and the line for transferring the second power supply voltage, and wherein the light emitting element includes a light emitting element anode connected to a line for transferring a first power supply voltage, and a light emitting element cathode connected to the first driving enable transistor first terminal of the first driving enable transistor.

17. The electronic device of claim 1, wherein the ramp voltage gradually increases in a sweep period in which the enable signal has a low level, wherein the comparator generates the emission signal having the low level when the ramp voltage is lower than the data voltage, wherein the driving circuit includes an emission transistor that is turned on while the emission signal has the low level, and wherein an emission time of the light emitting element starts at a start time point of the sweep period, and ends when a voltage level of the ramp voltage becomes equal to a voltage level of the data voltage.

18. The electronic device of claim 1, wherein the initialization circuit includes:

the first initialization transistor including a first initialization transistor gate for receiving the enable signal, a first initialization transistor first terminal for receiving the first initialization voltage, and a first initialization transistor second terminal connected to the first node; and a second initialization transistor including a second initialization transistor gate for receiving an initialization signal, a second initialization transistor first terminal for receiving a second initialization voltage, and a second initialization transistor second terminal connected to the second node, wherein the data writing circuit includes:

a first data writing transistor including a first data writing transistor gate for receiving a writing signal, a first data writing transistor first terminal connected to a data line, and a first data writing transistor second terminal connected to the second node;

a second data writing transistor including a second data writing transistor gate for receiving an inverted writing signal, a second data writing transistor first terminal connected to the data line, and a second data writing transistor second terminal connected to the second node; and a storage capacitor including a storage capacitor first electrode connected to the second node, and a storage capacitor second electrode for receiving a ground voltage, wherein the ramp generating circuit includes:

the ramp current source connected to a line for transferring a first power supply voltage;

the ramp enable transistor including a ramp enable transistor gate for receiving the enable signal, a ramp enable transistor first terminal connected to the ramp current source, and a ramp enable transistor second terminal connected to the first node; and the ramp capacitor including a ramp capacitor first electrode connected to the first node, and a ramp capacitor second electrode for receiving the ground voltage, wherein the comparator includes a comparator positive input terminal connected to the first node, a comparator negative input terminal connected to the second node, and a comparator output terminal for outputting the emission signal, wherein the driving circuit includes:

a constant current source connected to the line for transferring the first power supply voltage;

a first driving enable transistor including a first driving enable transistor gate for receiving the enable signal, a first driving enable transistor first terminal connected to the constant current source, and a first driving enable transistor second terminal;

an emission transistor including an emission transistor gate for receiving the emission signal, an emission transistor first terminal connected to the first driving enable transistor second terminal, and an emission transistor second terminal; and a second driving enable transistor including a second driving enable transistor gate for receiving an inverted enable signal, a second driving enable transistor first terminal connected to the emission transistor second terminal, and a second driving enable transistor second terminal, and wherein the light emitting element includes a light emitting element anode connected to the second driving enable transistor second terminal, and a cathode connected to a line for transferring a second power supply voltage.

19. The electronic device of claim 1, wherein the ramp voltage gradually increases in a sweep period in which the enable signal has a low level, wherein the comparator generates the emission signal having a high level when the ramp voltage is lower than the data voltage, wherein the driving circuit includes an emission transistor that is turned on while the emission signal has the high level, and wherein an emission time of the light emitting element starts at a start time point of the sweep period, and ends when a voltage level of the ramp voltage becomes equal to a voltage level of the data voltage.

20. The electronic device of claim 1, wherein the initialization circuit includes:

the first initialization transistor including a first initialization transistor gate for receiving the enable signal, a first initialization transistor first terminal for receiving the first initialization voltage, and a first initialization transistor second terminal connected to the first node; and a second initialization transistor including a second initialization transistor gate for receiving an initialization signal, a second initialization transistor first terminal for receiving a second initialization voltage, and a second initialization transistor second terminal connected to the second node, wherein the data writing circuit includes:

a first data writing transistor including a first data writing transistor gate for receiving a writing signal, a first data writing transistor first terminal connected to a data line, and a first data writing transistor second terminal connected to the second node;

a second data writing transistor including a second data writing transistor gate for receiving an inverted writing signal, a second data writing transistor first terminal connected to the data line, and a second data writing transistor second terminal connected to the second node; and a storage capacitor including a storage capacitor first electrode connected to the second node, and a storage capacitor second electrode for receiving a ground voltage, wherein the ramp generating circuit includes:

the ramp current source connected to a line for transferring a first power supply voltage;

the ramp enable transistor including a ramp enable transistor gate for receiving the enable signal, a ramp enable transistor first terminal connected to the ramp current source, and a ramp enable transistor second terminal connected to the first node; and the ramp capacitor including a ramp capacitor first electrode connected to the first node, and a ramp capacitor second electrode for receiving the ground voltage, wherein the comparator includes a comparator positive input terminal connected to the second node, a comparator negative input terminal connected to the first node, and a comparator output terminal for outputting the emission signal, wherein the driving circuit includes:

a first driving enable transistor including a first driving enable transistor gate for receiving the enable signal, a first driving enable transistor first terminal, and a first driving enable transistor second terminal;

an emission transistor including a emission transistor gate for receiving the emission signal, a emission transistor first terminal connected to the first driving enable transistor second terminal, and a emission transistor second terminal;

a second driving enable transistor including a second driving enable transistor gate for receiving an inverted enable signal, a second driving enable transistor first terminal connected to the emission transistor second terminal, and a second driving enable transistor second terminal; and a constant current source connected between the second driving enable transistor second terminal and a line for transferring a second power supply voltage, and wherein the light emitting element includes a light emitting element anode connected to the line for transferring the first power supply voltage, and a light emitting element cathode connected to the first driving enable transistor first terminal.

21. The electronic device of claim 1, wherein the ramp voltage gradually decreases in a sweep period in which the enable signal has a high level, wherein the comparator generates the emission signal having a low level when the ramp voltage is lower than the data voltage, wherein the driving circuit includes an emission transistor that is turned on while the emission signal has the low level, and wherein an emission time of the light emitting element starts when a voltage level of the ramp voltage becomes equal to a voltage level of the data voltage, and ends at an end time point of the sweep period.

22. The electronic device of claim 1, wherein the initialization circuit includes:

the first initialization transistor including a first initialization transistor gate for receiving the enable signal, a first initialization transistor first terminal for receiving the first initialization voltage, and a first initialization transistor second terminal connected to the first node; and a second initialization transistor including a second initialization transistor gate for receiving an initialization signal, a second initialization transistor first terminal for receiving a second initialization voltage, and a second initialization transistor second terminal connected to the second node, wherein the data writing circuit includes:

a first data writing transistor including a first data writing transistor gate for receiving a writing signal, a first data writing transistor first terminal connected to a data line, and a first data writing transistor second terminal connected to the second node;

a second data writing transistor including a second data writing transistor gate for receiving an inverted writing signal, a second data writing transistor first terminal connected to the data line, and a second data writing transistor second terminal connected to the second node; and a storage capacitor including a storage capacitor first electrode connected to the second node, and a storage capacitor second electrode for receiving a ground voltage, wherein the ramp generating circuit includes:

the ramp enable transistor including a ramp enable transistor gate for receiving the enable signal, a ramp enable transistor first terminal connected to the first node, and a ramp enable transistor second terminal;

the ramp current source connected between the ramp enable transistor second terminal and a line for transferring a second power supply voltage; and the ramp capacitor including a ramp capacitor first electrode connected to the first node, and a ramp capacitor second electrode for receiving the ground voltage, wherein the comparator includes a comparator positive input terminal connected to the first node, a comparator negative input terminal connected to the second node, and a comparator output terminal for outputting the emission signal, wherein the driving circuit includes:

a constant current source connected to a line for transferring a first power supply voltage; and an emission transistor including a emission transistor gate for receiving the emission signal, a emission transistor first terminal connected to the constant current source, and a emission transistor second terminal, and wherein the light emitting element includes a light emitting element anode connected to the emission transistor second terminal, and a light emitting element cathode connected to the line for transferring the second power supply voltage.

23. The electronic device of claim 22, wherein a frame period includes:

an initialization period in which the initialization signal has a high level, and the enable signal and the writing signal have a low level;

a data writing period in which the writing signal has the high level, and the enable signal and the initialization signal have the low level; and a sweep period in which the enable signal has the high level, and the initialization signal and the writing signal have the low level, wherein, in the initialization period, the first initialization transistor provides the first initialization voltage to the first node in response to the enable signal having the low level, and the second initialization transistor provides the second initialization voltage to the second node in response to the initialization signal having the high level, wherein, in the data write period, the first data writing transistor provides the data voltage to the second node in response to the writing signal having the high level, the second data writing transistor provides the data voltage to the second node in response to the inverted writing signal having the low level, and the storage capacitor stores the data voltage at the second node, and wherein, in the sweep period, the ramp enable transistor provides a ramp current generated by the ramp current source to the ramp capacitor in response to the enable signal having the high level, the ramp capacitor provides the first node with the ramp voltage, wherein the ramp voltage gradually decreases from the first initialization voltage based on the ramp current, the comparator generates the emission signal having the low level during an emission time from a time point at which the ramp voltage becomes the data voltage to an end time point of the sweep period, the emission transistor is turned on in response to the emission signal having the low level during the emission time, and the light emitting element emits light based on the constant current generated by the constant current source during the emission time.

24. The electronic device of claim 1, wherein the ramp voltage gradually decreases in a sweep period in which the enable signal has a high level, wherein the comparator generates the emission signal having the high level when the ramp voltage is lower than the data voltage, wherein the driving circuit includes an emission transistor that is turned on while the emission signal has the high level, and wherein an emission time of the light emitting element starts when a voltage level of the ramp voltage becomes equal to a voltage level of the data voltage, and ends at an end time point of the sweep period.

25. The electronic device of claim 1, wherein the initialization circuit includes:

a first initialization transistor including a first initialization transistor gate for receiving the enable signal, a first initialization transistor first terminal for receiving the first initialization voltage, and a first initialization transistor second terminal connected to the first node; and a second initialization transistor including a second initialization transistor gate for receiving an initialization signal, a second initialization transistor first terminal for receiving a second initialization voltage, and a second initialization transistor second terminal connected to the second node, wherein the data writing circuit includes:

a first data writing transistor including a first data writing transistor gate for receiving a writing signal, a first data writing transistor first terminal connected to a data line, and a first data writing transistor second terminal connected to the second node;

a second data writing transistor including a second data writing transistor gate for receiving an inverted writing signal, a second data writing transistor first terminal connected to the data line, and a second data writing transistor second terminal connected to the second node; and a storage capacitor including a storage capacitor first electrode connected to the second node, and a storage capacitor second electrode for receiving a ground voltage, wherein the ramp generating circuit includes:

the ramp enable transistor including a ramp enable transistor gate for receiving the enable signal, a ramp enable transistor first terminal connected to the first node, and a ramp enable transistor second terminal;

the ramp current source connected between the ramp enable transistor second terminal and a line for transferring a second power supply voltage; and the ramp capacitor including a ramp capacitor first electrode connected to the first node, and a ramp capacitor second electrode for receiving the ground voltage, wherein the comparator includes a comparator positive input terminal connected to the second node, a comparator negative input terminal connected to the first node, and a comparator output terminal for outputting the emission signal, wherein the driving circuit includes:

an emission transistor including a emission transistor gate for receiving the emission signal, a emission transistor first terminal, and a emission transistor second terminal; and a constant current source connected between the emission transistor second terminal and the line for transferring the second power supply voltage, and wherein the light emitting element includes a light emitting element anode connected to a line for transferring a first power supply voltage, and a light emitting element cathode connected to the emission transistor first terminal.

26. The electronic device of claim 1, wherein the ramp voltage gradually increases in a sweep period in which the enable signal has a low level, wherein the comparator generates the emission signal having the low level when the ramp voltage is higher than the data voltage, wherein the driving circuit includes an emission transistor that is turned on while the emission signal has the low level, and wherein an emission time of the light emitting element starts when a voltage level of the ramp voltage becomes equal to a voltage level of the data voltage, and ends at an end time point of the sweep period.

27. The electronic device of claim 1, wherein the initialization circuit includes:

the first initialization transistor including a first initialization transistor gate for receiving the enable signal, a first initialization transistor first terminal for receiving the first initialization voltage, and a first initialization transistor second terminal connected to the first node; and a second initialization transistor including a second initialization transistor gate for receiving an initialization signal, a second initialization transistor first terminal for receiving a second initialization voltage, and a second initialization transistor second terminal connected to the second node, wherein the data writing circuit includes:

a first data writing transistor including a first data writing transistor gate for receiving a writing signal, a first data writing transistor first terminal connected to a data line, and a first data writing transistor second terminal connected to the second node;

a second data writing transistor including a second data writing transistor gate for receiving an inverted writing signal, a second data writing transistor first terminal connected to the data line, and a second data writing transistor second terminal connected to the second node; and a storage capacitor including a storage capacitor first electrode connected to the second node, and a storage capacitor second electrode for receiving a ground voltage, wherein the ramp generating circuit includes:

the ramp current source connected to a line for transferring a first power supply voltage;

the ramp enable transistor including a ramp enable transistor gate for receiving the enable signal, a ramp enable transistor first terminal connected to the ramp current source, and a ramp enable transistor second terminal connected to the first node; and the ramp capacitor including a ramp capacitor first electrode connected to the first node, and a ramp capacitor second electrode for receiving the ground voltage, wherein the comparator includes a comparator positive input terminal connected to the second node, a comparator negative input terminal connected to the first node, and a comparator output terminal for outputting the emission signal, wherein the driving circuit includes:

a constant current source connected to the line for transferring the first power supply voltage; and an emission transistor including a emission transistor gate for receiving the emission signal, a emission transistor first terminal connected to the constant current source, and a emission transistor second terminal, and wherein the light emitting element includes a light emitting element anode connected to the emission transistor second terminal, and a light emitting element cathode connected to a line for transferring a second power supply voltage.

28. The display device of claim 1, wherein the ramp voltage gradually increases in a sweep period in which the enable signal has a low level, wherein the comparator generates the emission signal having a high level when the ramp voltage is higher than the data voltage, wherein the driving circuit includes an emission transistor that is turned on while the emission signal has the high level, and wherein an emission time of the light emitting element starts when a voltage level of the ramp voltage becomes equal to a voltage level of the data voltage, and ends at an end time point of the sweep period.

29. The display device of claim 1, wherein the initialization circuit includes:

the first initialization transistor including a first initialization transistor gate for receiving the enable signal, a first initialization transistor first terminal for receiving the first initialization voltage, and a first initialization transistor second terminal connected to the first node; and a second initialization transistor including a second initialization transistor gate for receiving an initialization signal, a second initialization transistor first terminal for receiving a second initialization voltage, and a second initialization transistor second terminal connected to the second node, wherein the data writing circuit includes:

a first data writing transistor including a first data writing transistor gate for receiving a writing signal, a first data writing transistor first terminal connected to a data line, and a first data writing transistor second terminal connected to the second node;

a second data writing transistor including a second data writing transistor gate for receiving an inverted writing signal, a second data writing transistor first terminal connected to the data line, and a second data writing transistor second terminal connected to the second node; and a storage capacitor including a storage capacitor first electrode connected to the second node, and a storage capacitor second electrode for receiving a ground voltage, wherein the ramp generating circuit includes:

the ramp current source connected to a line for transferring a first power supply voltage;

the ramp enable transistor including a ramp enable transistor gate for receiving the enable signal, a ramp enable transistor first terminal connected to the ramp current source, and a ramp enable transistor second terminal connected to the first node; and the ramp capacitor including a ramp capacitor first electrode connected to the first node, and a ramp capacitor second electrode for receiving the ground voltage, wherein the comparator includes a comparator positive input terminal connected to the first node, a comparator negative input terminal connected to the second node, and a comparator output terminal for outputting the emission signal, wherein the driving circuit includes:

an emission transistor including a emission transistor gate for receiving the emission signal, a emission transistor first terminal, and a emission transistor second terminal; and a constant current source connected between the emission transistor second terminal and a line for transferring a second power supply voltage, and wherein the light emitting element includes a light emitting element anode connected to the line for transferring the first power supply voltage, and a light emitting element cathode connected to the emission transistor first terminal.

30. An electronic device including a plurality of pixels, each of the plurality of pixels comprising:

a first initialization transistor including a first initialization transistor gate for receiving an enable signal, a first initialization transistor first terminal for receiving a first initialization voltage, and a first initialization transistor second terminal connected to a first node;

a second initialization transistor including a second initialization transistor gate for receiving an initialization signal, a second initialization transistor first terminal for receiving a second initialization voltage, and a second initialization transistor second terminal connected to a second node;

a first data writing transistor including a first data writing transistor gate for receiving a writing signal, a first data writing transistor first terminal connected to a data line, and a first data writing transistor second terminal connected to the second node;

a second data writing transistor including a second data writing transistor gate for receiving an inverted writing signal, a second data writing transistor first terminal connected to the data line, and a second data writing transistor second terminal connected to the second node;

a storage capacitor including a storage capacitor first electrode connected to the second node, and a storage capacitor second electrode for receiving a ground voltage;

a ramp enable transistor including a ramp enable transistor gate for receiving the enable signal, a ramp enable transistor first terminal connected to the first node, and a ramp enable transistor second terminal;

a ramp current source connected between the ramp enable transistor second terminal and a line for transferring a second power supply voltage;

a ramp capacitor including a ramp capacitor first electrode connected to the first node, and a ramp capacitor second electrode for receiving the ground voltage;

a comparator including a comparator positive input terminal connected to the second node, a comparator negative input terminal connected to the first node, and a comparator output terminal for outputting an emission signal;

a constant current source connected to a line for transferring a first power supply voltage;

a first driving enable transistor including a first driving enable transistor gate for receiving an inverting enable signal, a first driving enable transistor first terminal connected to the constant current source, and a first driving enable transistor second terminal;

an emission transistor including a emission transistor gate for receiving the emission signal, a emission transistor first terminal connected to the first driving enable transistor second terminal, and a emission transistor second terminal;

a second driving enable transistor including a second driving enable transistor gate for receiving the enable signal, a second driving enable transistor first terminal connected to the emission transistor second terminal, and a second driving enable transistor second terminal; and a light emitting element including a light emitting element anode connected to the second driving enable transistor second terminal, and a light emitting element cathode connected to the line for transferring the second power supply voltage.

31. An electronic device including a plurality of pixels, each of the plurality of pixels comprising:

a first initialization transistor including a first initialization transistor gate for receiving an enable signal, a first initialization transistor first terminal for receiving a first initialization voltage, and a first initialization transistor second terminal connected to a first node;

a second initialization transistor including a second initialization transistor gate for receiving an initialization signal, a second initialization transistor first terminal for receiving a second initialization voltage, and a second initialization transistor second terminal connected to a second node;

a first data writing transistor including a first data writing transistor gate for receiving a writing signal, a first data writing transistor first terminal connected to a data line, and a first data writing transistor second terminal connected to the second node;

a second data writing transistor including a second data writing transistor gate for receiving an inverted writing signal, a second data writing transistor first terminal connected to the data line, and a second data writing transistor second terminal connected to the second node;

a storage capacitor including a storage capacitor first electrode connected to the second node, and a storage capacitor second electrode for receiving a ground voltage;

a ramp enable transistor including a ramp enable transistor gate for receiving the enable signal, a ramp enable transistor first terminal connected to the first node, and a ramp enable transistor second terminal;

a ramp current source connected between the ramp enable transistor second terminal and a line for transferring a second power supply voltage;

a ramp capacitor including a ramp capacitor first electrode connected to the first node, and a ramp capacitor second electrode for receiving the ground voltage;

a comparator including a comparator positive input terminal connected to the first node, a comparator negative input terminal connected to the second node, and a comparator output terminal for outputting an emission signal;

a constant current source connected to a line for transferring a first power supply voltage;

an emission transistor including a emission transistor gate for receiving the emission signal, a emission transistor first terminal connected to the constant current source, and a emission transistor second terminal; and a light emitting element including a light emitting element anode connected to the emission transistor second terminal, and a light emitting element cathode connected to the line for transferring the second power supply voltage.

* * * * *